US012679785B2

(12) United States Patent
Zorner et al.

(10) Patent No.: US 12,679,785 B2
(45) Date of Patent: *Jul. 14, 2026

---

(54) MICROBE-BASED PRODUCTS FOR ENHANCING PLANT ROOT AND IMMUNE HEALTH

(71) Applicant: Locus Solutions IPCo, LLC, Solon, OH (US)

(72) Inventors: Paul S. Zorner, Encinitas, CA (US); Sean Farmer, Ft. Lauderdale, FL (US); Ken Alibek, Solon, OH (US); Samal Ibragimova, Solon, OH (US)

(73) Assignee: LOCUS SOLUTIONS IPCO, LLC, Solon, OH (US)

( * ) Notice: Subject to any disclaimer, the term of this patent is extended or adjusted under 35 U.S.C. 154(b) by 307 days.

This patent is subject to a terminal disclaimer.

(21) Appl. No.: 17/877,905

(22) Filed: Jul. 30, 2022

(65) Prior Publication Data

US 2022/0363607 A1      Nov. 17, 2022

Related U.S. Application Data

(63) Continuation of application No. 16/461,295, filed as application No. PCT/US2019/031308 on May 8, 2019, now Pat. No. 11,447,430.

(60) Provisional application No. 62/719,758, filed on Aug. 20, 2018, provisional application No. 62/668,316, filed on May 8, 2018.

(51) Int. Cl.

| | |
|---|---|
| *C05F 11/08* | (2006.01) |
| *A01N 63/20* | (2020.01) |
| *A01N 63/22* | (2020.01) |
| *A01N 63/38* | (2020.01) |
| *C05G 5/27* | (2020.01) |

(52) U.S. Cl.
CPC .............. *C05F 11/08* (2013.01); *A01N 63/20* (2020.01); *A01N 63/22* (2020.01); *A01N 63/38* (2020.01); *C05G 5/27* (2020.02)

(58) Field of Classification Search
CPC ......... C05F 11/08; A01N 63/38; A01N 63/20; A01N 63/22; C05G 5/27
See application file for complete search history.

(56) References Cited

U.S. PATENT DOCUMENTS

| | | | |
|---|---|---|---|
| 4,061,488 A | 12/1977 | Mann | |
| 4,713,342 A | 12/1987 | Chet et al. | |
| 4,915,944 A | 4/1990 | Chet et al. | |
| 5,260,213 A | 11/1993 | Harman et al. | |
| 5,296,369 A | 3/1994 | Mortensen et al. | |
| 5,330,912 A | 7/1994 | Toet et al. | |
| 5,422,107 A | 6/1995 | Kubota | |
| 5,876,997 A | 3/1999 | Kretz | |
| 6,512,166 B1 | 1/2003 | Harman et al. | |
| 6,638,910 B2 | 10/2003 | Heins et al. | |
| 6,808,917 B1 | 10/2004 | Johnson | |
| 6,958,146 B2 | 10/2005 | Askham et al. | |
| 7,429,477 B2 | 9/2008 | Johnson | |
| 8,148,138 B2 | 4/2012 | Johnson | |
| 8,454,983 B2 | 6/2013 | DeChant et al. | |
| 8,598,083 B2 | 12/2013 | Kaminskyj et al. | |
| 8,716,001 B2 | 5/2014 | Harman | |
| 8,877,481 B2 | 11/2014 | Harman | |
| 9,175,258 B2 | 11/2015 | Bywater-Ekegard et al. | |
| 9,320,283 B2 | 4/2016 | Widmer et al. | |
| 9,538,765 B2 | 1/2017 | Johnson | |
| 9,642,372 B2 | 5/2017 | Jackson et al. | |
| 9,737,572 B2 | 8/2017 | Blotsky et al. | |
| 11,447,430 B2 * | 9/2022 | Zorner .................. A01N 63/22 |
| 11,692,989 B2 * | 7/2023 | Shibata .................. G06N 20/00 |
| | | | 702/2 |
| 11,760,969 B2 * | 9/2023 | Farmer .................. C12M 41/26 |
| | | | 435/74 |
| 12,063,935 B2 * | 8/2024 | Karathur .................. C12N 1/20 |
| 12,329,162 B2 * | 6/2025 | Zorner .................. A01N 63/22 |
| 2004/0096428 A1 | 5/2004 | Jijakli et al. | |
| 2004/0115171 A1 | 6/2004 | Droby | |
| 2005/0266036 A1 | 12/2005 | Awada et al. | |
| 2008/0107689 A1 | 5/2008 | Seiskari | |
| 2008/0318777 A1 | 12/2008 | Lin et al. | |
| 2009/0280212 A1 | 11/2009 | Sugimoto et al. | |

(Continued)

FOREIGN PATENT DOCUMENTS

| | | |
|---|---|---|
| CN | 101057590 A | 10/2007 |
| CN | 102613252 A | 8/2012 |

(Continued)

OTHER PUBLICATIONS

Abdullah, M.T., et al., "Biological control of Sclerotinia sclerotiorum (Lib.) de Bary with Trichoderma harzianum and Bacillus amyloliquefaciens." Crop Protection, 2008, 27: 1354-1359.

Baltzoi, P., et al., "Effect of Symbiotic Microorganisms on Turfgrass Under Two Irrigation Regimes." International Journal of Plant & Soil Science, 2015, 8(2): 1-9.

Bashan, Y., "Alginate Beads as Synthetic Inoculant Carriers for Slow Release of Bacteria That Affect Plant Growth." Applied and Environmental Microbiology, May 1986, 51(5): 1089-1098.

Buysens, C., et al., "Inoculation of Medicago sativa cover crop with Rhizophagus irregularis and Trichoderma harzianum increases the yield of subsequently-grown potato under low nutrient conditions." Applied Soil Ecology, 2016, 105: 137-143.

De Brito, D., Biosurfactants from renewable raw materials, Universidade do Minho Departamento de Engenharia Biologica, Nov. 2013, pp. 1-93

*Primary Examiner* — Alma Pipic

(74) *Attorney, Agent, or Firm* — BENESCH, FRIEDLANDER, COPLAN & ARONOFF LLP

(57) ABSTRACT

Compositions and methods are provided for enhancing plant immunity, health, growth and yields using a combination of microbes and/or their growth by-products. Specifically, the subject invention enhances plant health, growth and/or yields using a combination of a *Trichoderma* spp. fungus and a *Bacillus* spp. bacterium. Specifically, in one embodiment, the subject invention utilizes *Trichoderma harzianum* and *Bacillus amyloliquefaciens*.

17 Claims, 23 Drawing Sheets

(56) References Cited

U.S. PATENT DOCUMENTS

| | | | |
|---|---|---|---|
| 2010/0021515 A1 | 1/2010 | Duponnois | |
| 2010/0143316 A1 | 6/2010 | Hsieh et al. | |
| 2010/0254957 A1 | 10/2010 | Hua | |
| 2011/0003693 A1 | 1/2011 | Spittle | |
| 2011/0200572 A1 | 8/2011 | Reuter | |
| 2011/0274673 A1 | 11/2011 | Kang et al. | |
| 2011/0319341 A1 | 12/2011 | Awada et al. | |
| 2012/0058895 A1 | 3/2012 | Awada et al. | |
| 2012/0129695 A1 | 5/2012 | Tachibana et al. | |
| 2012/0220464 A1 | 8/2012 | Giessler-Blank et al. | |
| 2013/0085067 A1 | 4/2013 | Schofield et al. | |
| 2013/0172184 A1 | 7/2013 | Bain et al. | |
| 2013/0184154 A1 | 7/2013 | Levy et al. | |
| 2013/0202562 A1 | 8/2013 | Wood | |
| 2013/0205849 A1 | 8/2013 | Kloepper et al. | |
| 2013/0255338 A1* | 10/2013 | Lopez-Cervantes | C05C 9/00 71/7 |
| 2013/0276493 A1* | 10/2013 | Johnson | C05B 15/00 71/8 |
| 2013/0324406 A1 | 12/2013 | Chisholm et al. | |
| 2014/0201870 A1 | 7/2014 | Harman | |
| 2015/0037302 A1 | 2/2015 | Bralkowski et al. | |
| 2015/0045290 A1 | 2/2015 | Coutte et al. | |
| 2015/0072856 A1 | 3/2015 | Schnabel et al. | |
| 2015/0118203 A1 | 4/2015 | Boyette et al. | |
| 2015/0237807 A1 | 8/2015 | Valiquette | |
| 2015/0305347 A1 | 10/2015 | Wicks et al. | |
| 2016/0040119 A1 | 2/2016 | Hashman | |
| 2016/0073640 A1 | 3/2016 | Curtis et al. | |
| 2016/0073642 A1 | 3/2016 | Ceballos Rojas et al. | |
| 2016/0145660 A1 | 5/2016 | Campoy García et al. | |
| 2016/0152525 A1 | 6/2016 | Chelle et al. | |
| 2016/0345588 A1 | 12/2016 | Johnson | |
| 2017/0094968 A1 | 4/2017 | Sieverding | |
| 2017/0223956 A1 | 8/2017 | Habib et al. | |
| 2017/0356002 A1 | 12/2017 | Thompson et al. | |
| 2018/0098483 A1 | 4/2018 | Fabbri et al. | |
| 2018/0201549 A1 | 7/2018 | Greenshields et al. | |
| 2018/0242511 A9 | 8/2018 | Fabbri et al. | |
| 2019/0216025 A1 | 7/2019 | Farmer et al. | |

FOREIGN PATENT DOCUMENTS

| | | | | |
|---|---|---|---|---|
| CN | 105087383 A | 11/2015 | | |
| CN | 105638748 A | 6/2016 | | |
| CN | 105670963 A * | 6/2016 | | C05G 3/00 |
| CN | 106010550 A | 10/2016 | | |
| CN | 107404836 A | 11/2017 | | |
| EP | 0051637 A1 | 11/1981 | | |
| EP | 0544039 A1 | 11/1991 | | |
| EP | 0540074 A1 | 5/1993 | | |
| EP | 2390345 A1 | 11/2011 | | |
| KR | 1020140019992 A | 2/2014 | | |
| KR | 20170132149 A | 12/2017 | | |
| WO | 9525163 A1 | 9/1995 | | |
| WO | 9716974 A1 | 5/1997 | | |
| WO | 9945787 A1 | 9/1999 | | |
| WO | 2005117929 A1 | 12/2005 | | |
| WO | WO-2008155514 A2 * | 12/2008 | | C05D 9/02 |
| WO | 2010055093 A1 | 5/2010 | | |
| WO | 2014043058 A1 | 3/2014 | | |
| WO | 2014085576 A1 | 6/2014 | | |
| WO | 2014120247 A1 | 8/2014 | | |
| WO | 2015023662 A1 | 2/2015 | | |
| WO | 2015089183 A2 | 6/2015 | | |
| WO | 2016063305 A2 | 4/2016 | | |
| WO | 2016172582 A1 | 10/2016 | | |
| WO | 2017035099 A1 | 3/2017 | | |
| WO | 2017035101 A1 | 3/2017 | | |
| WO | 2017044953 A1 | 3/2017 | | |
| WO | 2017210166 A1 | 12/2017 | | |
| WO | 2018049146 A1 | 3/2018 | | |
| WO | 2018049182 A2 | 3/2018 | | |
| WO | 2018080596 A1 | 5/2018 | | |
| WO | 2018094075 A1 | 5/2018 | | |
| WO | 2018129299 A1 | 7/2018 | | |
| WO | 2018132774 A1 | 7/2018 | | |
| WO | 2018148656 A1 | 8/2018 | | |
| WO | 2018213604 A3 | 11/2018 | | |
| WO | 2019023034 A3 | 1/2019 | | |
| WO | 2019067379 A1 | 4/2019 | | |
| WO | 2019067380 A2 | 4/2019 | | |
| WO | 2019089730 A1 | 5/2019 | | |
| WO | 2019133315 A1 | 6/2019 | | |
| WO | 2019133555 A1 | 6/2019 | | |
| WO | 2019133923 A1 | 6/2019 | | |
| WO | 2019140093 A1 | 7/2019 | | |
| WO | 2019140439 A1 | 7/2019 | | |
| WO | 2019164878 A1 | 8/2019 | | |
| WO | 2019165413 A1 | 8/2019 | | |
| WO | 2019168852 A1 | 9/2019 | | |
| WO | 2019178204 A1 | 9/2019 | | |
| WO | 2020006194 A1 | 1/2020 | | |
| WO | 2020112844 A1 | 6/2020 | | |

OTHER PUBLICATIONS

De Oliveira, M., et al., "Review: Sophorolipids A Promising Biosurfactant and it's Applications." International Journal of Advanced Biotechnology and Research (IJBR), 2015, 6(2): 161-174.

Degenkolb, T., et al., "Metabolites from nematophagous fungi and nematicidal natural products from fungi as alternatives for biological control. Part II: metabolites from nematophagous basidiomycetes and non-nematophagous fungi." Appl. Microbiol Biotechnol. 2016, 100: 3813-3824.

Domeignoz-Horta, L.A., et al. "Non-denitrifying Nitrous Oxide-reducing Bacteria—An Effective N2O Sink in Soil." Soil Biology & Biochemistry, 2016, 103: 376-379.

Gaind, S., "Phytate Mineralizing Fungi for Phosphorus Recovery from Organic Wastes." JAM, 2016, 2(4): 200-208.

Hadi, M.A., et al., "Interaction of Bacillus Subtilis and Trichoderma Harzianum with Mycorrhiza on Growth and Yield of Cucumber (*Cucumis Sativus* L.)." Internationa Journal of Current Research, Aug. 2014, 6(8): 7754-7758.

Hussein, W., et al., "Systemic Resistance Induction of Tomato Plants against ToMV Virus by Surfactin Produced from Bacillus subtilis BMG02." American Journal of Microbiological Research, Sep. 2016, 4(5): 153-158.

Khan, N., et al., "Combating Fusarium Infection Using Bacillus-Based Antimicrobials." Microorganisms, 2017, 5(75): 1-13.

Kurtzman, C.P., et al., "Production of sophorolipid biosurfactants by multiple species of the Starmerella (*Candida*) bombicola yeast clade." FEMS Microbiol Lett, 2010, 311: 140-146.

Lee, G., et al., "Foliar application of the leaf-colonizing yeast Pseudozyma churashimaensis elicits systemic defense of pepper against bacterial and viral pathogens." Scientific Reports, 2017, 7(39432): 1-13.

Limtong, S., et al., "Biocontrol of Rice Seedling Rot Disease Caused by Curvularia lunata and Helminthosporium oryzae by Epiphytic Yeasts from Plant Leaves." Microorganisms, 2020, 8(647): 1-18.

Patakioutas, G., et al., "Turfgrass Root System Inoculation and Colonization by a Mycorrhizal Fungus and other Symbiotic Micro-Organisms and Evaluation of its Effects on Green Turf Cover and Growth." XXIX International Horticultural Congress on Horticulture: Sustaining Lives, Livelihoods and Landscapes, 2014, 1122: 65-72.

Saxena, A.K., et al., "*Bacillus* species in soil as a natural resource for plant health and nutrition." Journal of Applied Microbiology, 2019, 128: 1583-1594.

Sen, R., et al., "Biosurfactants: Advances in Experimental Medicine and Biology." Landes Bioscience and Springer Science & Business Media, 2010: 672: 1-331.

Torkashvand, A.M., et al., "The reuse of peanut organic wastes as a growth medium for ornamental plants." Int J. Recycl. Org. Waste Agricult., 2015, 4: 85-94.

(56) References Cited

OTHER PUBLICATIONS

Aboud, M. "Interaction of Bacillus subtilis and Trichoderma harzianum with mycorrhiza on growth and yield of cucumber (*Cucumis sativus* L.)." International Journal of Current Research vol. 6 (2014): 7754-7758.

Locus: "Rhizolizer (TM) Soil Amendment." Retrieved from Internet: Mar. 9, 2018, <<https://locusag.com/wpcontent/uploads/2018/3/Locus_AG_Rhizolizer_labels_FLORIDA.pdf>> pp. 1-2.

Novozymes: "Quickroots wettable powder for corn, canola cotton and sorghum." Retrieved from the Internet: Nov. 6, 2019, <https://biosolutions.movozymes.com/sites/default/files/field_media_document/2021-11/QuickRoots-multi%20crop%20WP%20Label%20EN.pdf>> pp. 1-2.

Novozymes 4: "QuickRoots Wettab;e Powder Corn." Retrieved from the Internet: May 12, 2019, <https://biosolutions.novozymes.com/sites/default/files/field_media_document/2021-11/QuickRoots%20Wettable%20Powder%20Corn_EN_v3%20SDS.pdf>> pp. 1-6.

\* cited by examiner

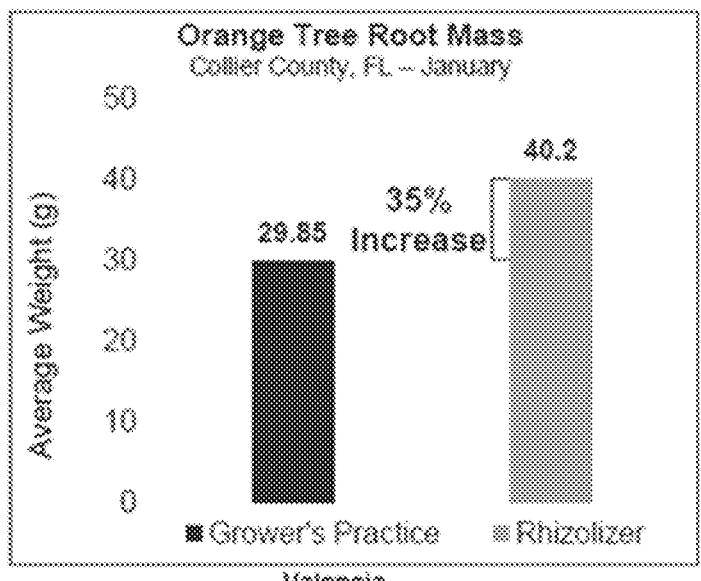
FIG. 4B
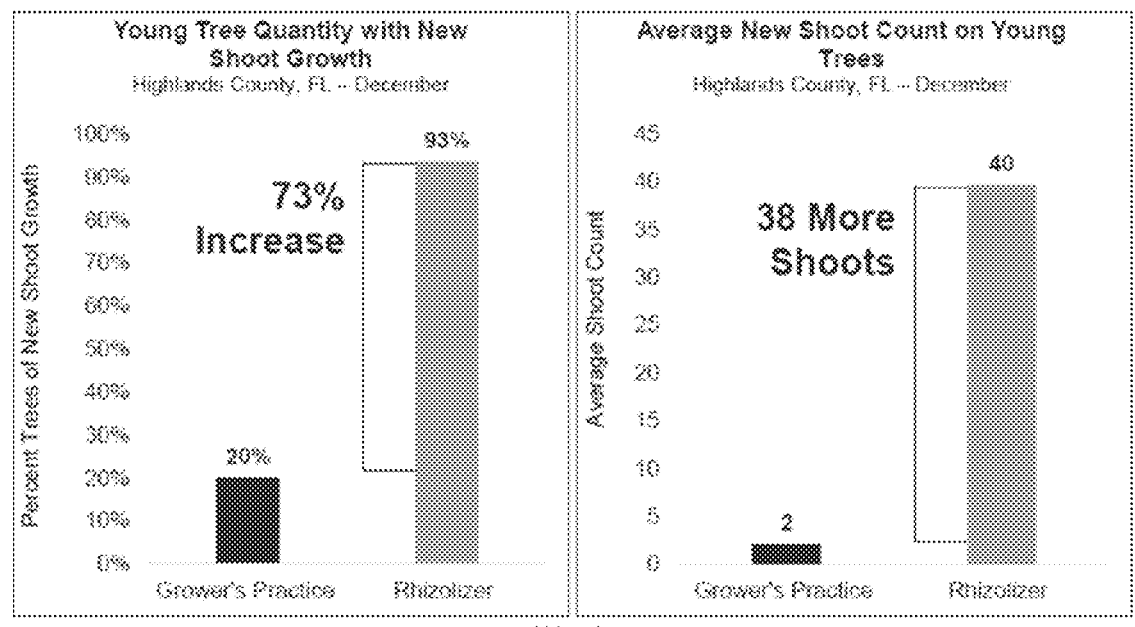
FIG. 5A                                     FIG. 5B

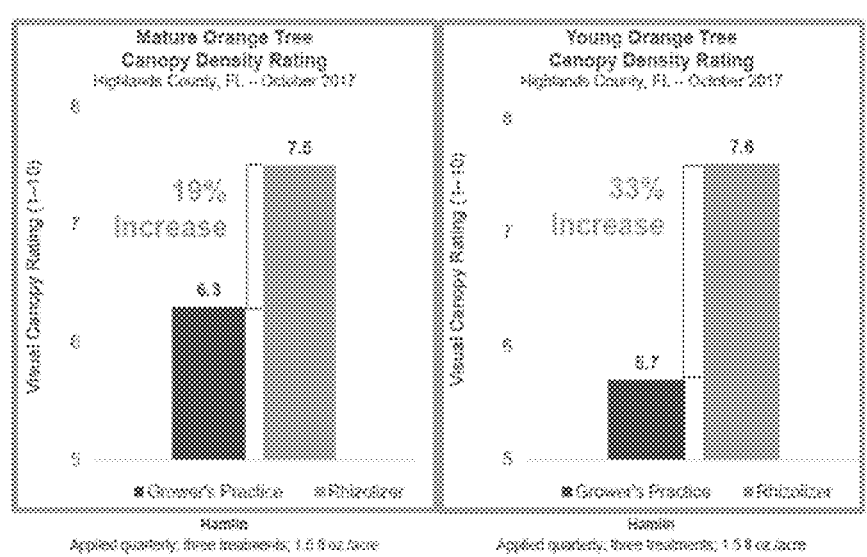
FIG. 6A                                    FIG. 6B
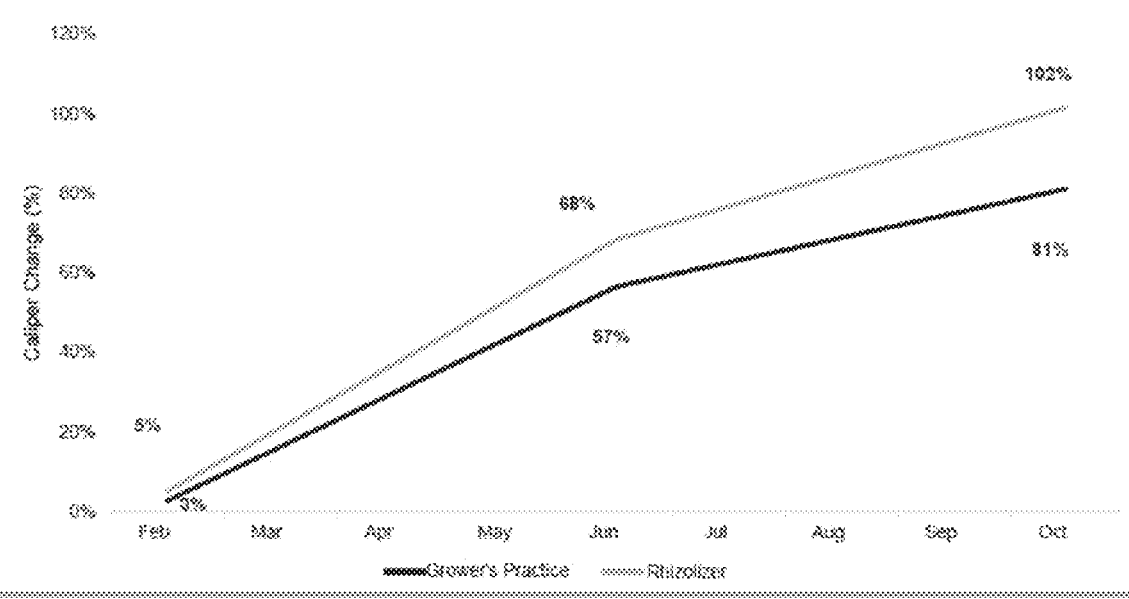
FIG. 7

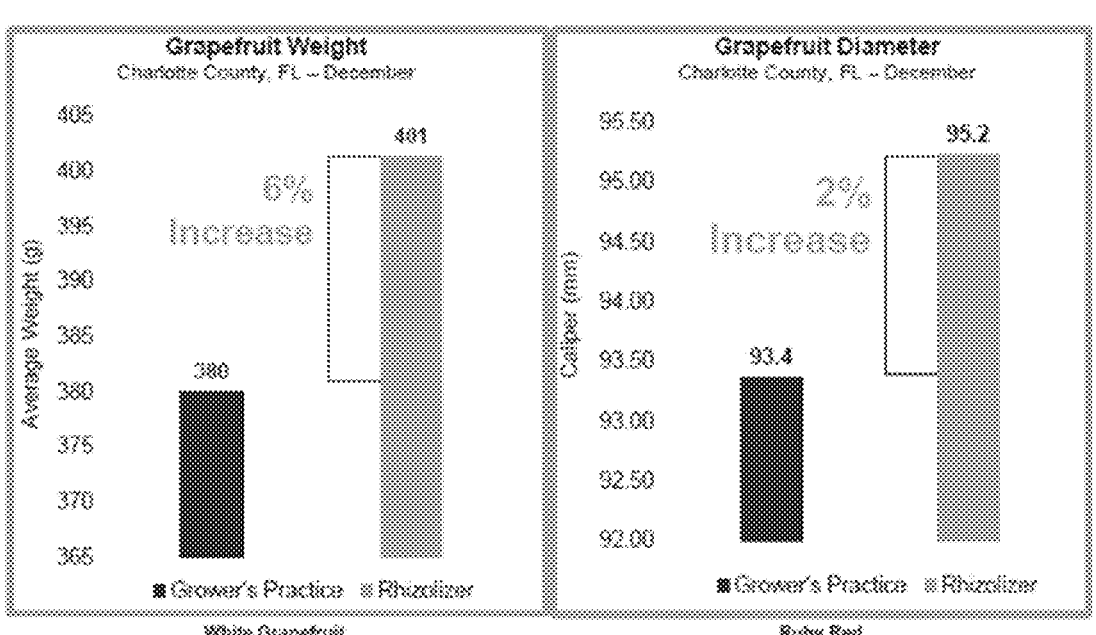
FIG. 8A                    FIG. 8B
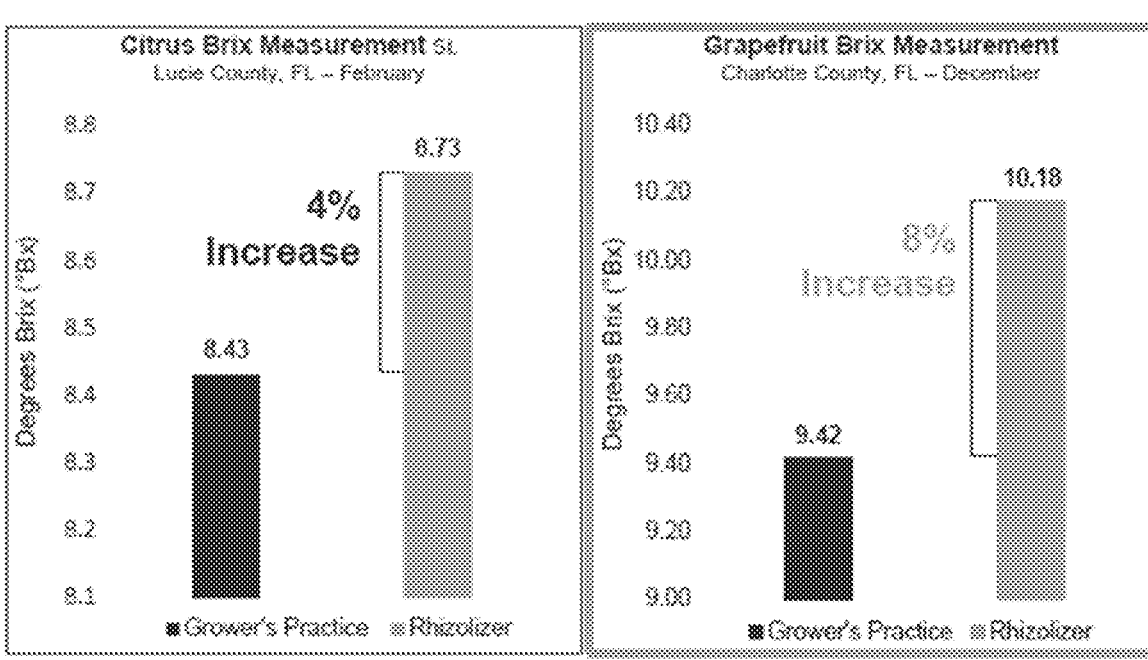
FIG. 9A                    FIG. 9B

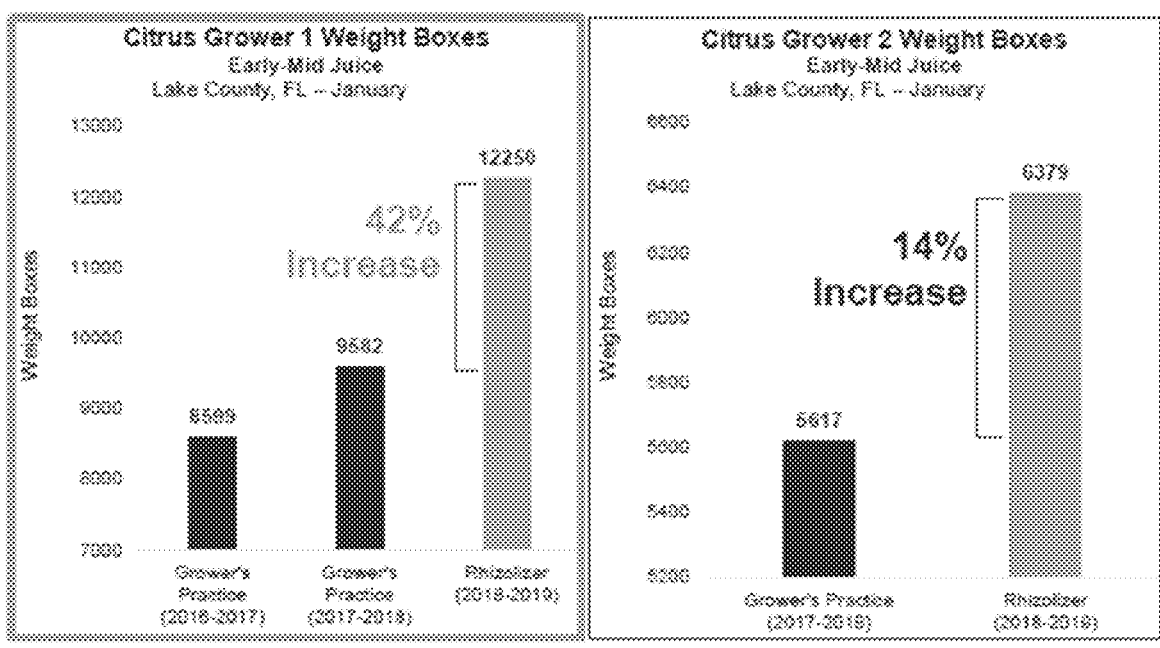
FIG. 10A                                        FIG. 10B
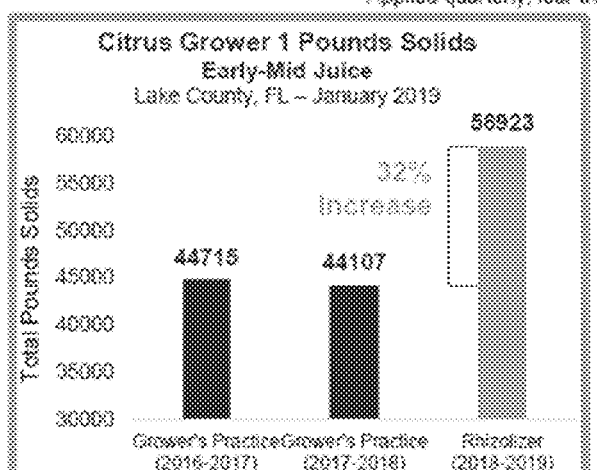
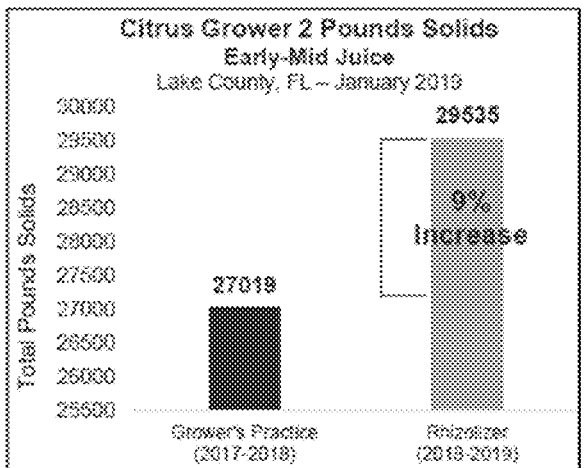
FIG. 11A                                        FIG. 11B

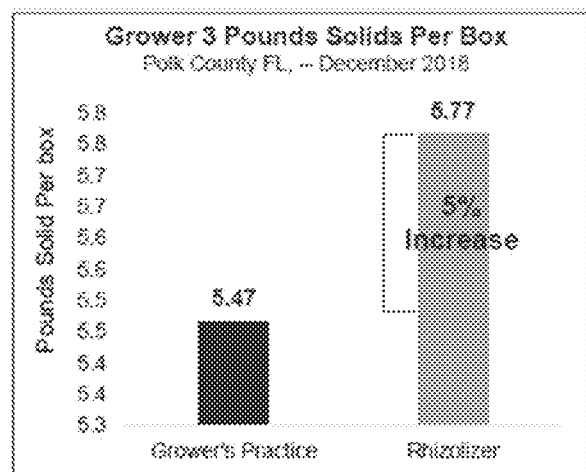
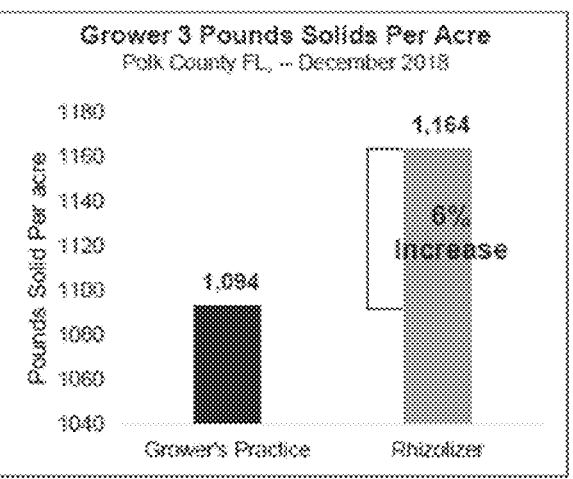
Hamlin
Applied bi-monthly; four treatments; 1.5 fl oz./acre
Average Pounds Solid Per Box differences are statistically significant
Increased 2017-2018 harvest numbers to account for fruit drop associated with Hurricane Irma
FIG. 12A                                    FIG. 12B
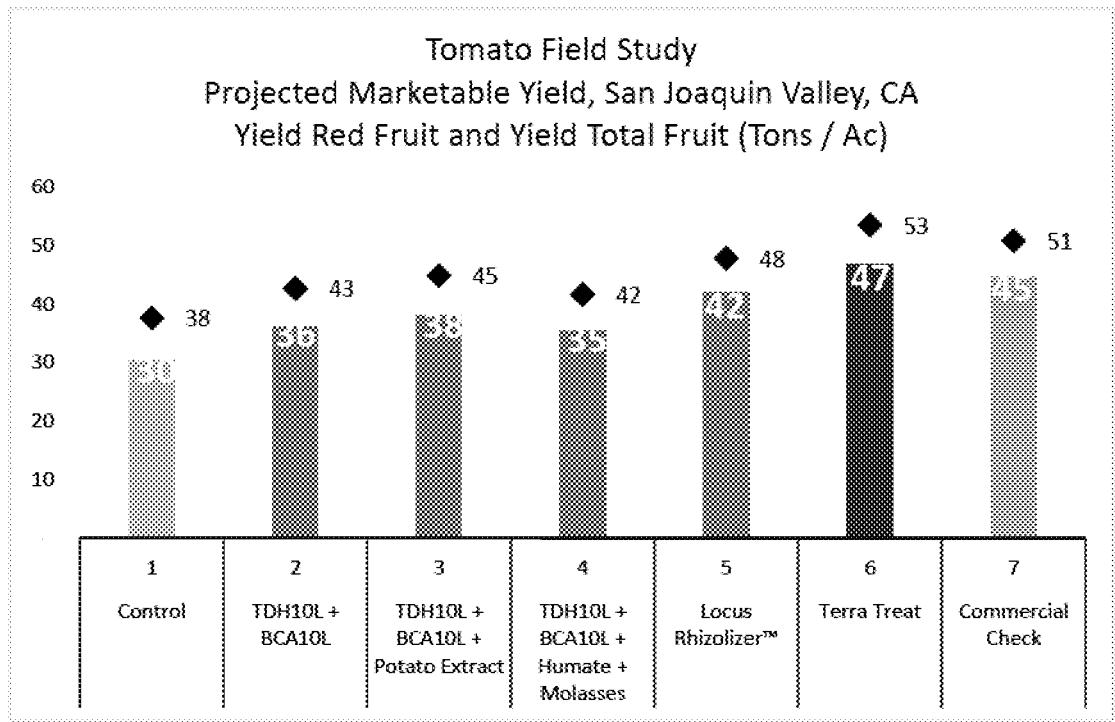
FIG. 13A

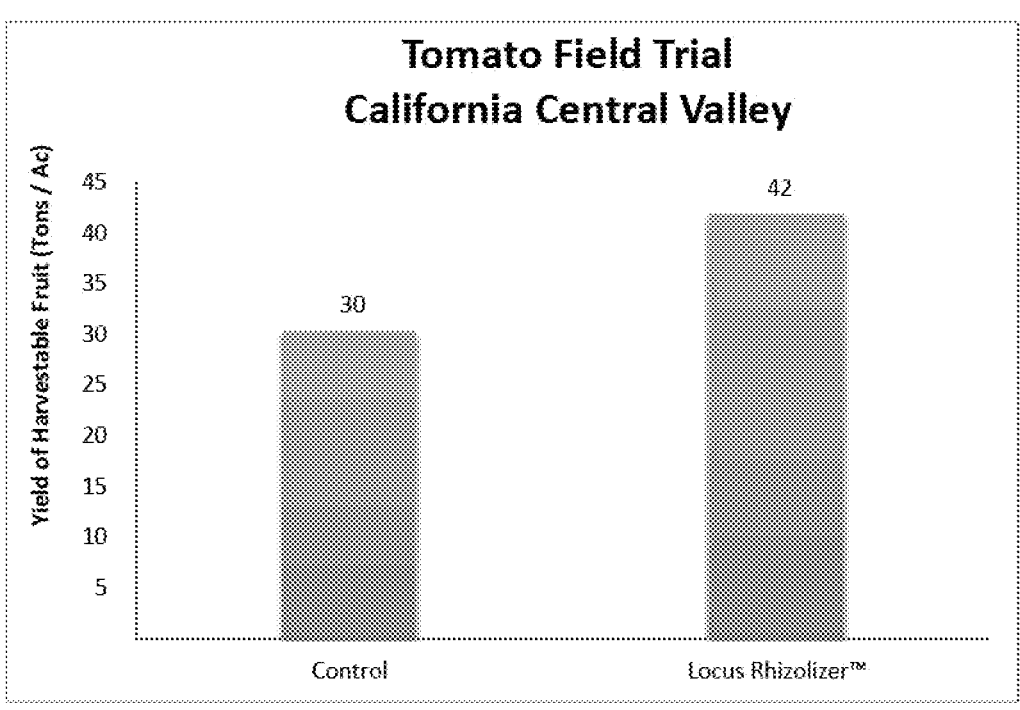
FIG. 13B
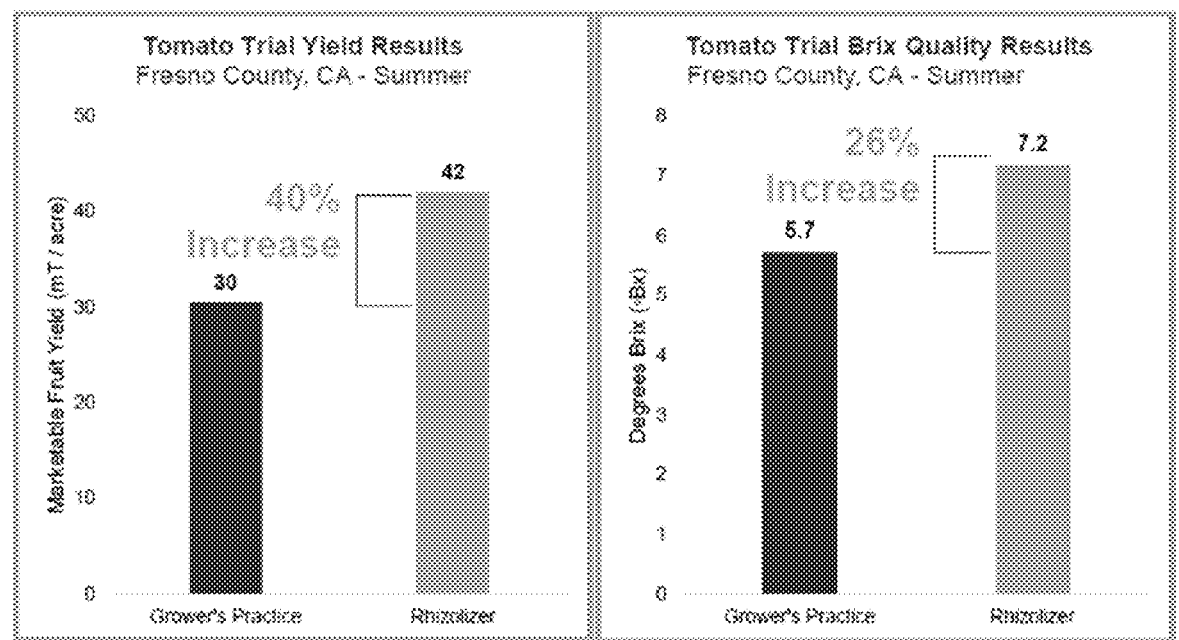
FIG. 14A                  FIG. 14B

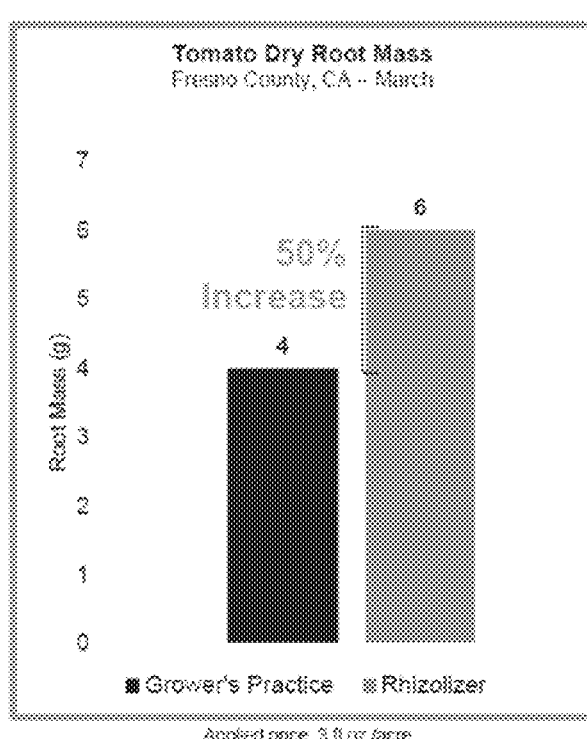
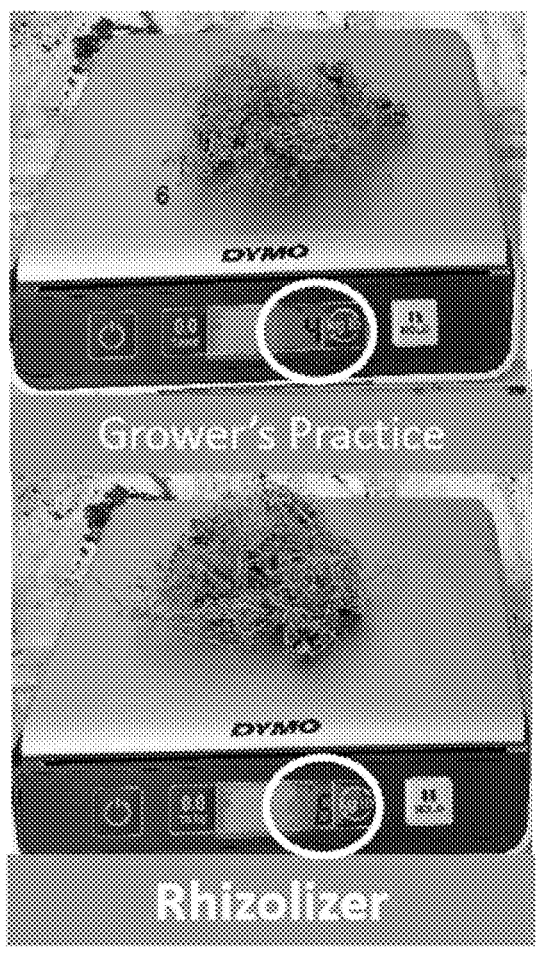
FIG. 15A                                           FIG. 15B
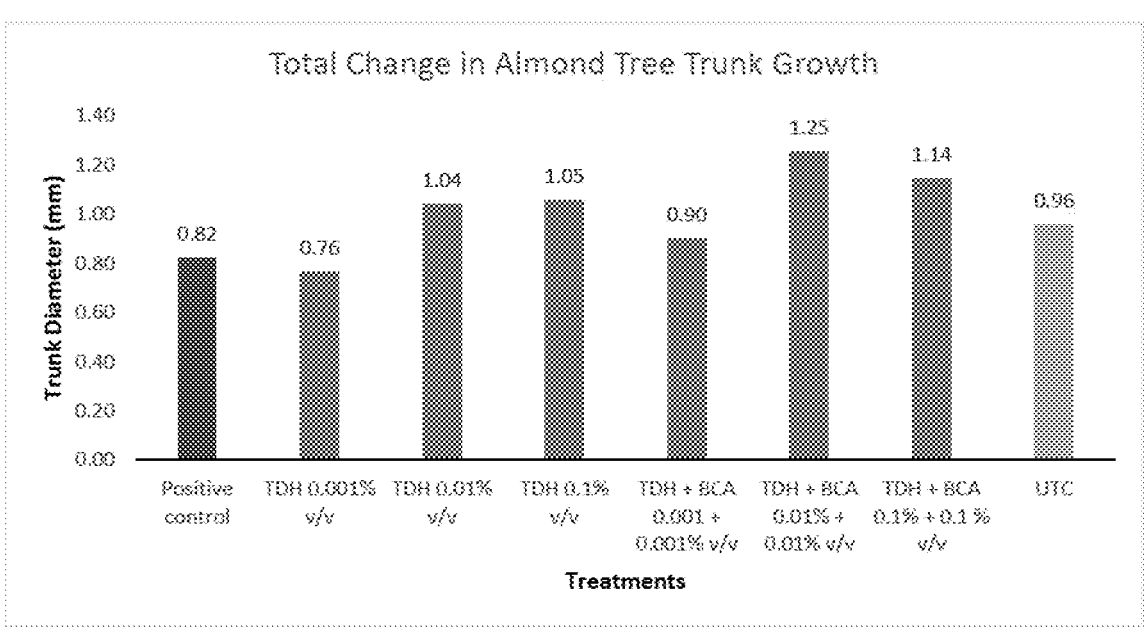
FIG. 16A

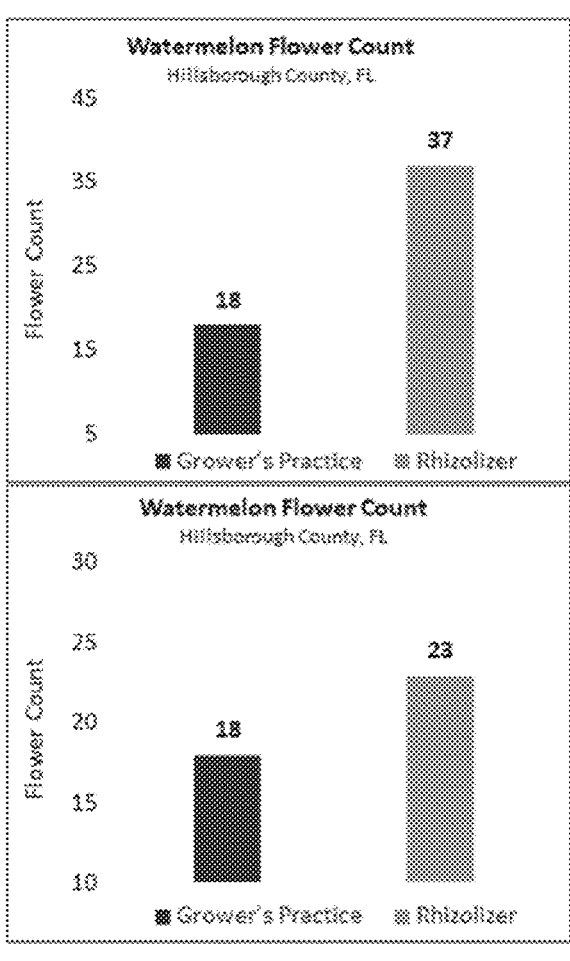
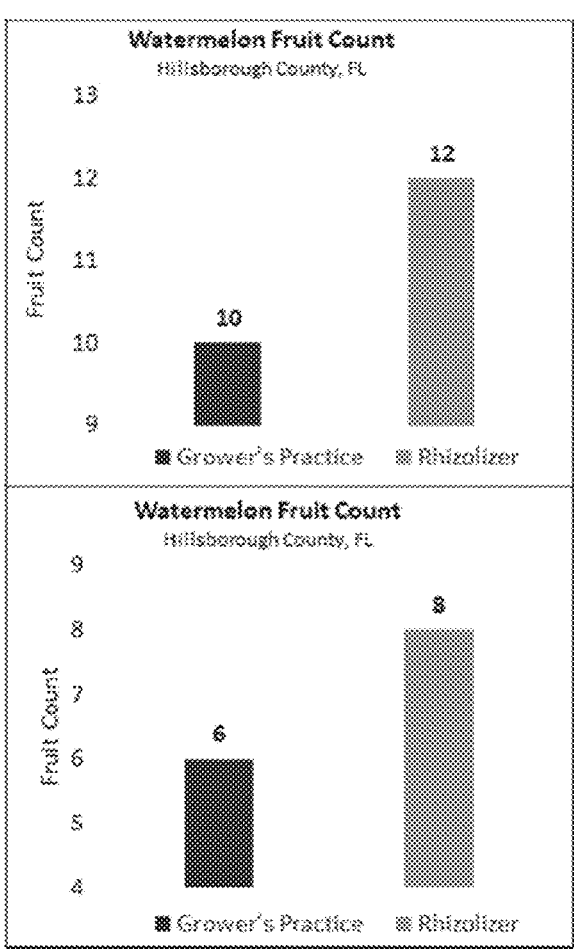
FIG. 18C                              FIG. 18D
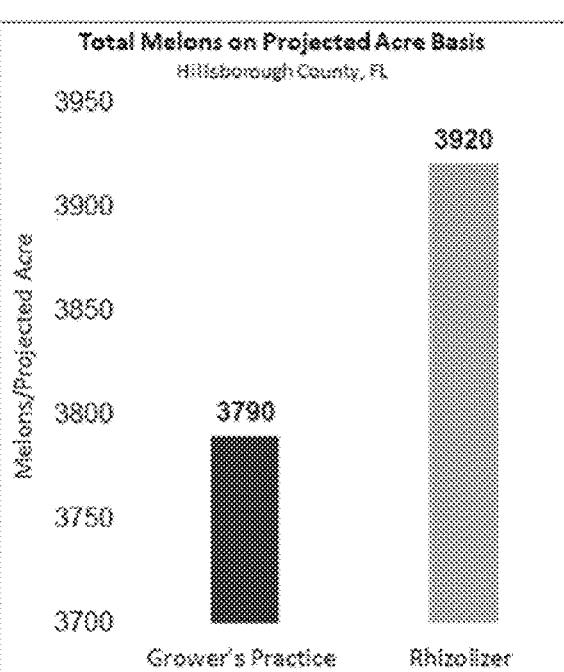
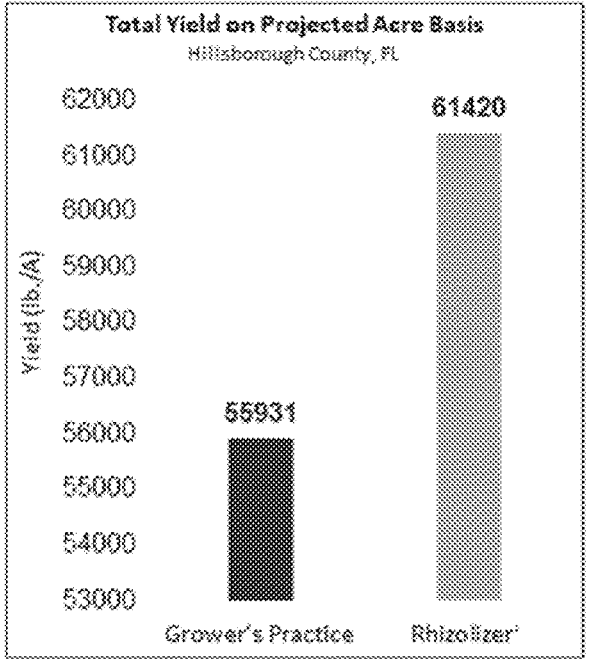
FIG. 18E

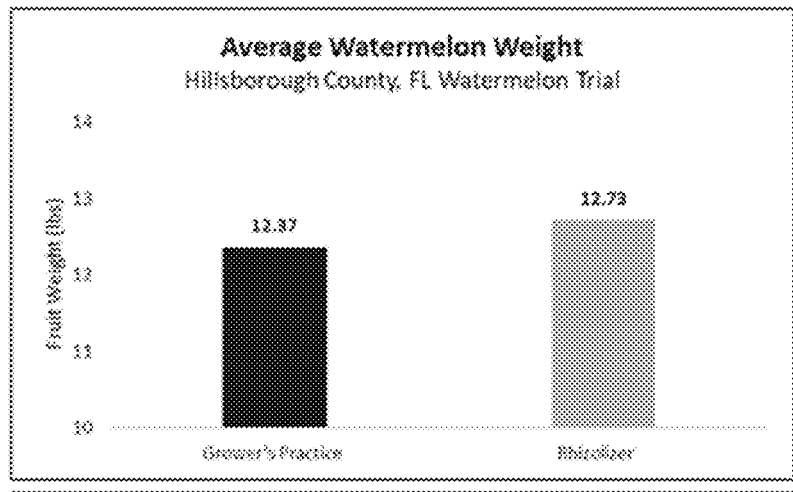
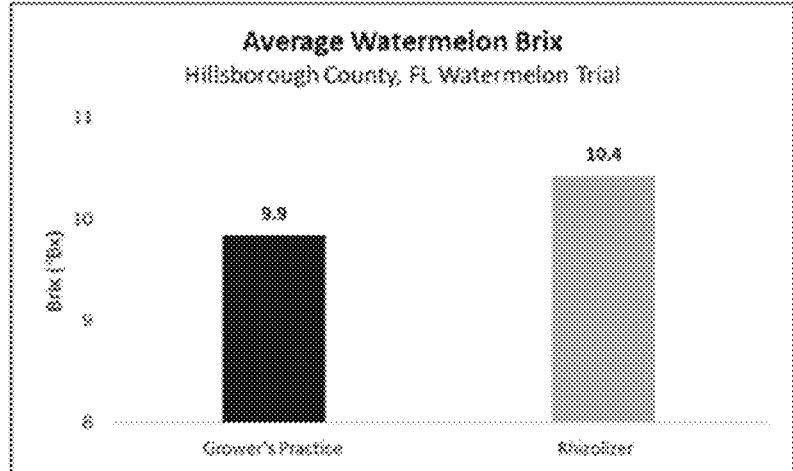
FIG. 18F
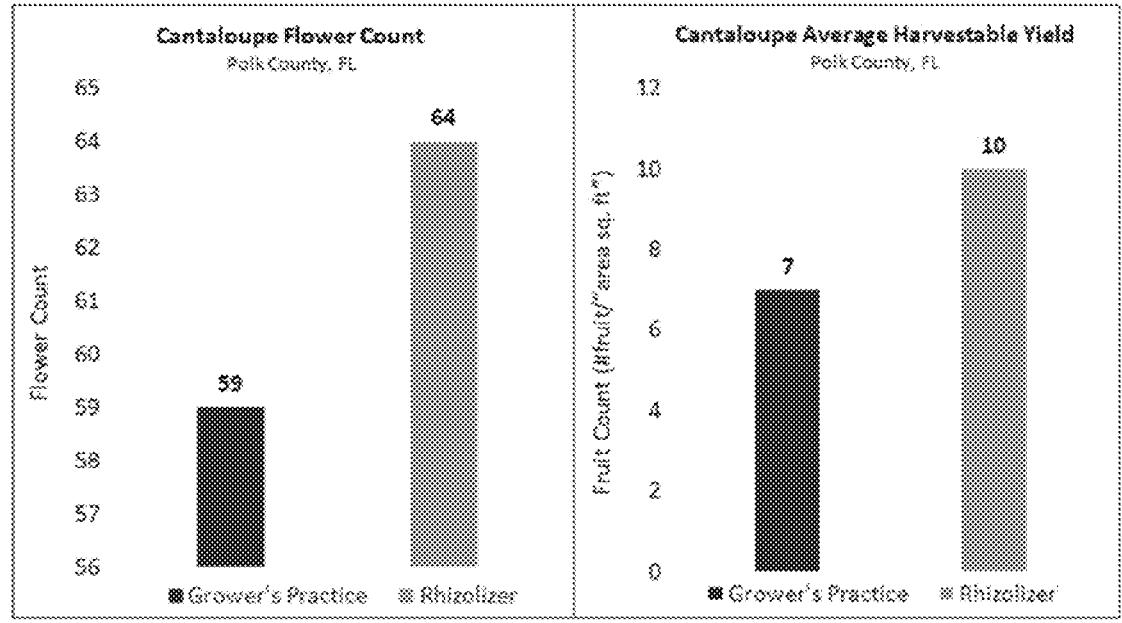
FIG. 19A                                    FIG. 19B

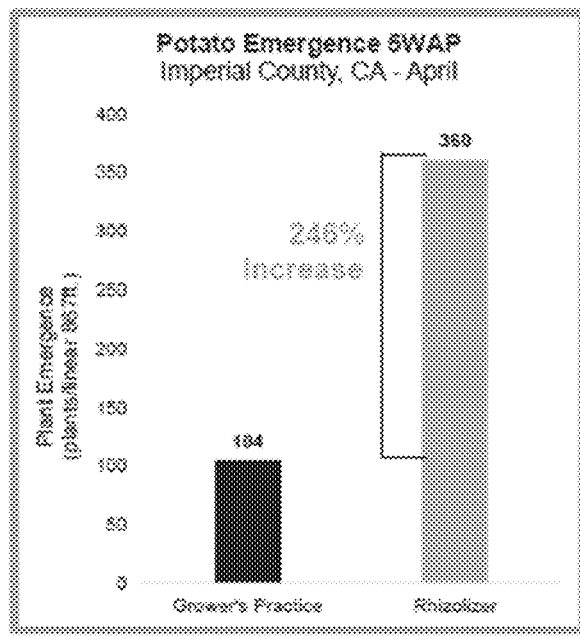
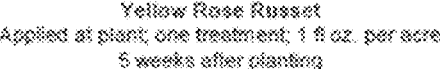
FIG. 20A
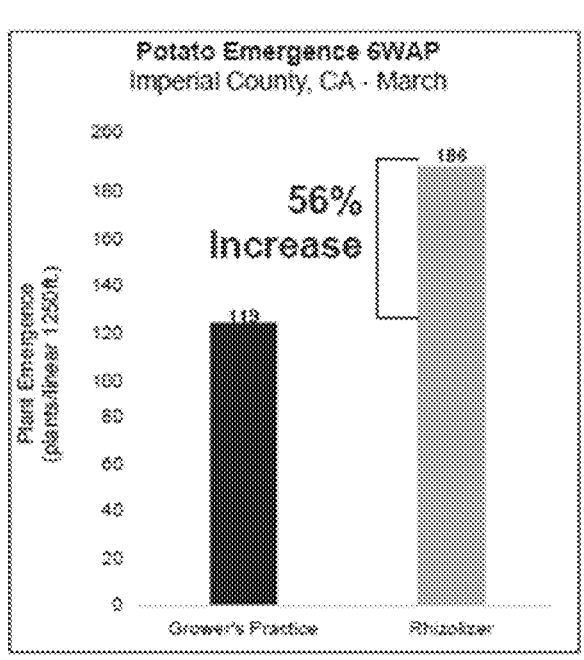
FIG. 20B
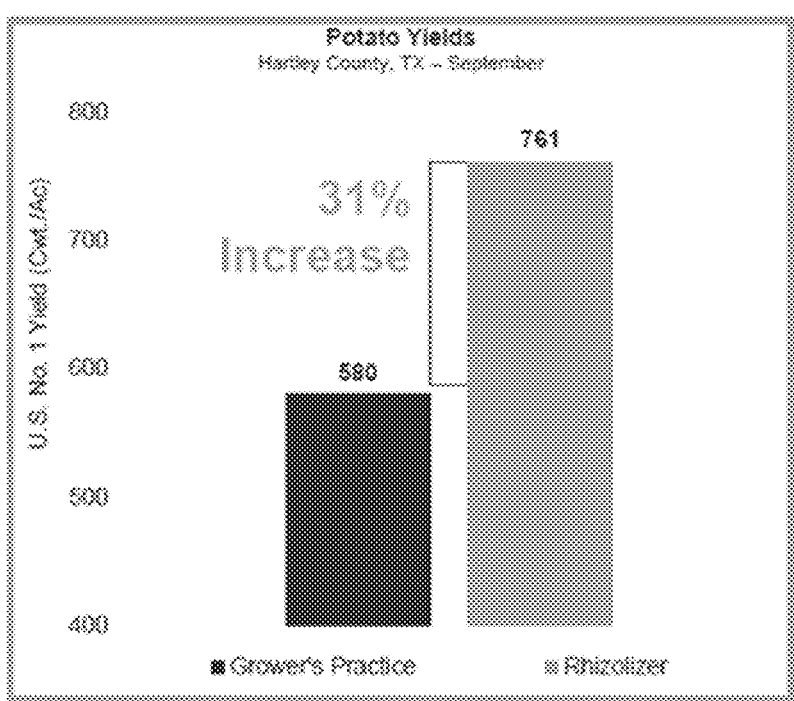
FIG. 21A

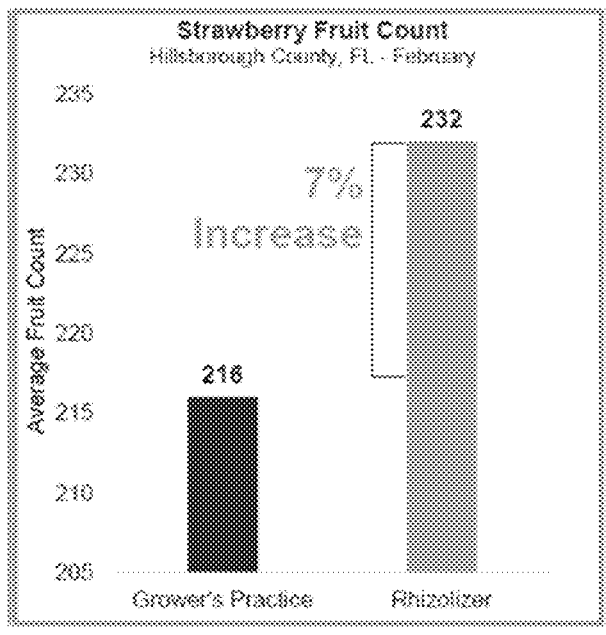
FIG. 27
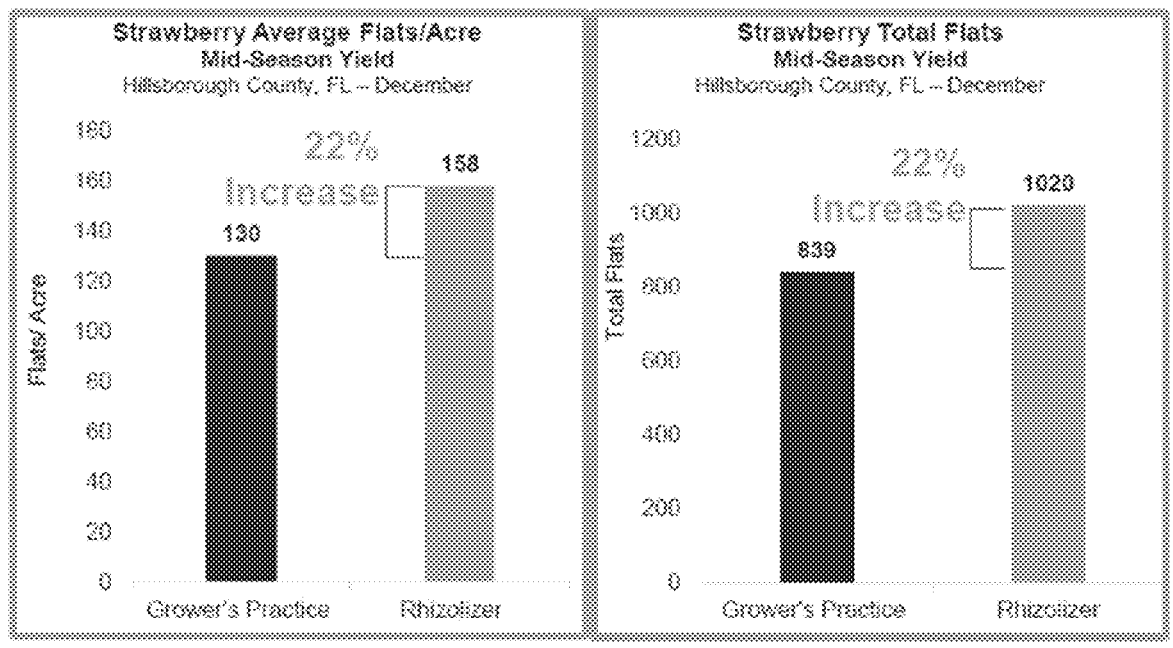
FIG. 28A                                                FIG. 28B

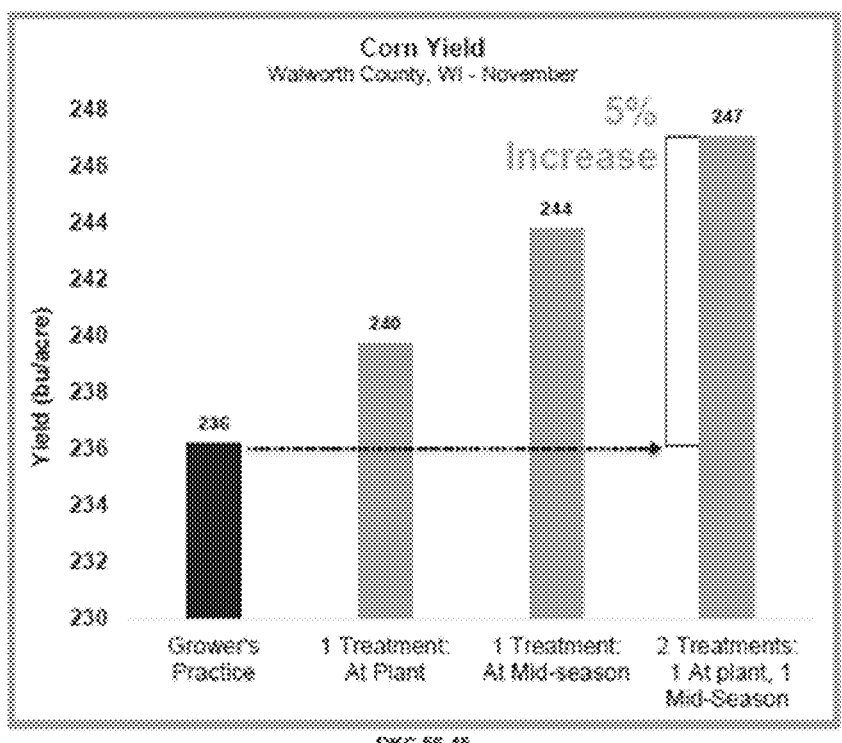
FIG. 31
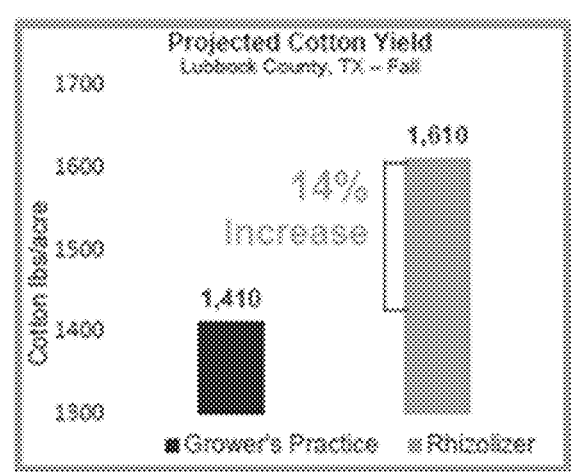 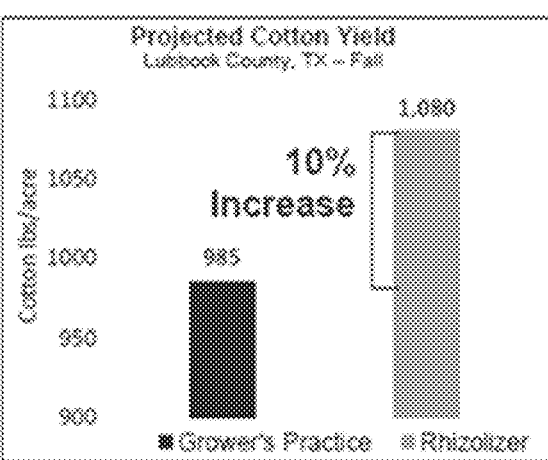
FIG. 32

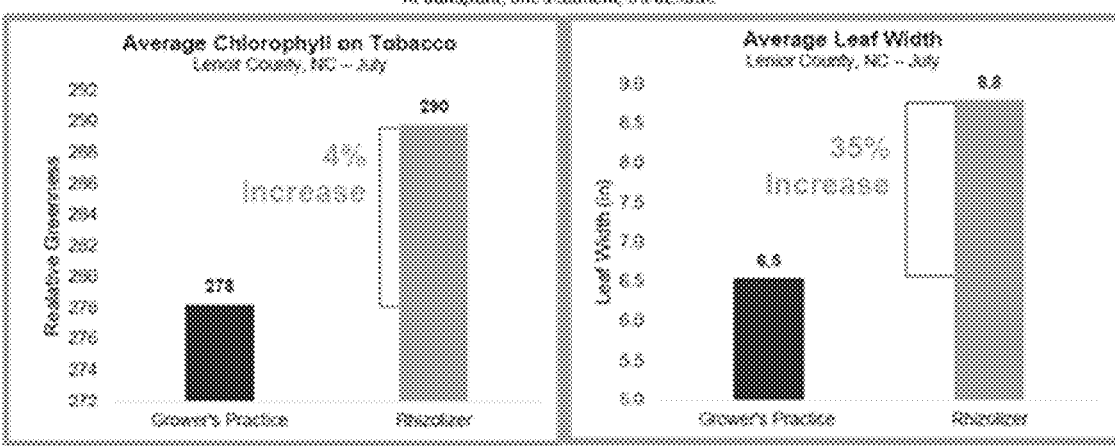
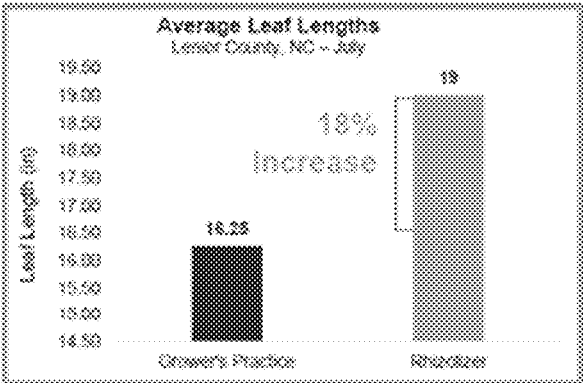
FIG. 33
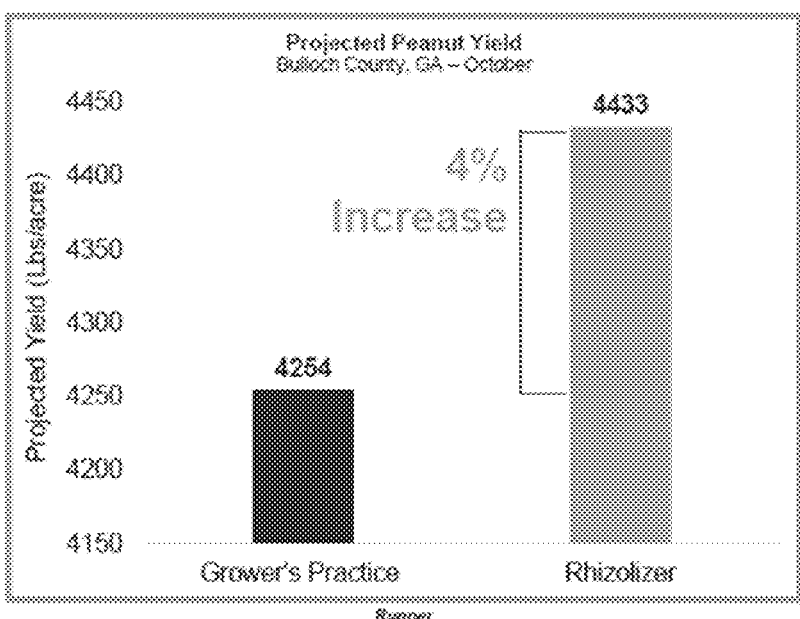
FIG. 34

MICROBE-BASED PRODUCTS FOR ENHANCING PLANT ROOT AND IMMUNE HEALTH

CROSS-REFERENCE TO RELATED APPLICATIONS

This application is a continuation of U.S. patent application Ser. No. 16/461,295, filed May 15, 2019; which is a National Stage Application of International Application No. PCT/US2019/031308, filed May 8, 2019; which claims priority to U.S. Provisional Patent Application Ser. No. 62/668,316, filed May 8, 2018; and Ser. No. 62/719,758, filed Aug. 20, 2018, each of which are incorporated herein by reference in their entireties.

BACKGROUND OF THE INVENTION

In the agriculture industry, certain common issues continue to hinder the ability of growers to maximize production yields while keeping costs low. These include, but are not limited to, infections and infestations caused by bacteria, fungi, nematodes and other pests and pathogens; the high costs of chemical fertilizers and herbicides, including their environmental and health impacts; and the difficulty for plants to efficiently absorb nutrients and water from different types of soil.

In citrus production, for example, widespread infection of citrus plants by pathogens such as those that cause citrus greening disease and citrus canker disease has led to significant hardships for citrus growers. As much as entire crops have been lost to these bacterial infections, leading to a decline in the production, and increase in price, of citrus products worldwide.

Citrus greening disease, which is also known is Huanglongbing (HLB) or yellow dragon disease, is an incurable infection caused by the Gram-negative bacterium *Candidatus Liberibacter asiaticus*. This disease has caused devastation for millions of acres of citrus crops throughout the United States and other parts of the world. Infected trees produce fruits that are green, misshapen and bitter, which are unsuitable for sale. The disease is spread by a disease-infected insect, the Asian citrus psyllid, and has put the future of the world's citrus trees at risk.

HLB lives in, and interferes with the function of, the phloem, or the plant vascular system that transports sugars to all parts of a tree. Thus, *Liberibacter* can move to and grow throughout an entire tree, including the roots. Before any expression of foliar symptoms, the infection typically has already caused significant damage to the root system, causing from 30 to 50% loss in fibrous root density.

Root density continues to gradually decrease as symptoms develop in the canopy. This is probably due to plugging in the phloem, which restricts movement of sugars to the root system. Loss of such a large percentage of the roots greatly reduces the immune health of the tree as well as its ability to absorb nutrients efficiently and to withstand water stress during extended dry periods. Thus, one of the most crucial characteristics for healthy crops is a healthy rhizosphere.

The rhizosphere is the zone of soil wherein a plant's root system grows and absorbs water and nutrients. To supplement soils with certain nutrients, many growers have relied heavily on the use of synthetic chemicals and chemical fertilizers for boosting crop yields and protecting crops from drought and disease. With reduced uptake capacity, however, when, for example, a plant's root system is compromised due to disease, adding more water and/or nutrients to the soil may not lead to increased absorption by the root system. Instead, what is applied will flow through the rhizosphere and into the groundwater. As sources of pollution, responsible use of these substances is an ecological and commercial imperative. Over-dependence and long-term use of certain chemical fertilizers, pesticides and antibiotics deleteriously alters soil ecosystems, reduces stress tolerance, increases the prevalence of resistant pests, and impedes plant growth and vitality.

Efficient nutrient and water absorption in the rhizosphere depends not only on the amount of water and nutrients present therein, but also upon the particular microbiome that exists within the soil. Soils contain billions of different microorganisms, which coexist with each other and with plants to form a complex network of symbiotic relationships.

The optimum combination of microorganisms in a rhizosphere varies between the type of plant as well as the type of soil in which it grows. No two plant species or regions will have the same network of microbes within a rhizosphere. Thus, while biological agents have the potential to play an increasingly vital role in crop health and soil remediation, treating a broad range of plant species over many different regions poses difficulties due to the complexity and specificity of each plant's optimal rhizospheric microbiome.

The economic costs and the adverse health and environmental impacts of current methods of crop production continue to burden the sustainability of crop-based consumer products. Thus, there is a continuing need for improved, non-toxic and environmentally-friendly methods of enhancing crop production at a low cost.

BRIEF SUMMARY OF THE INVENTION

The subject invention provides microbe-based products, as well as methods of using these microbe-based products in agricultural applications. Advantageously, the microbe-based products and methods of the subject invention are environmentally-friendly, non-toxic and cost-effective.

In preferred embodiments, the subject invention provides microbe-based soil treatment compositions and methods of their use for enhancing the health, growth and overall yields of crop plants by, for example, improving the nutrient and moisture retention properties of the rhizosphere. Advantageously, the soil treatment compositions of the subject invention can improve, for example, crop health, as well as crop growth and yields, even in situations where one or more of the plants in a crop are infected with a pathogen or where the immune health of the crop plants is otherwise compromised.

For example, in one embodiment, the subject invention can be used to improve health, growth and yields of citrus plants infected with, e.g., *Candidatus Liberibacter asiaticus* (citrus greening disease) and/or *Xanthomonas axonopodis* (citrus canker disease).

In one embodiment, the subject invention provides soil treatment compositions comprising a combination of microorganisms and/or their growth by-products. Also provided are methods of cultivating the microorganisms and/or growth by-products of the soil treatment composition.

In one embodiment, the soil treatment composition comprises a first microorganism and a second microorganism. More specifically, the first microorganism is a conidia-forming (i.e., spore-forming), non-pathogenic fungal strain, and the second microorganism is a spore-forming, non-pathogenic bacterial strain. Preferably, the composition comprises a *Trichoderma* spp. fungus and a *Bacillus* spp. bacterium, although other combinations are envisioned. In a specific embodiment, the composition comprises *Trichoderma harzianum* and *Bacillus amyloliquefaciens*.

In one embodiment, the composition can comprise from 1 to 99% *Trichoderma* by volume and from 99 to 1% *Bacillus* by volume. In preferred embodiments, the cell count ratio of *Trichoderma* to *Bacillus* is about 1:4.

In one embodiment, the composition can further comprise one or more additional beneficial microorganisms, such as, for example, for example, nitrogen fixers (e.g., *Azotobacter vinelandii*), potassium mobilizers (e.g., *Frateuria aurantia*), and others including, for example, *Myxococcus xanthus, Pseudomonas chlororaphis, Wickerhamomyces anomalus, Starmerella bombicola, Saccharomyces boulardii, Pichia occidentalis, Pichia kudriavzevii*, and/or *Meyerozyma guilliermondii*.

The species and ratio of microorganisms and other ingredients in the composition can be determined according to, for example, the plant being treated, the soil type where the plant is growing, the health of the plant at the time of treatment, as well as other factors. Thus, the composition can be customizable for any given crop.

The microorganisms of the subject soil treatment compositions can be obtained through cultivation processes ranging from small to large scale. These cultivation processes include, but are not limited to, submerged cultivation/fermentation, solid state fermentation (SSF), and modifications, hybrids and/or combinations thereof. In preferred embodiments, the microbes are cultivated using SSF or modifications thereof.

The soil treatment composition can comprise the substrate leftover from fermentation and/or purified or unpurified growth by-products, such as biosurfactants, enzymes and/or other metabolites. The microbes can be live or inactive, although in preferred embodiments, the microbes are live.

The composition is preferably formulated for application to soil, seeds, whole plants, or plant parts (including, but not limited to, roots, tubers, stems, flowers and leaves). In certain embodiments, the composition is formulated as, for example, liquid, dust, granules, microgranules, pellets, wettable powder, flowable powder, emulsions, microcapsules, oils, or aerosols.

To improve or stabilize the effects of the composition, it can be blended with suitable adjuvants and then used as such or after dilution, if necessary. In certain embodiments, the composition is formulated as a concentrated liquid preparation, or as dry powder or dry granules that can be mixed with water and other components to form a liquid product. In one embodiment, the composition comprises the substrate, microbes and growth by-products, blended together and dried to form powder or granules.

In one embodiment, the composition can comprise glucose (e.g., in the form of molasses), glycerol, glycerin, and/or other osmoticum substances, to promote osmotic pressure during storage and transport of the dry product.

In one embodiment, methods are provided for enhancing plant health, growth and/or yields wherein a combination of microorganisms is contacted with the plant and/or its surrounding environment. The method can comprise contacting a soil treatment composition of the subject invention, comprising a first microorganism and a second microorganism, and/or a growth by-product of one or both of these microorganisms, with the plant and/or its surrounding environment. Preferably, the first microorganism is a *Trichoderma* spp. fungus and the second microorganism is a *Bacillus* spp. bacterium.

In certain embodiments, the microorganisms of the composition work synergistically with one another to enhance health, growth and/or yields in plants.

In one embodiment, the method can enhance plant health, growth and/or yields by enhancing root health and growth. More specifically, in one embodiment, the methods can be used to improve the properties of the rhizosphere in which a plant's roots are growing, for example, the nutrient and/or moisture retention properties.

Additionally, in one embodiment, the method can be used to inoculate a plant's rhizosphere with one or more beneficial microorganisms. For example, in preferred embodiments, the microbes of the soil treatment composition can colonize the rhizosphere and provide multiple benefits to a plant whose roots are growing therein, including protection and nourishment.

Advantageously, in certain embodiments, the subject methods can be used to enhance health, growth and/or yields in plants having compromised immune health due to an infection from a pathogenic agent or from an environmental stressor, such as, for example, drought. Thus, in certain embodiments, the subject methods can also be used for improving the immune health, or immune response, of plants.

In certain embodiments, the soil treatment composition is contacted with a plant part. In a specific embodiment, the composition is contacted with one or more roots of the plant. The composition can be applied directly to the roots, e.g., by spraying or dunking the roots, and/or indirectly, e.g., by administering the composition to the soil in which the plant grows (e.g., the rhizosphere). The composition can be applied to the seeds of the plant prior to or at the time of planting, or to any other part of the plant and/or its surrounding environment.

The compositions and methods of the subject invention can be used either alone or in combination with other compounds and/or methods for efficiently enhancing plant health, growth and/or yields, and/or for supplementing the growth of the first and second microbes. For example, in one embodiment, the composition can include and/or can be applied concurrently with nutrients and/or micronutrients for enhancing plant and/or microbe growth, such as magnesium, phosphate, nitrogen, potassium, selenium, calcium, sulfur, iron, copper, and zinc; and/or one or more prebiotics, such as kelp extract, fulvic acid, chitin, humate and/or humic acid. The exact materials and the quantities thereof can be determined by a grower or an agricultural scientist having the benefit of the subject disclosure.

The compositions and methods can also be used in combination with other crop management systems. In one embodiment, the composition can optionally comprise, or be applied with, natural and/or chemical pesticides and/or repellants, such as, for example, any known commercial and/or homemade pesticide that is compatible with the combination of microorganisms being applied. In some embodiments, the composition can also comprise, or be applied with, for example, herbicides, fertilizers, and/or other compatible soil amendments, including commercial products containing nutrient sources (e.g., nitrogen-phosphorous-potassium (NPK) and/or micronutrients).

Advantageously, the present invention can be used without releasing large quantities of inorganic compounds into the environment. Additionally, the compositions and methods utilize components that are biodegradable and toxicologically safe. Thus, the present invention can be used as a "green" soil treatment.

BRIEF DESCRIPTION OF THE FIGURES

FIGS. 4A-4B show the average root weight of Hamlin orange trees in Polk County, Florida (A) and Valencia orange trees in Collier County, Florida (B), treated with a soil treatment composition according to an embodiment of the subject invention ("Rhizolizer™") and compared with untreated control (standard grower's practice) plants.

FIGS. 5A-5B show the percent of new shoot growth (A) and average shoot count (B) in young Valencia orange trees in Highlands County, Florida, treated with a soil treatment composition according to an embodiment of the subject invention ("Rhizolizer™") and compared with untreated control (standard grower's practice) plants.

FIGS. 6A-6B show increase in canopy density for mature Hamlin orange trees (A) and young Hamlin orange trees (B) in Highlands County, Florida, treated with a soil treatment composition according to an embodiment of the subject invention ("Rhizolizer™") and compared with untreated control (standard grower's practice) plants.

FIG. 7 shows the average caliper change in young Valencia orange trees in Highlands County, Florida, treated with a soil treatment composition according to an embodiment of the subject invention ("Rhizolizer™") and compared with untreated control (standard grower's practice) plants.

FIGS. 8A-8B show fruit weight for white grapefruit trees (A) and diameter for ruby red grapefruit trees (B) in Charlotte County, Florida, treated with a soil treatment composition according to an embodiment of the subject invention ("Rhizolizer™") and compared with untreated control (standard grower's practice) plants.

FIGS. 9A-9B show brix measurements for white grapefruits in Lucie County, Florida (A) and Charlotte County, Florida (B), treated with a soil treatment composition according to an embodiment of the subject invention ("Rhizolizer™") and compared with untreated control (standard grower's practice) plants.

FIGS. 10A-10B show weight boxes for Hamlin oranges in Lake County, Florida, treated with a soil treatment composition according to an embodiment of the subject invention ("Rhizolizer™") and compared with untreated control (standard grower's practice) plants.

FIGS. 11A-11B show total harvest yields in pounds solids for Hamlin oranges in Lake County, Florida, treated with a soil treatment composition according to an embodiment of the subject invention ("Rhizolizer™") and compared with untreated control (standard grower's practice) plants.

FIGS. 12A-12B show total harvest yields in pounds solids per box (A) and per acre (B) for Hamlin oranges in Polk County, Florida, treated with a soil treatment composition according to an embodiment of the subject invention ("Rhizolizer™") and compared with untreated control (standard grower's practice) plants.

FIGS. 13A-13B show the fruit yields (tons/acre, y-axis) for tomato plants treated with a soil treatment composition according to an embodiment of the subject invention ("Rhizolizer™") compared with untreated control, commercial check, *T. harzianum* and *B. amyloliquefaciens* combined with potato extract, *T. harzianum* and *B. amyloliquefaciens* combined with humate and molasses, and Terra Treat. The solid bars represent red fruit yield (harvestable fruit), whereas the black diamonds mark the total fruit yield for each treatment (A). A side-by-side comparison of harvestable fruit yield between untreated control and Rhizolizer™-kelp treatment is shown in (B).

FIGS. 14A-14B show increase in total marketable fruit yields in mT per acre (A) and degrees brix (B) for tomatoes in Fresno County, California, treated with a soil treatment composition according to an embodiment of the subject invention ("Rhizolizer™") and compared with untreated control (standard grower's practice) plants.

FIGS. 15A-15B shows dry root mass (g) of tomato plants treated with a soil treatment composition according to an embodiment of the subject invention ("Rhizolizer™"), compared with untreated control (standard grower's practice) plants. 15B shows tomato roots harvested from a tomato plant. The roots from the treated plant (bottom image) were visibly denser than the grower's practice plant (top image).

FIGS. 16A-16B show almond tree trunk diameter measurements when treated with a composition according to an embodiment of the subject invention. 16A shows the total change in almond tree trunk growth (diameter, mm), where the 6$^{th}$ treatment (Rhizolizer™) produced a change in trunk diameter of 1.25 mm. Untreated control only measured a 0.96 mm increase in trunk diameter. 16B shows the trunk growth over time of trees treated with the Rhizolizer™ treatment.

FIGS. 18A-18F show trial data comparing root mass increase (A, B), flower count increase (C), fruit count increase (D), melon count and yields per acre (E), and fruit weight and brix values (F) of watermelon plants treated with a composition according to an embodiment of the subject invention compared with untreated standard grower's practice plants.

FIG. 19A-19B show trial data comparing flower count (A) and average harvestable yield (19B) for cantaloupe plants treated with a composition according to an embodiment of the subject invention compared with untreated standard grower's practice plants.

FIGS. 20A-20B show potato plant emergence in Imperial County, California for yellow rose russet potatoes planted 5 weeks after planting (A) and multi cultivars 6 weeks after planting (B). The potatoes were treated with a soil treatment composition according to an embodiment of the subject invention ("Rhizolizer™"), and compared with untreated control (standard grower's practice) plants.

FIGS. 21A-21B shows potato yields Reveille Russet Fresh Market Baking potatoes in Hartley County, Texas (A) and Russet Burbank potatoes in Walworth County, Wisconsin (B). The potatoes were treated with a soil treatment composition according to an embodiment of the subject invention ("Rhizolizer™"), and compared with untreated control (standard grower's practice) plants.

FIG. 27 shows increase in fruit count for strawberries treated with a soil treatment composition according to an embodiment of the subject invention ("Rhizolizer™"), compared with untreated control (standard grower's practice) plants.

FIGS. 28A-28B show increase in mid-season fruit yields for strawberries. Average flats/acre (A) and total flats (B) were measured. The strawberries were treated with a soil treatment composition according to an embodiment of the subject invention ("Rhizolizer™"), and compared with untreated control (standard grower's practice) plants.

FIG. 31 shows increase in yield for corn plants treated with a soil treatment composition according to an embodiment of the subject invention ("Rhizolizer™"), either once at planting, once at mid-season, or twice (once at planting and once at mid-season). The three treatment groups were compared with untreated control (standard grower's practice) plants.

FIG. 32 shows increase in projected yield for two groups of cotton plants treated with a soil treatment composition according to an embodiment of the subject invention ("Rhizolizer™"), compared with untreated control (standard grower's practice) plants.

FIG. 33 shows increase in average chlorophyll (top left), average leaf width (top right), and average leaf length (bottom) for tobacco plants treated with a soil treatment composition according to an embodiment of the subject invention ("Rhizolizer™"), compared with untreated control (standard grower's practice) plants.

FIG. 34 shows increase in projected yield for peanut plants treated with a soil treatment composition according to an embodiment of the subject invention ("Rhizolizer™"), compared with untreated control (standard grower's practice) plants.

DETAILED DESCRIPTION OF THE INVENTION

Figure 1A:
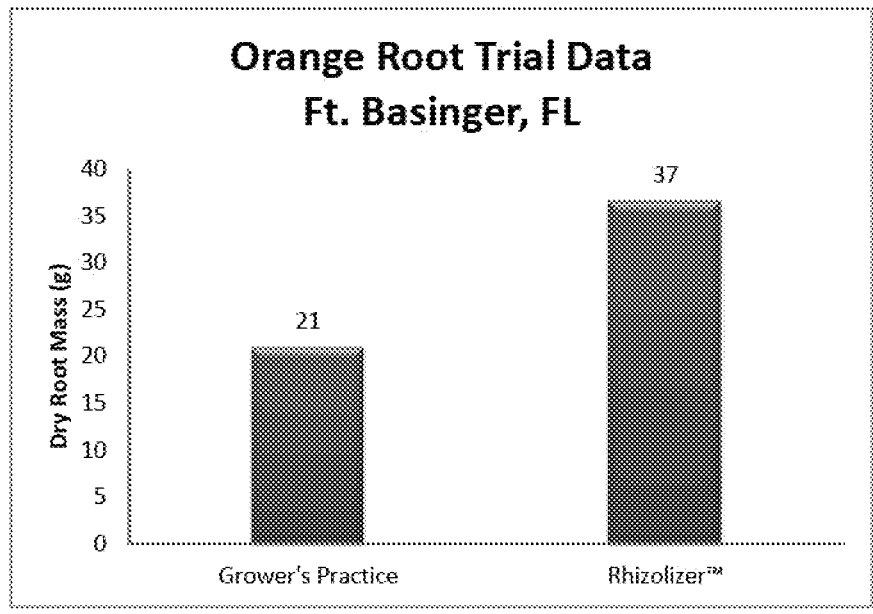
FIGS. 1A-1B show dry root mass (g) of orange plants in Ft. Basinger, Florida (A) and grapefruit plants in Ft. Pierce, Florida (B) treated with a soil treatment composition according to an embodiment of the subject invention ("Rhizolizer™") and compared with untreated control (standard grower's practice) plants.

The subject invention provides microbe-based products, as well as methods of using these microbe-based products in agricultural applications. Advantageously, the microbe-based products and methods of the subject invention are environmentally-friendly, non-toxic and cost-effective.

In preferred embodiments, the subject invention provides microbe-based soil treatment compositions and methods of their use for enhancing the health, growth and overall yields of crop plants by, for example, improving the nutrient and moisture retention properties of the rhizosphere. Advantageously, the soil treatment compositions of the subject invention can improve, for example, crop health, as well as crop growth and yields, even in situations where one or more of the plants in a crop are infected with a pathogen or where the immune health of the crop plants is otherwise compromised.

Selected Definitions

The subject invention utilizes "microbe-based compositions," meaning a composition that comprises components that were produced as the result of the growth of microorganisms or other cell cultures. Thus, the microbe-based composition may comprise the microbes themselves and/or by-products of microbial growth. The microbes may be in a vegetative state, in spore or conidia form, in hyphae form, in any other form of propagule, or a mixture of these. The microbes may be planktonic or in a biofilm form, or a mixture of both. The by-products of growth may be, for example, metabolites, cell membrane components, expressed proteins, and/or other cellular components. The microbes may be intact or lysed. In preferred embodiments, the microbes are present, with growth medium in which they were grown, in the microbe-based composition. The microbes may be present at, for example, a concentration of at least $1\times10^4$, $1\times10^5$, $1\times10^6$, $1\times10^7$, $1\times10^8$, $1\times10^9$, $1\times10^{10}$, $1\times10^{11}$, $1\times10^{12}$ or $1\times10^{13}$ or more CFU per gram or per ml of the composition.

The subject invention further provides "microbe-based products," which are products that are to be applied in practice to achieve a desired result. The microbe-based product can be simply the microbe-based composition harvested from the microbe cultivation process. Alternatively, the microbe-based product may comprise further ingredients that have been added. These additional ingredients can include, for example, stabilizers, buffers, appropriate carriers, such as water, salt solutions, or any other appropriate carrier, added nutrients to support further microbial growth, non-nutrient growth enhancers and/or agents that facilitate tracking of the microbes and/or the composition in the environment to which it is applied. The microbe-based product may also comprise mixtures of microbe-based compositions. The microbe-based product may also comprise one or more components of a microbe-based composition that have been processed in some way such as, but not limited to, filtering, centrifugation, lysing, drying, purification and the like.

As used herein, "harvested" in the context of fermentation of a microbe-based composition refers to removing some or all of the microbe-based composition from a growth vessel.

As used herein, a "biofilm" is a complex aggregate of microorganisms, wherein the cells adhere to each other and/or to surfaces. In some embodiments, the cells secrete a polysaccharide barrier that surrounds the entire aggregate. The cells in biofilms are physiologically distinct from planktonic cells of the same organism, which are single cells that can float or swim in liquid medium.

As used herein, an "isolated" or "purified" compound is substantially free of other compounds, such as cellular material, with which it is associated in nature. A purified or isolated polynucleotide (ribonucleic acid (RNA) or deoxyribonucleic acid (DNA)) is free of the genes or sequences that flank it in its naturally-occurring state. A purified or isolated polypeptide is free of the amino acids or sequences that flank it in its naturally-occurring state. "Isolated" in the context of a microbial strain means that the strain is removed from the environment in which it exists in nature. Thus, the isolated strain may exist as, for example, a biologically pure culture, or as spores (or other forms of the strain) in association with a carrier.

As used herein, a "biologically pure culture" is a culture that has been isolated from materials with which it is associated in nature. In a preferred embodiment, the culture has been isolated from all other living cells. In further preferred embodiments, the biologically pure culture has advantageous characteristics compared to a culture of the same microbe as it exists in nature. The advantageous characteristics can be, for example, enhanced production of one or more growth by-products.

In certain embodiments, purified compounds are at least 60% by weight the compound of interest. Preferably, the preparation is at least 75%, more preferably at least 90%, and most preferably at least 99%, by weight the compound of interest. For example, a purified compound is one that is at least 90%, 91%, 92%, 93%, 94%, 95%, 98%, 99%, or 100% (w/w) of the desired compound by weight. Purity is measured by any appropriate standard method, for example, by column chromatography, thin layer chromatography, or high-performance liquid chromatography (HPLC) analysis.

A "metabolite" refers to any substance produced by metabolism (e.g., a growth by-product) or a substance necessary for taking part in a particular metabolic process. Examples of metabolites include, but are not limited to, biosurfactants, biopolymers, enzymes, acids, solvents, alcohols, proteins, vitamins, minerals, microelements, and amino acids.

As used herein, "modulate" means to cause an alteration (e.g., increase or decrease).

Ranges provided herein are understood to be shorthand for all of the values within the range. For example, a range of 1 to 20 is understood to include any number, combination of numbers, or sub-range from the group consisting of 1, 2, 3, 4, 5, 6, 7, 8, 9, 10, 11, 12, 13, 14, 15, 16, 17, 18, 19, 20, as well as all intervening decimal values between the aforementioned integers such as, for example, 1.1, 1.2, 1.3, 1.4, 1.5, 1.6, 1.7, 1.8, and 1.9. With respect to sub-ranges, "nested sub-ranges" that extend from either end point of the range are specifically contemplated. For example, a nested sub-range of an exemplary range of 1 to 50 may comprise 1 to 10, 1 to 20, 1 to 30, and 1 to 40 in one direction, or 50 to 40, 50 to 30, 50 to 20, and 50 to 10 in the other direction.

As used herein, "reduce" refers to a negative alteration, and the term "increase" refers to a positive alteration, each of at least 1%, 5%, 10%, 25%, 50%, 75%, or 100%.

As used herein, "reference" refers to a standard or control condition.

As used herein, "surfactant" refers to a compound that lowers the surface tension (or interfacial tension) between two liquids or between a liquid and a solid. Surfactants act as, e.g., detergents, wetting agents, emulsifiers, foaming agents, and dispersants. A "biosurfactant" is a surfactant produced by a living organism.

As used herein, "agriculture" means the cultivation and breeding of plants, algae and/or fungi for food, fiber, biofuel, medicines, cosmetics, supplements, ornamental purposes and other uses. According to the subject invention, agriculture can also include horticulture, landscaping, gardening, plant conservation, orcharding and arboriculture. Further included in agriculture is the care, monitoring and maintenance of soil.

As used herein, "enhancing" means improving or increasing. For example, enhanced plant health means improving the plant's ability grow and thrive, which includes the plant's ability to ward off pests and/or diseases, and to survive environmental stressors, such as droughts and/or overwatering. Enhanced plant growth means increasing the size and/or mass of a plant, and/or improving the ability of the plant to reach a desired size and/or mass. Enhanced yields mean improving the quantity, quality (e.g., taste, texture) and/or size of end products produced by a plant.

As used herein "preventing" or "prevention" of a situation or occurrence means delaying, inhibiting, suppressing, forestalling, and/or minimizing the onset, extensiveness or progression of the situation or occurrence. Prevention can include, but does not require, indefinite, absolute or complete prevention, meaning the sign or symptom may still develop at a later time. Prevention can include reducing the severity of the onset of such a disease, condition or disorder, and/or inhibiting the progression of the condition or disorder to a more severe condition or disorder.

As used herein, the term "control" used in reference to a pest means killing, disabling, immobilizing, or reducing population numbers of a pest, or otherwise rendering the pest substantially incapable of causing harm.

As used herein, a "pest" is any organism, other than a human, that is destructive, deleterious and/or detrimental to humans or human concerns (e.g., agriculture, horticulture). In some, but not all instances, a pest may be a pathogenic organism. Pests may cause or be a vector for infections, infestations and/or disease, or they may simply feed on or cause other physical harm to living tissue. Pests may be single- or multi-cellular organisms, including but not limited to, viruses, fungi, bacteria, parasites, and/or nematodes.

As used herein, a "soil amendment" or a "soil conditioner" is any compound, material, or combination of compounds or materials that are added into soil to enhance the physical properties of the soil. Soil amendments can include organic and inorganic matter, and can further include, for example, fertilizers, pesticides and/or herbicides. Nutrient-rich, well-draining soil is essential for the growth and health of plants, and thus, soil amendments can be used for enhancing the growth and health of plants by altering the nutrient and moisture content of soil. Soil amendments can also be used for improving many different qualities of soil, including but not limited to, soil structure (e.g., preventing compaction); improving the nutrient concentration and storage capabilities; improving water retention in dry soils; and improving drainage in waterlogged soils.

As used herein, "environmental stressor" refers to an abiotic, or non-living, condition that has a negative impact on a living organism in a specific environment. The environmental stressor must influence the environment beyond its normal range of variation to adversely affect the population performance or individual physiology of the organism in a significant way. Examples of environmental stressors include, but are not limited to, drought, extreme temperatures, flood, high winds, natural disasters, soil pH changes, high radiation, compaction of soil, pollution, and others.

The transitional term "comprising," which is synonymous with "including," or "containing," is inclusive or open-ended and does not exclude additional, unrecited elements or method steps. By contrast, the transitional phrase "consisting of" excludes any element, step, or ingredient not specified in the claim. The transitional phrase "consisting essentially of" limits the scope of a claim to the specified materials or steps "and those that do not materially affect the basic and novel characteristic(s)" of the claimed invention. Use of the term "comprising" contemplates other embodiments that "consist" or "consist essentially of" the recited component(s).

Unless specifically stated or obvious from context, as used herein, the term "or" is understood to be inclusive. Unless specifically stated or obvious from context, as used herein, the terms "a," "and" and "the" are understood to be singular or plural.

Unless specifically stated or obvious from context, as used herein, the term "about" is understood as within a range of normal tolerance in the art, for example within 2 standard deviations of the mean. About can be understood as within 10%, 9%, 8%, 7%, 6%, 5%, 4%, 3%, 2%, 1%, 0.5%, 0.1%, 0.05%, or 0.01% of the stated value.

The recitation of a listing of chemical groups in any definition of a variable herein includes definitions of that variable as any single group or combination of listed groups. The recitation of an embodiment for a variable or aspect herein includes that embodiment as any single embodiment or in combination with any other embodiments or portions thereof.

All references cited herein are hereby incorporated by reference in their entirety.

Soil Treatment Compositions

In one embodiment, the subject invention provides soil treatment compositions comprising a combination of microorganisms and/or their growth by-products. The soil treatment composition can be used to enhance plant health, growth and/or yields, and in some embodiments, even in plants that have been infected by a pathogen or disease. More specifically, the subject compositions can be used to enhance the root growth and health, and/or to enhance the immune health of a plant. In certain embodiments, the soil treatment composition can also be used to inoculate plant roots with one or more beneficial microorganisms.

Advantageously, the microbe-based compositions according to the subject invention are non-toxic and can be applied in high concentrations without causing irritation to, for example, the skin or digestive tract of a human or other non-pest animal. Thus, the subject invention is particularly useful where application of the microbe-based compositions occurs in the presence of living organisms, such as growers and livestock.

In one embodiment, the soil treatment composition can comprise a first microorganism, which is preferably a conidia-forming (spore-forming) fungal strain, and a second microorganism, which is preferably a spore-forming bacterial strain. Preferably, the first microorganism is a *Trichoderma* spp. fungus and the second microorganism is a spore-forming *Bacillus* spp. bacterium, although other combinations are envisioned. In certain embodiments, the composition comprises *Trichoderma harzianum* and *Bacillus amyloliquefaciens*. In a specific embodiment, the strain of *B. amyloliquefaciens* is *B. amyloliquefaciens* subsp. *locus*.

A culture of *Bacillus amyloliquefaciens* subsp *locus* microbe useful according to the subject invention, has been deposited with the Northern Regional Research Laboratory (NRRL) Culture Collection, USDA, ARS, NCAUR, MPM, 1815 N. University St., PEORIA, IL 61604, USA. The microorganism was deposited on Feb. 26, 2020 and was assigned accession number NRRL B-67928 by the depository.

A culture of *Wickerhamomyces anomalus* microbe useful according to the subject invention, has been deposited with the Northern Regional Research Laboratory (NRRL) Culture Collection, USDA, ARS, NCAUR, MPM, 1815 N. University St., PEORIA, IL 61604, USA. The microorgainsm was deposited on May 6, 2021 and was assigned accession number NRRL Y-68030 by the depository.

A culture of *Bacillus subtilis* B4 microbe useful according to the subject invention, has been deposited with the Northern Regional Research Laboratory (NRRL) Culture Collection, USDA, ARS, NCAUR, MPM, 1815 N. University St., PEORIA, IL 61604, USA.

The microorgainsm was deposited on May 6, 2021 and was assigned accession number NRRL B-68031 by the depository.

Each of the subject cultures has been deposited under conditions that assure that access to the culture will be available during the pendency of this patent application to one determined by the Commissioner of Patents and Trademarks to be entitled thereto under 37 CFR 1.14 and 35 U.S.C 122. Each deposit is available as required by foreign patent laws in countries wherein counterparts of the subject application, or its progeny, are filed. However, it should be understood that the availability of a deposit does not constitute a license to practice the subject invention in derogation of patent rights granted by governmental action.

Further, the subject culture deposits will be stored and made available to the public in accord with the provisions of the Budapest Treaty for the Deposit of Microorganisms, i.e., each deposit will be stored with all the care necessary to keep it viable and uncontaminated for a period of at least five years after the most recent request for the furnishing of a sample of the deposit, and in any case, for a period of at least 30 (thirty) years after the date of deposit or for the enforceable life of any patent that may issue disclosing the culture. The depositor acknowledges the duty to replace the deposit should the depository be unable to furnish a sample when requested, due to the condition of the deposit. All restrictions on the availability to the public of each of the subject culture deposits will be irrevocably removed upon the granting of a patent disclosing it.

In one embodiment, the composition can comprise from 1 to 99% *Trichoderma* by weight and from 99 to 1% *Bacillus* by weight. In some embodiments, the cell count ratio of *Trichoderma* to *Bacillus* is about 1:9 to about 9:1, about 1:8 to about 8:1, about 1:7 to about 7:1, about 1:6 to about 6:1, about 1:5 to about 5:1 or about 1:4 to about 4:1.

In one embodiment, the microorganisms of the subject composition comprise about 5 to 20% of the total composition by weight, or about 8 to 15%, or about 10 to 12%. In one embodiment, the composition comprises about $1 \times 10^6$ to $1 \times 10^{12}$, $1 \times 10^7$ to $1 \times 10^{11}$, $1 \times 10^8$ to $1 \times 10^{10}$, or $1 \times 10^9$ CFU/ml of *Trichoderma*. In one specific embodiment, the composition comprises about $1\times10^6$ to $1\times10^{12}$, $1\times10^7$ to $1\times10^{11}$, $1\times10^8$ to $1\times10^{10}$, or $1\times10^9$ CFU/ml of *Bacillus*.

In some embodiments, the composition can further comprise one or more additional microbes. In one embodiment, the additional microbes can comprise one or more of, for example, a mycobacterium and/or other type of bacteria, a yeast and/or a fungus. In an exemplary embodiment, a mycobacterium is included, wherein the mycobacterium is *Myxococcus xanthus*.

In certain embodiments, the additional microbes are capable of fixing, solubilizing and/or mobilizing nitrogen, potassium, phosphorous (or phosphate) and/or other micronutrients in soil. In one embodiment, a nitrogen-fixing bacteria can be included, such as, for example, *Azotobacter vinelandii*. In another embodiment, a potassium-mobilizing bacteria can be included, such as, for example, *Frateuria aurantia*.

Other additional microbes can include, for example, *Pseudomonas chlororaphis, Wickerhamomyces anomalus, Starmerella bombicola, Saccharomyces boulardii, Pichia occidentalis, Pichia kudriavzevii*, and/or *Meyerozyma guilliermondii*.

In a specific embodiment, the one or more additional microbes are added at a concentration of $1\times10^8$ to $1\times10^{11}$, or $1\times10^9$ to $1\times10^{10}$ CFU/ml each.

The species and ratio of microorganisms and other ingredients in the composition can be customized according to, for example, the plant being treated, the soil type where the plant is growing, the health of the plant at the time of treatment, as well as other factors.

The microbes and microbe-based compositions of the subject invention have a number of beneficial properties that are useful for enhancing plant health, growth and/or yields. For example, the compositions can comprise products resulting from the growth of the microorganisms, such as biosurfactants, proteins and/or enzymes, either in purified or crude form.

In one embodiment, the microorganisms of the subject composition are capable of producing a biosurfactant. In another embodiment, biosurfactants can be produced separately by other microorganisms and added to the composition, either in purified form or in crude form. Crude form biosurfactants can comprise, for example, biosurfactants and other products of cellular growth in the leftover fermentation medium resulting from cultivation of a biosurfactant-producing microbe. This crude form biosurfactant composition can comprise from about 0.001% to about 90%, about 25% to about 75%, about 30% to about 70%, about 35% to about 65%, about 40% to about 60%, about 45% to about 55%, or about 50% pure biosurfactant.

Biosurfactants form an important class of secondary metabolites produced by a variety of microorganisms such as bacteria, fungi, and yeasts. As amphiphilic molecules, microbial biosurfactants reduce the surface and interfacial tensions between the molecules of liquids, solids, and gases. Furthermore, the biosurfactants according to the subject invention are biodegradable, have low toxicity, are effective in solubilizing and degrading insoluble compounds in soil and can be produced using low cost and renewable resources. They can inhibit adhesion of undesirable microorganisms to a variety of surfaces, prevent the formation of biofilms, and can have powerful emulsifying and demulsifying properties. Furthermore, the biosurfactants can also be used to improve wettability and to achieve even solubilization and/or distribution of fertilizers, nutrients, and water in the soil.

Biosurfactants according to the subject methods can be selected from, for example, low molecular weight glycolipids (e.g., sophorolipids, cellobiose lipids, rhamnolipids, mannosylerythritol lipids and trehalose lipids), lipopeptides (e.g., surfactin, iturin, fengycin, arthrofactin and lichenysin), flavolipids, phospholipids (e.g., cardiolipins), and high molecular weight polymers such as lipoproteins, lipopolysaccharide-protein complexes, and polysaccharide-protein-fatty acid complexes.

The composition can comprise one or more biosurfactants at a concentration of 0.001% to 10%, 0.01% to 5%, 0.05% to 2%, and/or from 0.1% to 1%.

Advantageously, in accordance with the subject invention, the soil treatment composition may comprise the medium in which each of the microorganism were grown. The composition may be, for example, at least, by weight, 1%, 5%, 10%, 25%, 50%, 75%, or 100% growth medium.

The fermentation medium can contain a live and/or an inactive culture, purified or crude form growth by-products, such as biosurfactants, enzymes, and/or other metabolites, and/or any residual nutrients. The amount of biomass in the composition, by weight, may be, for example, anywhere from about 0.01% to 100%, about 1% to 90%, about 5% to about 80%, or about 10% to about 75%.

The product of fermentation may be used directly, with or without extraction or purification. If desired, extraction and purification can be easily achieved using standard extraction and/or purification methods or techniques described in the literature.

The microorganisms in the soil treatment composition may be in an active or inactive form, or in the form of vegetative cells, reproductive spores, mycelia, hyphae, conidia or any other form of microbial propagule. The composition may also contain a combination of any of these microbial forms.

In one embodiment, different species of microorganism are grown separately and then mixed together to produce the soil treatment composition. In one embodiment, microorganisms can be co-cultivated, for example, *B. amyloliquefaciens* and *M. xanthus*.

In one embodiment, the composition is preferably formulated for application to soil, seeds, whole plants, or plant parts (including, but not limited to, roots, tubers, stems, flowers and leaves). In certain embodiments, the composition is formulated as, for example, liquid, dust, granules, microgranules, pellets, wettable powder, flowable powder, emulsions, microcapsules, oils, or aerosols.

To improve or stabilize the effects of the composition, it can be blended with suitable adjuvants and then used as such or after dilution, if necessary. In preferred embodiments, the composition is formulated as a liquid, a concentrated liquid, or as dry powder or granules that can be mixed with water and other components to form a liquid product.

In one embodiment, the composition can comprise glucose (e.g., in the form of molasses), glycerol and/or glycerin, as, or in addition to, an osmoticum substance, to promote osmotic pressure during storage and transport of the dry product.

The compositions can be used either alone or in combination with other compounds and/or methods for efficiently enhancing plant health, growth and/or yields, and/or for supplementing the growth of the first and second microbes. For example, in one embodiment, the composition can include and/or can be applied concurrently with nutrients and/or micronutrients for enhancing plant and/or microbe growth, such as magnesium, phosphate, nitrogen, potassium, selenium, calcium, sulfur, iron, copper, and zinc; and/or one or more prebiotics, such as kelp extract, fulvic acid, chitin, humate and/or humic acid. The exact materials and the quantities thereof can be determined by a grower or an agricultural scientist having the benefit of the subject disclosure.

The compositions can also be used in combination with other agricultural compounds and/or crop management systems. In one embodiment, the composition can optionally comprise, or be applied with, for example, natural and/or chemical pesticides, repellants, herbicides, fertilizers, water treatments, non-ionic surfactants and/or soil amendments. Preferably, however, the composition does not comprise and/or is not used with benomyl, dodecyl dimethyl ammonium chloride, hydrogen dioxide/peroxyacetic acid, imazilil, propiconazole, tebuconazole, or triflumizole.

If the composition is mixed with compatible chemical additives, the chemicals are preferably diluted with water prior to addition of the subject composition.

Further components can be added to the composition, for example, buffering agents, carriers, other microbe-based compositions produced at the same or different facility, viscosity modifiers, preservatives, nutrients for microbe growth, tracking agents, biocides, other microbes, surfactants, emulsifying agents, lubricants, solubility controlling agents, pH adjusting agents, preservatives, stabilizers and ultra-violet light resistant agents.

The pH of the microbe-based composition should be suitable for the microorganism of interest. In a preferred embodiment, the pH of the composition is about 3.5 to 7.0, about 4.0 to 6.5, or about 5.0.

Optionally, the composition can be stored prior to use. The storage time is preferably short. Thus, the storage time may be less than 60 days, 45 days, 30 days, 20 days, 15 days, 10 days, 7 days, 5 days, 3 days, 2 days, 1 day, or 12 hours. In a preferred embodiment, if live cells are present in the product, the product is stored at a cool temperature such as, for example, less than 20° C., 15° C., 10° C., or 5° C.

The microbe-based compositions may be used without further stabilization, preservation, and storage, however. Advantageously, direct usage of these microbe-based compositions preserves a high viability of the microorganisms, reduces the possibility of contamination from foreign agents and undesirable microorganisms, and maintains the activity of the by-products of microbial growth.

In other embodiments, the composition (microbes, growth medium, or microbes and medium) can be placed in containers of appropriate size, taking into consideration, for example, the intended use, the contemplated method of application, the size of the fermentation vessel, and any mode of transportation from microbe growth facility to the location of use. Thus, the containers into which the microbe-based composition is placed may be, for example, from 1 pint to 1,000 gallons or more. In certain embodiments the containers are 1 gallon, 2 gallons, 5 gallons, 25 gallons, or larger.

Growth of Microbes According to the Subject Invention

The subject invention utilizes methods for cultivation of microorganisms and production of microbial metabolites and/or other by-products of microbial growth. The subject invention further utilizes cultivation processes that are suitable for cultivation of microorganisms and production of microbial metabolites on a desired scale. These cultivation processes include, but are not limited to, submerged cultivation/fermentation, solid state fermentation (SSF), and modifications, hybrids and/or combinations thereof.

As used herein "fermentation" refers to cultivation or growth of cells under controlled conditions. The growth could be aerobic or anaerobic. In preferred embodiments, the microorganisms are grown using SSF and/or modified versions thereof.

In one embodiment, the subject invention provides materials and methods for the production of biomass (e.g., viable cellular material), extracellular metabolites (e.g. small molecules and excreted proteins), residual nutrients and/or intracellular components (e.g. enzymes and other proteins).

The microbe growth vessel used according to the subject invention can be any fermenter or cultivation reactor for industrial use. In one embodiment, the vessel may have functional controls/sensors or may be connected to functional controls/sensors to measure important factors in the cultivation process, such as pH, oxygen, pressure, temperature, humidity, microbial density and/or metabolite concentration.

In a further embodiment, the vessel may also be able to monitor the growth of microorganisms inside the vessel (e.g., measurement of cell number and growth phases). Alternatively, a daily sample may be taken from the vessel and subjected to enumeration by techniques known in the art, such as dilution plating technique. Dilution plating is a simple technique used to estimate the number of organisms in a sample. The technique can also provide an index by which different environments or treatments can be compared.

In one embodiment, the method includes supplementing the cultivation with a nitrogen source. The nitrogen source can be, for example, potassium nitrate, ammonium nitrate ammonium sulfate, ammonium phosphate, ammonia, urea, and/or ammonium chloride. These nitrogen sources may be used independently or in a combination of two or more.

The method can provide oxygenation to the growing culture. One embodiment utilizes slow motion of air to remove low-oxygen containing air and introduce oxygenated air. In the case of submerged fermentation, the oxygenated air may be ambient air supplemented daily through mechanisms including impellers for mechanical agitation of liquid, and air spargers for supplying bubbles of gas to liquid for dissolution of oxygen into the liquid.

The method can further comprise supplementing the cultivation with a carbon source. The carbon source is typically a carbohydrate, such as glucose, sucrose, lactose, fructose, trehalose, mannose, mannitol, and/or maltose; organic acids such as acetic acid, fumaric acid, citric acid, propionic acid, malic acid, malonic acid, and/or pyruvic acid; alcohols such as ethanol, propanol, butanol, pentanol, hexanol, isobutanol, and/or glycerol; fats and oils such as soybean oil, canola oil, rice bran oil, olive oil, corn oil, sesame oil, and/or linseed oil; etc. These carbon sources may be used independently or in a combination of two or more.

In one embodiment, growth factors and trace nutrients for microorganisms are included in the medium. This is particularly preferred when growing microbes that are incapable of producing all of the vitamins they require. Inorganic nutrients, including trace elements such as iron, zinc, copper, manganese, molybdenum and/or cobalt may also be included in the medium. Furthermore, sources of vitamins, essential amino acids, and microelements can be included, for example, in the form of flours or meals, such as corn flour, or in the form of extracts, such as yeast extract, potato extract, beef extract, soybean extract, banana peel extract, and the like, or in purified forms. Amino acids such as, for example, those useful for biosynthesis of proteins, can also be included.

In one embodiment, inorganic salts may also be included. Usable inorganic salts can be potassium dihydrogen phosphate, dipotassium hydrogen phosphate, disodium hydrogen phosphate, magnesium sulfate, magnesium chloride, iron sulfate, iron chloride, manganese sulfate, manganese chloride, zinc sulfate, lead chloride, copper sulfate, calcium chloride, sodium chloride, calcium carbonate, and/or sodium carbonate. These inorganic salts may be used independently or in a combination of two or more.

In some embodiments, the method for cultivation may further comprise adding additional acids and/or antimicrobials in the medium before, and/or during the cultivation process. Antimicrobial agents or antibiotics are used for protecting the culture against contamination.

Additionally, antifoaming agents may also be added to prevent the formation and/or accumulation of foam during submerged cultivation.

The pH of the mixture should be suitable for the microorganism of interest. Buffers, and pH regulators, such as carbonates and phosphates, may be used to stabilize pH near a preferred value. When metal ions are present in high concentrations, use of a chelating agent in the medium may be necessary.

The microbes can be grown in planktonic form or as biofilm. In the case of biofilm, the vessel may have within it a substrate upon which the microbes can be grown in a biofilm state. The system may also have, for example, the capacity to apply stimuli (such as shear stress) that encourages and/or improves the biofilm growth characteristics.

In one embodiment, the method for cultivation of microorganisms is carried out at about 5° to about 100° C., preferably, 15 to 60° C., more preferably, 25 to 50° C. In a further embodiment, the cultivation may be carried out continuously at a constant temperature. In another embodiment, the cultivation may be subject to changing temperatures.

In one embodiment, the equipment used in the method and cultivation process is sterile. The cultivation equipment such as the reactor/vessel may be separated from, but connected to, a sterilizing unit, e.g., an autoclave. The cultivation equipment may also have a sterilizing unit that sterilizes in situ before starting the inoculation. Air can be sterilized by methods know in the art. For example, the ambient air can pass through at least one filter before being introduced into the vessel. In other embodiments, the medium may be pasteurized or, optionally, no heat at all added, where the use of low water activity and low pH may be exploited to control undesirable bacterial growth.

In one embodiment, the subject invention further provides a method for producing microbial metabolites such as, for example, biosurfactants, enzymes, proteins, ethanol, lactic acid, beta-glucan, peptides, metabolic intermediates, polyunsaturated fatty acid, and lipids, by cultivating a microbe strain of the subject invention under conditions appropriate for growth and metabolite production; and, optionally, purifying the metabolite. The metabolite content produced by the method can be, for example, at least 20%, 30%, 40%, 50%, 60%, 70%, 80%, or 90%.

The microbial growth by-product produced by microorganisms of interest may be retained in the microorganisms or secreted into the growth medium. The medium may contain compounds that stabilize the activity of microbial growth by-product.

The biomass content of the fermentation medium may be, for example, from 5 g/l to 180 g/l or more, or from 10 g/l to 150 g/l.

The cell concentration may be, for example, at least $1\times10^6$ to $1\times10^{12}$, $1\times10^7$ to $1\times10^{11}$, $1\times10^8$ to $1\times10^{10}$, or $1\times10^9$ CFU/ml.

The method and equipment for cultivation of microorganisms and production of the microbial by-products can be performed in a batch, a quasi-continuous process, or a continuous process.

In one embodiment, all of the microbial cultivation composition is removed upon the completion of the cultivation (e.g., upon, for example, achieving a desired cell density, or density of a specified metabolite). In this batch procedure, an entirely new batch is initiated upon harvesting of the first batch.

In another embodiment, only a portion of the fermentation product is removed at any one time. In this embodiment, biomass with viable cells, spores, conidia, hyphae and/or mycelia remains in the vessel as an inoculant for a new cultivation batch. The composition that is removed can be a cell-free medium or contain cells, spores, or other reproductive propagules, and/or a combination of thereof. In this manner, a quasi-continuous system is created.

Advantageously, the method does not require complicated equipment or high energy consumption. The microorganisms of interest can be cultivated at small or large scale on site and utilized, even being still-mixed with their media.

Advantageously, the microbe-based products can be produced in remote locations. The microbe growth facilities may operate off the grid by utilizing, for example, solar, wind and/or hydroelectric power.

Microbial Strains

The microorganisms useful according to the subject invention can be, for example, non-plant-pathogenic strains of bacteria, yeast and/or fungi. These microorganisms may be natural, or genetically modified microorganisms. For example, the microorganisms may be transformed with specific genes to exhibit specific characteristics. The microorganisms may also be mutants of a desired strain. As used herein, "mutant" means a strain, genetic variant or subtype of a reference microorganism, wherein the mutant has one or more genetic variations (e.g., a point mutation, missense mutation, nonsense mutation, deletion, duplication, frameshift mutation or repeat expansion) as compared to the reference microorganism. Procedures for making mutants are well known in the microbiological art. For example, UV mutagenesis and nitrosoguanidine are used extensively toward this end.

In one embodiment, the microorganism is a yeast or fungus. Yeast and fungus species suitable for use according to the current invention, include *Aureobasidium* (e.g., *A. pullulans*), *Blakeslea*, *Candida* (e.g., *C. apicola, C. bombicola, C. nodaensis*), *Cryptococcus*, *Debaryomyces* (e.g., *D. hansenii*), *Entomophthora*, *Hanseniaspora*, (e.g., *H. uvarum*), *Hansenula*, *Issatchenkia*, *Kluyveromyces* (e.g., *K. phaffii*), *Mortierella*, *Mycorrhiza*, *Penicillium*, *Phycomyces*, *Pichia* (e.g., *P. anomala, P. guilliermondii, P. occidentalis, P. kudriavzevii*), *Pleurotus* spp. (e.g., *P. ostreatus*), *Pseudozyma* (e.g., *P. aphidis*), *Saccharomyces* (e.g., *S. boulardii* sequela, *S. cerevisiae, S. torula*), *Starmerella* (e.g., *S. bombicola*), *Torulopsis*, *Trichoderma* (e.g., *T. reesei, T. harzianum, T. hamatum, T. viride*), *Ustilago* (e.g., *U. maydis*), *Wickerhamomyces* (e.g., *W. anomalus*), *Williopsis* (e.g., *W. mrakii*), *Zygosaccharomyces* (e.g., *Z. bailii*), and others.

In a preferred embodiment, the microorganism is a spore-producing *Trichoderma* spp. fungus. In a specific preferred embodiment, the microorganism is *Trichoderma harzianum*.

Certain species of *Trichoderma* are useful when added to soil, where they can multiply and grow in close association with plants' roots. They are capable of partially protecting the roots from invasion by other plant pathogenic fungi and other microbial and animal pests, in addition to helping to stimulate plant growth.

*Trichoderma* can establish strong and long-lasting colonization of root surfaces, penetrating into the epidermis and shallow subsurface cells. These root-microorganism associations cause substantial changes to the plant proteome and metabolism. They produce and/or release a variety of compounds that induce localized or systemic resistance responses, causing a lack of pathogenicity to plants.

Additionally, plants are protected from numerous classes of plant pathogen by responses that are similar to systemic acquired resistance and rhizobacteria-induced systemic resistance. *Trichoderma* spp. can effectively reduce diseases caused by some soil-borne plant pathogens. For example, the species *T. harzianum, T. hamatum,* and *T. viride* have fungicidal activity against *Sclerotium, Rhizoctonia, Solani, Pythium, Fusarium, Cercospora, Ralstonia, Fragaria, Rhizopus, Botrytis, Colletotrichum, Magnaporthe,* and many others. Moreover, some strains of *Trichoderma* are able to effectively suppress the growth of some viral and bacterial plant and soil pathogens, as well as produce some significant nematocidal effects.

In addition to protecting plants from pathogens and pests, root colonization by *Trichoderma* spp. can enhance root growth and development, crop productivity, resistance to abiotic stresses, and bioavailability of nutrients.

In certain embodiments, the microorganisms are bacteria, including Gram-positive and Gram-negative bacteria. The bacteria may be, for example *Agrobacterium* (e.g., *A. radiobacter*), *Azotobacter* (*A. vinelandii, A. chroococcum*), *Azospirillum* (e.g., *A. brasiliensis*), *Bacillus* (e.g., *B. amyloliquefaciens, B. circulans, B. firmus, B. laterosporus, B. lichenmformis, B. megaterium, Bacillus mucilaginosus, B. subtilis*), *Frateuria* (e.g., *F. aurantia*), *Microbacterium* (e.g., *M. laevaniformans*), myxobacteria (e.g., *Myxococcus xanthus, Stignatella aurantiaca, Sorangium cellulosum, Minicystis rosea*), *Pantoea* (e.g., *P. agglomerans*), *Pseudomonas* (e.g., *P. aeruginosa, P. chlororaphis* subsp. *aureofaciens* (*Kluyver*), *P. putida*), *Rhizobium* spp., *Rhodospirillum* (e.g., *R. rubrum*), *Sphingomonas* (e.g., *S. paucimobilis*), and/or *Thiobacillus thiooxidans* (*Acidothiobacillus thiooxidans*).

In a specific embodiment, the microorganism is *Bacillus amyloliquefaciens*, such as, for example, the strain *B. amyloliquefaciens* subsp. *locus*. In some embodiments, the *Bacillus* microbe can solubilize phosphorus compounds in the soil.

In one embodiment, the microorganism is a mycobacterium, or slime-forming bacteria. Specifically, in one embodiment, the mycobacterium is a *Myxococcus* spp. bacterium, e.g., *M. xanthus.*

In certain embodiments, the microorganism is one that is capable of fixing and/or solubilizing nitrogen, potassium, phosphorous and/or other micronutrients in soil.

In one embodiment, the microorganism is a nitrogen-fixing microorganism, or a diazotroph, selected from species of, for example, *Azospirillum, Azotobacter,* Chlorobiaceae, Cyanothece, *Frankia, Klebsiella, rhizobia, Trichodesmium,* and some Archaea. In a specific embodiment, the nitrogen-fixing bacteria is *Azotobacter vinelandii.*

In another embodiment, the microorganism is a potassium-mobilizing microorganism, or KMB, selected from, for example, *Bacillus mucilaginosus, Frateuria aurantia* or *Glomus mosseae.* In a specific embodiment, the potassium-mobilizing microorganism is *Frateuria aurantia.*

Additional microbes can include, for example, *Pseudomonas chlororaphis, Wickerhamomyces anomalus, Starmerella bombicola, Saccharomyces boulardii, Pichia occidentalis, Pichia kudriavzevii,* and/or *Meyerozyma guilliermondii.*

In one embodiment, the combination of microorganisms applied to a plant and/or its surrounding environment is customized for a given plant and/or environment. Advantageously, in some embodiments, the combination of microbes work synergistically with one another to enhance plant health, growth and/or yields.

Preparation of Microbe-Based Products

One microbe-based product of the subject invention is simply the fermentation medium containing the microorganisms and/or the microbial metabolites produced by the microorganisms and/or any residual nutrients. The product of fermentation may be used directly without extraction or purification. If desired, extraction and purification can be easily achieved using standard extraction and/or purification methods or techniques described in the literature.

The microorganisms in the microbe-based products may be in an active or inactive form, or in the form of vegetative cells, reproductive spores, conidia, mycelia, hyphae, or any other form of microbial propagule. The microbe-based products may also contain a combination of any of these forms of a microorganism.

In one embodiment, different strains of microbe are grown separately and then mixed together to produce the microbe-based product. The microbes can, optionally, be blended with the medium in which they are grown and dried prior to mixing.

In one embodiment, the different strains are not mixed together, but are applied to a plant and/or its environment as separate microbe-based products.

The microbe-based products may be used without further stabilization, preservation, and storage. Advantageously, direct usage of these microbe-based products preserves a high viability of the microorganisms, reduces the possibility of contamination from foreign agents and undesirable microorganisms, and maintains the activity of the by-products of microbial growth.

Upon harvesting the microbe-based composition from the growth vessels, further components can be added as the harvested product is placed into containers or otherwise transported for use. The additives can be, for example, buffers, carriers, other microbe-based compositions produced at the same or different facility, viscosity modifiers, preservatives, nutrients for microbe growth, surfactants, emulsifying agents, lubricants, solubility controlling agents, tracking agents, solvents, biocides, antibiotics, pH adjusting agents, chelators, stabilizers, ultra-violet light resistant agents, other microbes and other suitable additives that are customarily used for such preparations.

In one embodiment, buffering agents including organic and amino acids or their salts, can be added. Suitable buffers include citrate, gluconate, tartarate, malate, acetate, lactate, oxalate, aspartate, malonate, glucoheptonate, pyruvate, galactarate, glucarate, tartronate, glutamate, glycine, lysine, glutamine, methionine, cysteine, arginine and a mixture thereof. Phosphoric and phosphorous acids or their salts may also be used. Synthetic buffers are suitable to be used but it is preferable to use natural buffers such as organic and amino acids or their salts listed above.

In a further embodiment, pH adjusting agents include potassium hydroxide, ammonium hydroxide, potassium carbonate or bicarbonate, hydrochloric acid, nitric acid, sulfuric acid or a mixture.

The pH of the microbe-based composition should be suitable for the microorganism(s) of interest. In a preferred embodiment, the pH of the composition is about 3.5 to 7.0, about 4.0 to 6.5, or about 5.0.

In one embodiment, additional components such as an aqueous preparation of a salt, such as sodium bicarbonate or carbonate, sodium sulfate, sodium phosphate, sodium biphosphate, can be included in the formulation.

In certain embodiments, an adherent substance can be added to the composition to prolong the adherence of the product to plant parts. Polymers, such as charged polymers, or polysaccharide-based substances can be used, for example, xanthan gum, guar gum, levan, xylinan, gellan gum, curdlan, pullulan, dextran and others.

In preferred embodiments, commercial grade xanthan gum is used as the adherent. The concentration of the gum should be selected based on the content of the gum in the commercial product. If the xanthan gum is highly pure, then 0.001% (w/v—xanthan gum/solution) is sufficient.

In one embodiment, glucose, glycerol and/or glycerin can be added to the microbe-based product to serve as, for example, an osmoticum during storage and transport. In one embodiment, molasses can be included.

In one embodiment, prebiotics can be added to and/or applied concurrently with the microbe-based product to enhance microbial growth. Suitable prebiotics, include, for example, kelp extract, fulvic acid, chitin, humate and/or humic acid. In a specific embodiment, the amount of pre-biotics applied is about 0.1 L/acre to about 0.5 L/acre, or about 0.2 L/acre to about 0.4 L/acre.

Optionally, the product can be stored prior to use. The storage time is preferably short. Thus, the storage time may be less than 60 days, 45 days, 30 days, 20 days, 15 days, 10 days, 7 days, 5 days, 3 days, 2 days, 1 day, or 12 hours. In a preferred embodiment, if live cells are present in the product, the product is stored at a cool temperature such as, for example, less than 20° C., 15° C., 10° C., or 5° C.

Local Production of Microbe-Based Products

In certain embodiments of the subject invention, a microbe growth facility produces fresh, high-density micro-organisms and/or microbial growth by-products of interest on a desired scale. The microbe growth facility may be located at or near the site of application. The facility produces high-density microbe-based compositions in batch, quasi-continuous, or continuous cultivation.

The microbe growth facilities of the subject invention can be located at the location where the microbe-based product will be used (e.g., a citrus grove). For example, the microbe growth facility may be less than 300, 250, 200, 150, 100, 75, 50, 25, 15, 10, 5, 3, or 1 mile from the location of use.

Because the microbe-based product can be generated locally, without resort to the microorganism stabilization, preservation, storage and transportation processes of conventional microbial production, a much higher density of microorganisms can be generated, thereby requiring a smaller volume of the microbe-based product for use in the on-site application or which allows much higher density microbial applications where necessary to achieve the desired efficacy. This allows for a scaled-down bioreactor (e.g., smaller fermentation vessel, smaller supplies of starter material, nutrients and pH control agents), which makes the system efficient and can eliminate the need to stabilize cells or separate them from their culture medium. Local generation of the microbe-based product also facilitates the inclusion of the growth medium in the product. The medium can contain agents produced during the fermentation that are particularly well-suited for local use.

Locally-produced high density, robust cultures of microbes are more effective in the field than those that have remained in the supply chain for some time. The microbe-based products of the subject invention are particularly advantageous compared to traditional products wherein cells have been separated from metabolites and nutrients present in the fermentation growth media. Reduced transportation times allow for the production and delivery of fresh batches of microbes and/or their metabolites at the time and volume as required by local demand.

The microbe growth facilities of the subject invention produce fresh, microbe-based compositions, comprising the microbes themselves, microbial metabolites, and/or other components of the medium in which the microbes are grown. If desired, the compositions can have a high density of vegetative cells or propagules, or a mixture of vegetative cells and propagules.

Advantageously, the compositions can be tailored for use at a specified location. In one embodiment, the microbe growth facility is located on, or near, a site where the microbe-based products will be used (e.g., a citrus grove).

Advantageously, these microbe growth facilities provide a solution to the current problem of relying on far-flung industrial-sized producers whose product quality suffers due to upstream processing delays, supply chain bottlenecks, improper storage, and other contingencies that inhibit the timely delivery and application of, for example, a viable, high cell-count product and the associated medium and metabolites in which the cells are originally grown.

The microbe growth facilities provide manufacturing versatility by their ability to tailor the microbe-based products to improve synergies with destination geographies. Advantageously, in preferred embodiments, the systems of the subject invention harness the power of naturally-occurring local microorganisms and their metabolic by-products to improve agricultural production.

The cultivation time for the individual vessels may be, for example, from 1 to 7 days or longer. The cultivation product can be harvested in any of a number of different ways.

Local production and delivery within, for example, 24 hours of fermentation results in pure, high cell density compositions and substantially lower shipping costs. Given the prospects for rapid advancement in the development of more effective and powerful microbial inoculants, consumers will benefit greatly from this ability to rapidly deliver microbe-based products.

Methods of Enhancing Plant Root Health and Immune Health

In preferred embodiments, a method is provided for enhancing plant health, growth and/or yields, wherein a combination of beneficial microorganisms, and/or their growth by-products, are applied to a plant and/or its surrounding environment. In some embodiments, multiple plants and/or their surrounding environments are treated according to the subject methods.

As used herein, a plant's "surrounding environment" means the soil and/or other medium in which the plant is growing, which can include the rhizosphere. In certain embodiments, the surrounding environment does not extend past, for example, a radius of at least 5 miles, 1 mile, 1,000 feet, 500 feet, 300 feet, 100 feet, 10 feet, 8 feet, or 6 feet from the plant.

In specific embodiments, the methods can comprise applying a first microorganism and a second microorganism, and/or a growth by-product of one or both of these micro-organisms, to the plant and/or its surrounding environment. Preferably, the first microorganism is a *Trichoderma* spp. fungus and the second microorganism is a *Bacillus* spp. bacterium. In specific embodiments, the method comprises applying a soil treatment composition according to the subject description to the plant and/or its environment.

In one embodiment, the method comprises cultivating the first and second microorganisms separately and then combining them to produce one soil treatment composition. In one embodiment, the first and second microorganisms are not blended together into one product, but are applied to the plant and/or its environment as separate treatments.

To improve or stabilize the effects of the treatment composition, it can be blended with suitable adjuvants and then used as such or after dilution if necessary. In preferred embodiments, the composition is formulated as a dry powder or as granules, which can be mixed with water and other components to form a liquid product.

In one embodiment, additional microorganisms can be applied contemporaneously with the *Trichoderma* and/or *Bacillus*. For example, a mycobacterium such as *Myxococcus xanthus* can also be applied, and/or one or more microorganisms capable of fixing, mobilizing and/or solubilizing nitrogen, potassium, phosphorous (or phosphate) and/or other micronutrients in soil. In one embodiment, a nitrogen-fixing microbe, such as, for example, *Azotobacter vinelandii*, can also be applied. In another embodiment, a potassium-mobilizing microbe, such as, for example, *Frateuria aurantia* can also be applied.

In some embodiments, the methods further comprise applying materials with the composition to enhance microbe growth during application (e.g., nutrients and/or prebiotics to promote microbial growth). In one embodiment, nutrient sources can include, for example, sources of nitrogen, potassium, phosphorus, magnesium, proteins, vitamins and/or carbon. In one embodiments, prebiotics can include, for example, kelp extract, fulvic acid, chitin, humate and/or humic acid.

In one embodiment, the method can enhance plant health, growth and/or yields by enhancing root health and growth. More specifically, in one embodiment, the methods can be used to improve the properties of the rhizosphere in which a plant's roots are growing, for example, the nutrient and/or moisture retention properties.

Additionally, in one embodiment, the method can be used to inoculate a rhizosphere with one or more beneficial microorganisms. For example, in preferred embodiments, the microbes of the soil treatment composition can colonize the rhizosphere and provide multiple benefits to the plant whose roots are growing therein, including protection and nourishment.

Advantageously, in one embodiment, the subject methods can be used to enhance health, growth and/or yields in plants having compromised immune health due to an infection from a pathogenic agent or from an environmental stressor, such as, for example, drought. Thus, in certain embodiments, the subject methods can also be used for improving the immune health, or immune response, of plants.

As used herein, "applying" a composition or product refers to contacting a composition or product with a target or site such that the composition or product can have an effect on that target or site. The effect can be due to, for example, microbial growth and/or interaction with a plant, as well as the action of a metabolite, enzyme, biosurfactant or other microbial growth by-product. Applying can also include "treating" a target or site with a composition.

Application can further include contacting the microbe-based product directly with a plant, plant part, and/or the plant's surrounding environment (e.g., the soil or the rhizosphere). The microbe-product can be applied as a seed treatment or to the soil surface, or to the surface of a plant or plant part (e.g., to the surface of the roots, tubers, stems, flowers, leaves, fruit, or flowers). It can be sprayed, poured, sprinkled, injected or spread as liquid, dry powder, dust, granules, microgranules, pellets, wettable powder, flowable powder, emulsions, microcapsules, oils, gels, pastes or aerosols.

In a specific embodiment, the composition is contacted with one or more roots of the plant. The composition can be applied directly to the roots, e.g., by spraying or dunking the roots, and/or indirectly, e.g., by administering the composition to the soil in which the plant grows (e.g., the rhizosphere). The composition can be applied to the seeds of the plant prior to or at the time of planting, or to any other part of the plant and/or its surrounding environment.

In certain embodiments, the compositions provided herein are applied to the soil surface without mechanical incorporation. The beneficial effect of the soil application can be activated by rainfall, sprinkler, flood, or drip irrigation, and subsequently delivered to, for example, the roots of plants.

Plants and/or their environments can be treated at any point during the process of cultivating the plant. For example, the soil treatment composition can be applied to the soil prior to, concurrently with, or after the time when seeds are planted therein. It can also be applied at any point thereafter during the development and growth of the plant, including when the plant is flowering, fruiting, and during and/or after abscission of leaves.

In one embodiment, the method can be used in a large scale agricultural setting. The method can comprise administering the soil treatment composition into a tank connected to an irrigation system used for supplying water, fertilizers or other liquid compositions to a crop, orchard or field. Thus, the plant and/or soil surrounding the plant can be treated with the soil treatment composition via, for example, soil injection, soil drenching, or using a center pivot irrigation system, or with a spray over the seed furrow, or with sprinklers or drip irrigators. Advantageously, the method is suitable for treating hundreds of acres of crops, orchards or fields at one time.

In one embodiment, the method can be used in a smaller scale setting, such as in a home garden or greenhouse. In such cases, the method can comprise spraying a plant and/or its surrounding environment with the soil treatment composition using a handheld lawn and garden sprayer. The composition can be mixed with water, and optionally, other lawn and garden treatments, such as fertilizers and pesticides. The composition can also be mixed in a standard handheld watering can and poured onto soil.

In certain embodiments, the plant receiving treatment is healthy. Advantageously, the subject invention can be useful in enhancing the immune response of a plant having a compromised immune system, for example, because the plant is affected by disease and/or disease symptoms.

For example, the plant may be affected by a pathogenic strain of *Pseudomonas* (e.g., *P. savastanoi, P. syringae* pathovars); *Ralstonia solanacearum; Agrobacterium* (e.g., *A. tumefaciens*); *Xanthomonas* (e.g., *X. oryzae* pv. *Oryzae, X. campestris* pathovars, *X. axonopodis* pathovars); *Erwinia* (e.g., *E. amylovora*); *Xylella* (e.g., *X. fastidiosa*); *Dickeya* (e.g., *D. dadantdi* and *D. solani*); *Pectobacterium* (e.g., *P. carotovorum* and *P. atrosepticum*); *Clavibacter* (e.g., *C. michiganensis* and *C. sepedonicus*); *Candidatus Liberibacter asiaticus; Pantoea; Burkholderia; Acidovorax; Streptomyces; Spiroplasma*; and/or *Phytoplasma*; as well as huanglongbing (HLB, citrus greening disease), citrus canker disease, citrus bacterial spot disease, citrus variegated chlorosis, brown rot, citrus root rot, citrus and black spot disease.

In one embodiment, the methods are used to enhance the health, growth and/or yields of citrus trees affected by citrus greening disease and/or citrus canker disease.

The present invention can be used to enhance health, growth and/or yields of plants and/or crops in, for example, agriculture, horticulture, greenhouses, landscaping, and the like.

In one embodiment, the subject invention can also be used for improving one or more qualities of soil, thereby enhancing the performance of the soils for agricultural, home and gardening purposes.

In certain embodiments, the soil treatment composition may also be applied so as to promote colonization of the roots and/or rhizosphere as well as the vascular system of the plant in order to enhance plant health and vitality. Thus, nutrient-fixing microbes such as *Rhizobium* and/or Mycorrhizae can be promoted, as well as other beneficial endogenous and exogenous microbes, and/or their by-products that promote crop growth, health and/or yield.

In one embodiment, the method can be used for enhancing penetration of beneficial molecules through the outer layers of root cells.

The subject invention can be used to improve any number of qualities in any type of soil, for example, clay, sandy, silty, peaty, chalky, loam soil, and/or combinations thereof. Furthermore, the methods and compositions can be used for improving the quality of dry, waterlogged, porous, depleted, compacted soils and/or combinations thereof.

In one embodiment, the method can be used for improving the drainage and/or dispersal of water in waterlogged soils. In one embodiment, the method can be used for improving water retention in dry soil.

In one embodiment, the method can be used for improving nutrient retention in porous and/or depleted soils.

In one embodiment, the method controls pathogenic bacteria themselves. In one embodiment, the method works by enhancing the immune health of plants to increase the ability to fight off infections.

In yet another embodiment, the method controls pests that might act as vectors or carriers for pathogenic bacteria, such as flies, aphids, ants, beetles, and whiteflies. Thus, the subject methods can prevent the spread of plant pathogenic bacteria by controlling, e.g., killing, these carrier pests.

The microbe-based products can be used either alone or in combination with other compounds for efficient enhancement of plant health, growth and/or yields, as well as other compounds for efficient treatment and prevention of plant pathogenic pests. For example, the methods can be used concurrently with sources of nutrients and/or micronutrients for enhancing plant and/or microbe growth, such as magnesium, phosphate, nitrogen, potassium, selenium, calcium, sulfur, iron, copper, and zinc; and/or one or more prebiotics, such as kelp extract, fulvic acid, chitin, humate and/or humic acid. The exact materials and the quantities thereof can be determined by a grower or an agricultural scientist having the benefit of the subject disclosure.

The compositions can also be used in combination with other agricultural compounds and/or crop management systems. In one embodiment, the composition can optionally comprise, and/or be applied with, for example, natural and/or chemical pesticides, repellants, herbicides, fertilizers, water treatments, non-ionic surfactants and/or soil amendments.

In one embodiment, the subject compositions are compatible for use with agricultural compounds characterized as antiscalants, such as, e.g., hydroxyethylidene diphosphonic acid;

bactericides, such as, e.g., streptomycin sulfate and/or Galltrol® (*A. radiobacter* strain K84);

biocides, such as, e.g., chlorine dioxide, didecyldimethyl ammonium chloride, halogenated heterocyclic, and/or hydrogen dioxide/peroxyacetic acid;

fertilizers, such as, e.g., N-P-K fertilizers, calcium ammonium nitrate 17-0-0, potassium thiosulfate, nitrogen (e.g., 10-34-0, Kugler KQ-XRN, Kugler KS-178C, Kugler KS-2075, Kugler LS 6-24-6S, UN 28, UN 32), and/or potassium;

fungicides, such as, e.g., chlorothalonil, manicozeb hexamethylenetetramine, aluminum tris, azoxystrobin, *Bacillus* spp. (e.g., *B. licheniformis* strain 3086, *B. subtilis, B. subtilis* strain QST 713), benomyl, boscalid, pyraclostrobin, captan, carboxin, chloroneb, chlorothalonil, copper culfate, cyazofamid, dicloran, dimethomorph, etridiazole, thiophanate-methyl, fenamidone, fenarimol, fludioxonil, fluopicolide, flutolanil, iprodione, mancozeb, maneb, mefanoxam, fludioxonil, mefenoxam, metalaxyl, myclobutanil, oxathiapiprolin, pentachloronitrobenzene (quintozene), phosphorus acid, propamocarb, propanil, pyraclostrobin, *Reynoutria sachalinensis, Streptomyces* spp. (e.g., *S. griseoviridis* strain K61, *S. lydicus* WYEC 108), sulfur, urea, thiabendazole, thiophanate methyl, thiram, triadimefon, triadimenol, and/or vinclozolin;

growth regulators, such as, e.g., ancymidol, chlormequat chloride, diaminozide, paclobutrazol, and/or uniconazole;

herbicides, such as, e.g., glyphosate, oxyfluorfen, and/or pendimethalin;

insecticides, such as, e.g., acephate, azadirachtin, *B. thuringiensis* (e.g., subsp. *israelensis* strain AM 65-52), *Beauveria bassiana* (e.g., strain GHA), carbaryl, chlorpyrifos, cyantraniliprole, cyromazine, dicofol, diazinon, dinotefuran, imidacloprid, Isaria fumosorosae (e.g., Apopka strain 97), lindane, and/or malathion;

water treatments, such as, e.g., hydrogen peroxide (30-35%), phosphonic acid (5-20%), and/or sodium chlorite;

as well as glycolipids, lipopeptides, deet, diatomaceous earth, citronella, essential oils, mineral oils, garlic extract, chili extract, and/or any known commercial and/or homemade pesticide that is determined to be compatible by the skilled artisan having the benefit of the subject disclosure.

Preferably, the composition does not comprise and/or is not applied simultaneously with, or within 7 to 10 days before or after, application of the following compounds: benomyl, dodecyl dimethyl ammonium chloride, hydrogen dioxide/peroxyacetic acid, imazilil, propiconazole, tebuconazole, or triflumizole.

In certain embodiments, the compositions and methods can be used to enhance the effectiveness of other compounds, for example, by enhancing the penetration of a pesticidal compound into a plant or pest, or enhancing the bioavailability of a nutrient to plant roots. The microbe-based products can also be used to supplement other treatments, for example, antibiotic treatments. Advantageously, the subject invention helps reduce the amount of antibiotics that must be administered to a crop or plant in order to be effective at treating and/or preventing bacterial infection.

In one embodiment, the methods and compositions according to the subject invention lead to an increase in one or more of: root mass, trunk diameter, canopy density, brix value, chlorophyll content, flower count and/or leaf tissue nitrogen levels of a plant, by about 5%, 10%, 20%, 30%, 40%, 50%, 60% 70%, 80%, 90%, 100%, 150%, 200%, or more, compared to a plant growing in an untreated environment.

In certain embodiments, the methods and compositions according to the subject invention lead to an increase in crop yield by about 5%, 10%, 20%, 30%, 40%, 50%, 60% 70%, 80%, 90%, 100%, 150%, 200%, or more, compared to untreated crops.

In one embodiment, the methods and compositions according to the subject invention lead to a reduction in the number of pests on a plant or in a plant's surrounding environment by about 55%, 10%, 20%, 30%, 40%, 50%, 60% 70%, 80%, 90%, 100%, 150%, 200%, or more, compared to a plant growing in an untreated environment.

In one embodiment, the methods and compositions according to the subject invention reduce damage to a plant caused by pests by about 5%, 10%, 20%, 30%, 40%, 50%, 60% 70%, 80%, 90%, 100%, 150%, 200%, or more, compared to plants growing in an untreated environment.

Target Plants

As used here, the term "plant" includes, but is not limited to, any species of woody, ornamental or decorative, crop or cereal, fruit plant or vegetable plant, flower or tree, macroalga or microalga, phytoplankton and photosynthetic algae (e.g., green algae *Chlamydomonas reinhardtii*). "Plant" also includes a unicellular plant (e.g., microalga) and a plurality of plant cells that are largely differentiated into a colony (e.g., volvox) or a structure that is present at any stage of a plant's development. Such structures include, but are not limited to, a fruit, a seed, a shoot, a stem, a leaf, a root, a flower petal, etc. Plants can be standing alone, for example, in a garden, or can be one of many plants, for example, as part of an orchard, crop or pasture.

As used herein, "crop plants" refer to any species of plant or alga edible by humans or used as a feed for animals or fish or marine animals, or consumed by humans, or used by humans (e.g., textile or cosmetics production), or viewed by humans (e.g., flowers or shrubs in landscaping or gardens) or any plant or alga, or a part thereof, used in industry or commerce or education.

Types of crop plants that can benefit from application of the products and methods of the subject invention include, but are not limited to: row crops (e.g., corn, soy, *sorghum*, peanuts, potatoes, etc.), field crops (e.g., alfalfa, wheat, grains, etc.), tree crops (e.g., walnuts, almonds, pecans, hazelnuts, pistachios, etc.), citrus crops (e.g., orange, lemon, grapefruit, etc.), fruit crops (e.g., apples, pears, strawberries, blueberries, blackberries, etc.), turf crops (e.g., sod), ornamentals crops (e.g., flowers, vines, etc.), vegetables (e.g., tomatoes, carrots, etc.), vine crops (e.g., grapes, etc.), forestry (e.g., pine, spruce, *eucalyptus*, poplar, etc.), managed pastures (any mix of plants used to support grazing animals).

Additional examples of plants for which the subject invention is useful include, but are not limited to, cereals and grasses (e.g., wheat, barley, rye, oats, rice, maize, *sorghum*, corn), beets (e.g., sugar or fodder beets); fruit (e.g., grapes, strawberries, raspberries, blackberries, pomaceous fruit, stone fruit, soft fruit, apples, pears, plums, peaches, almonds, cherries or berries); leguminous crops (e.g., beans, lentils, peas or soya); oil crops (e.g., oilseed rape, mustard, poppies, olives, sunflowers, coconut, castor, cocoa or ground nuts); cucurbits (e.g., pumpkins, cucumbers, squash or melons); fiber plants (e.g., cotton, flax, hemp or jute); citrus fruit (e.g., oranges, lemons, grapefruit or tangerines); vegetables (e.g., spinach, lettuce, *asparagus*, cabbages, carrots, onions, tomatoes, potatoes or bell peppers); Lauraceae (e.g., avocado, Cinnamonium or camphor); and also tobacco, nuts, herbs, spices, medicinal plants, coffee, eggplants, sugarcane, tea, pepper, grapevines, hops, the plantain family, latex plants, cut flowers and ornamentals.

In certain embodiments, the crop plant is a citrus plant. Examples of citrus plants according to the subject invention include, but are not limited to, orange trees, lemon trees, lime trees and grapefruit trees. Other examples include *Citrus maxima* (Pomelo), *Citrus medica* (Citron), *Citrus micrantha* (Papeda), *Citrus reticulata* (Mandarin orange), *Citrus paradisi* (grapefruit), *Citrus japonica* (kumquat), *Citrus australasica* (Australian Finger Lime), *Citrus australis* (Australian Round lime), *Citrus glauca* (Australian Desert Lime), *Citrus garrawayae* (Mount White Lime), *Citrus gracilis* (Kakadu Lime or Humpty Doo Lime), *Citrus inodora* (Russel River Lime), *Citrus warburgiana* (New Guinea Wild Lime), *Citrus wintersii* (Brown River Finger Lime), *Citrus halimii* (limau kadangsa, limau kedut kera), *Citrus indica* (Indian wild orange), *Citrus macroptera*, and *Citrus latipes*, *Citrus* x *aurantiifolia* (Key lime), *Citrus* x *aurantium* (Bitter orange), *Citrus* x *latifolia* (Persian lime), *Citrus* x *limon* (Lemon), *Citrus* x *limonia* (Rangpur), *Citrus* x *sinensis* (Sweet orange), *Citrus* x *tangerina* (Tangerine), Imperial lemon, tangelo, orangelo, tangor, kinnow, kiyomi, Minneola tangelo, oroblanco, ugli, Buddha's hand, citron, bergamot orange, blood orange, calamondin, clementine, Meyer lemon, and yuzu.

In some embodiments, the crop plant is a relative of a citrus plant, such as orange jasmine, limeberry, and trifoliate orange (*Citrus trifolata*).

Additional examples of target plants include all plants that belong to the superfamily Viridiplantae, in particular monocotyledonous and dicotyledonous plants including fodder or forage legumes, ornamental plants, food crops, trees or shrubs selected from Acer spp., *Actinidia* spp., *Abelmoschus* spp., Agave sisalana, *Agropyron* spp., *Agrostis stolonmfera*, *Allium* spp., *Amaranthus* spp., *Ammophila arenaria*, *Ananas comosus*, *Annona* spp., *Apium graveolens*, *Arachis* spp, *Artocarpus* spp., *Asparagus officinalis*, *Avena* spp. (e.g., *A. sativa*, *A. fatua*, *A. byzantina*, *A. fatua* var. *sativa*, *A. hybrida*), *Averrhoa carambola*, *Bambusa* sp., *Benincasa hispida*, *Bertholletia excelsea*, *Beta vulgaris*, *Brassica* spp. (e.g., *B. napus*, *B. rapa* ssp. [canola, oilseed rape, turnip rape]), *Cadaba farinosa*, *Camellia sinensis*, *Canna indica*, *Cannabis sativa*, *Capsicum* spp., *Carex elata*, *Carica papaya*, *Carissa macrocarpa*, *Carya* spp., *Carthamus tinctorius*, *Castanea* spp., *Ceiba pentandra*, *Cichorium endivia*, *Cinnamomum* spp., *Citrullus lanatus*, *Citrus* spp., *Cocos* spp., *Coffea* spp., *Colocasia esculenta*, *Cola* spp., *Corchorus* sp., *Coriandrum sativum*, *Corylus* spp., *Crataegus* spp., *Crocus sativus*, *Cucurbita* spp., *Cucumis* spp., *Cynara* spp., *Daucus carota*, *Desmodium* spp., *Dimocarpus longan*, *Dioscorea* spp., *Diospyros* spp., *Echinochloa* spp., *Elaeis* (e.g., *E. guineensis*, E. oleifera), *Eleusine coracana*, *Eragrostis tef*, *Erianthus* sp., *Eriobotrya japonica*, *Eucalyptus* sp., *Eugenia uniflora*, *Fagopyrum* spp., *Fagus* spp., *Festuca arundinacea*, *Ficus carica*, *Fortunella* spp., Fragaria spp., *Ginkgo biloba*, *Glycine* spp. (e.g., *G. max*, *Soja hispida* or *Soja* max), *Gossypium hirsutum*, *Helianthus* spp. (e.g., *H. annuus*), *Hemerocallis fulva*, *Hibiscus* spp., *Hordeum* spp. (e.g., *H. vulgare*), *Ipomoea batatas*, *Juglans* spp., *Lactuca sativa*, *Lathyrus* spp., *Lens culinaris*, *Linum usitatissimum*, *Litchi chinensis*, *Lotus* spp., Luffa *acutangula*, *Lupinus* spp.,

*Luzula sylvatica, Lycopersicon* spp. (e.g., *L. esculentum, L. lycopersicum, L. pyriforme*), *Macrotyloma* spp., *Malus* spp., *Malpighia emarginata, Mammea americana, Mangifera indica, Manihot* spp., *Manilkara zapota, Medicago saliva, Melilotus* spp., *Mentha* spp., *Miscanthus sinensis, Momordica* spp., *Morus nigra, Musa* spp., *Nicotiana* spp., *Olea* spp., *Opuntia* spp., *Ornithopus* spp., *Oryza* spp. (e.g., *O. saliva, O. latifolia*), *Panicum miliaceum, Panicum virgatum, Passiflora edulis, Pastinaca sativa, Pennisetum* sp., *Persea* spp., *Petroselinum crispum, Phalaris arundinacea, Phaseolus* spp., *Phleum pratense, Phoenix* spp., *Phragmites australis, Physalis* spp., *Pinus* spp., *Pistacia vera, Pisum* spp., *Poa* spp., *Populus* spp., *Prosopis* spp., *Prunus* spp., *Psidium* spp., *Punica granatum, Pyrus communis, Quercus* spp., *Raphanus sativus, Rheum rhabarbarum, Ribes* spp., *Ricinus communis, Rubus* spp., *Saccharum* spp., *Salix* sp., *Sambucus* spp., *Secale cereale, Sesamum* spp., *Sinapis* sp., *Solanum* spp. (e.g., *S. tuberosum, S. integrifolium* or *S. lycopersicum*), *Sorghum bicolor, Spinacia* spp., *Syzygium* spp., *Tagetes* spp., *Tamarindus indica, Theobroma cacao, Trifolium* spp., *Tripsacum dactyloides, Triticosecale rimpaui, Triticum* spp. (e.g., *T. aestivum, T. durum, T. turgidum, T. hybernum, T. macha, T. sativum, T. monococcum* or *T. vulgare*), *Tropaeolum minus, Tropaeolum majus, Vaccinium* spp., *Vicia* spp., *Vigna* spp., *Viola odorata, Vitis* spp., *Zea mays, Zizania palustris, Ziziphus* spp., amongst others.

Target plants can also include, but are not limited to, corn (*Zea mays*), *Brassica* sp. (e.g., *B. napus, B. rapa, B. juncea*), particularly those *Brassica* species useful as sources of seed oil, alfalfa (*Medicago saliva*), rice (*Oryza* saliva), rye (*Secale cereale*), sorghum (*Sorghum bicolor, Sorghum vulgare*), millet (e.g., pearl millet (*Pennisetum glaucum*), proso millet (*Panicum miliaceum*), foxtail millet (*Setaria italica*), finger millet (*Eleusine coracana*)), sunflower (*Helianthus annuus*), safflower (*Carthamus tinctorius*), wheat (*Triticum aestivum*), soybean (*Glycine max*), tobacco (*Nicotiana tabacum*), potato (*Solanum tuberosum*), peanuts (*Arachis hypogaea*), cotton (*Gossypium barbadense, Gossypium hirsutum*), sweet potato (*Ipomoea batatus*), cassava (*Manihot esculenta*), coffee (*Coffea* spp.), coconut (*Cocos nucifera*), pineapple (*Ananas comosus*), citrus trees (*Citrus* spp.), cocoa (*Theobroma cacao*), tea (*Camellia sinensis*), banana (*Musa* spp.), avocado (*Persea americana*), fig (*Ficus casica*), guava (*Psidium guajava*), mango (*Mangifera indica*), olive (*Olea europaea*), papaya (*Carica papaya*), cashew (*Anacardium occidentale*), macadamia (*Macadamia integrifolia*), almond (*Prunus* amygdalus), sugar beets (*Beta vulgaris*), sugarcane (*Saccharum* spp.), oats, barley, vegetables, ornamentals, and conifers.

Target vegetable plants include tomatoes (*Lycopersicon esculentum*), lettuce (e.g., *Lactuca sativa*), green beans (*Phaseolus vulgaris*), lima beans (*Phaseolus limensis*), peas (*Lathyrus* spp.), and members of the genus *Cucumis* such as cucumber (*C. sativus*), cantaloupe (*C. cantalupensis*), and musk melon (*C. melo*). Ornamentals include azalea (*Rhododendron* spp.), hydrangea (*Macrophylla hydrangea*), hibiscus (*Hibiscus rosasanensis*), roses (*Rosa* spp.), tulips (*Tulipa* spp.), daffodils (*Narcissus* spp.), petunias (*Petunia hybrida*), carnation (*Dianthus caryophyllus*), poinsettia (*Euphorbia pulcherrima*), and *chrysanthemum*. Conifers that may be employed in practicing the embodiments include, for example, pines such as loblolly pine (*Pinus taeda*), slash pine (*Pinus elliotii*), ponderosa pine (*Pinus ponderosa*), lodgepole pine (*Pinus contorta*), and Monterey pine (*Pinus radiata*); Douglas-fir (*Pseudotsuga menziesii*); Western hemlock (*Tsuga canadensis*); Sitka spruce (*Picea glauca*); redwood (*Sequoia sempervirens*); true firs such as silver fir (*Abies amabilis*) and balsam fir (*Abies balsamea*); and cedars such as Western red cedar (*Thuja plicata*) and Alaska yellow-cedar (*Chamaecyparis nootkatensis*). Plants of the embodiments include crop plants (for example, corn, alfalfa, sunflower, *Brassica*, soybean, cotton, safflower, peanut, *sorghum*, wheat, millet, tobacco, etc.), such as corn and soybean plants.

Target turfgrasses include, but are not limited to: annual bluegrass (*Poa annua*); annual ryegrass (*Lolium multiflorum*); Canada bluegrass (*Poa compressa*); Chewings fescue (*Festuca rubra*); colonial bentgrass (*Agrostis tenuis*); creeping bentgrass (*Agrostis palustris*); crested wheatgrass (*Agropyron desertorum*); fairway wheatgrass (*Agropyron cristatum*); hard fescue (*Festuca longifolia*); Kentucky bluegrass (*Poa pratensis*); orchardgrass (*Dactylis glomerate*); perennial ryegrass (*Lolium perenne*); red fescue (*Festuca rubra*); redtop (*Agrostis alba*); rough bluegrass (*Poa trivialis*); sheep fescue (*Festuca* ovine); smooth bromegrass (*Bromus inermis*); tall fescue (*Festuca arundinacea*); timothy (*Phleum* pretense); velvet bentgrass (*Agrostis* canine); weeping alkaligrass (*Puccinellia distans*); western wheatgrass (*Agropyron smithii*); Bermuda grass (*Cynodon* spp.); St. Augustine grass (*Stenotaphrum secundalum*); zoysia grass (*Zoysia* spp.); Bahia grass (*Paspalum notatum*); carpet grass (*Axonopus affinis*); centipede grass (*Eremochloa ophiuroides*); kikuyu grass (*Pennisetum clandesinum*); seashore paspalum (*Paspalum vaginatum*); blue gramma (*Bouteloua gracilis*); buffalo grass (*Buchloe dactyloids*); sideoats gramma (*Bouteloua curtipendula*).

Further plants of interest include grain plants that provide seeds of interest, oil-seed plants, and leguminous plants. Seeds of interest include grain seeds, such as corn, wheat, barley, rice, *sorghum*, rye, millet, etc. Oil-seed plants include cotton, soybean, safflower, sunflower, *Brassica*, maize, alfalfa, palm, coconut, flax, castor, olive etc. Leguminous plants include beans and peas. Beans include guar, locust bean, fenugreek, soybean, garden beans, cowpea, mungbean, lima bean, fava bean, lentils, chickpea, etc.

Further plants of interest include *Cannabis* (e.g., *sativa, indica,* and *ruderalis*) and industrial hemp.

All plants and plant parts can be treated in accordance with the invention. In this context, plants are understood as meaning all plants and plant populations such as desired and undesired wild plants or crop plants (including naturally occurring crop plants). Crop plants can be plants that can be obtained by traditional breeding and optimization methods or by biotechnological and recombinant methods, or combinations of these methods, including the transgenic plants and the plant varieties.

Plant parts are understood as meaning all aerial and subterranean parts and organs of the plants such as shoot, leaf, flower and root, examples which may be mentioned being leaves, needles, stalks, stems, flowers, fruit bodies, fruits and seeds, but also roots, tubers and rhizomes. The plant parts also include crop material and vegetative and generative propagation material, for example cuttings, tubers, rhizomes, slips and seeds.

In some embodiments, the plant is a plant infected by a pathogenic disease or pest. In specific embodiments, the plant is infected with citrus greening disease and/or citrus canker disease, and/or a pest that carries such diseases.

EXAMPLES

A greater understanding of the present invention and of its many advantages may be had from the following examples, given by way of illustration. The following examples are illustrative of some of the methods, applications, embodiments and variants of the present invention. They are not to be considered as limiting the invention. Numerous changes and modifications can be made with respect to the invention.

Example 1—Solid State Fermentation of *Bacillus* Microbes

For *Bacillus* spp. spore production, a wheat bran-based media is used. The media is spread onto stainless steel pans in a layer about 1 to 2 inches think and sterilized.

Following sterilization, the pans are inoculated with seed culture. Optionally, added nutrients can be included to enhance microbial growth, including, for example, salts and/or carbon sources such as molasses, starches, glucose and sucrose. To increase the speed of growth and increase the motility and distribution of the bacteria throughout the culture medium, potato extract or banana peel extract can be added to the culture.

Spores of the *Bacillus* strain of choice are then sprayed or pipetted onto the surface of the substrate and the trays are incubated between 32-40° C. Ambient air is pumped through the oven to stabilize the temperature. Incubation for 48-72 hours can produce $1\times10^{10}$ spores/gram or more of the strain.

Example 2—Solid State Fermentation of Fungal Spores

For growing *Trichoderma* spp., 250 g of nixtamilized corn flour is mixed with deionized water and sterilized in a stainless steel pan, sealed with a lid and pan bands. The corn flour medium is aseptically inoculated with *Trichoderma* seed culture by spraying or pipetting. The pans are then incubated at 30° C. for 10 days. After 10 days, approximately $10^9$ propagules/gram or more of *Trichoderma* can be harvested. *Trichoderma* propagules (conidia and/or hyphae) harvested from one batch can treat, for example, 1,000 to 2,000 acres of land.

Example 3—Preparation of Microbe-Based Product

The microbes, substrate, and any residual nutrients that result from production using the methods described in Examples 1 and 2 can be blended and/or micronized and dried to form granules or a powder substance. Different strains of microbe are produced separately and then mixed together either before or after drying.

A sealable pouch can be used to store and transport a product containing a mixture of $10^9$ cells/g of *T. harzianum* and $10^{10}$ cells/g of *B. amyloliquefaciens*. Micronutrients, or other microbes similarly produced, can be added to the product.

To prepare for use, the dry product is dissolved in water. The concentration can reach at least $5\times10^9$ to $5\times10^{10}$ cells/ml. The product is then diluted with water in a mixing tank to a concentration of $1\times10^6$ to $1\times10^7$ cells/ml.

One bag can be used to treat approximately 20 acres of crop, or 10 acres of citrus grove.

Example 4—Orange Tree Root Trial, Ft. Basinger Florida

A soil treatment composition of the subject invention (referred to as Rhizolizer™), comprising 37.5 ml *Trichoderma harzianum* culture and 37.5 ml of *Bacillus amyloliquefaciens* subsp. *locus* culture with 2 quarts of kelp extract, was applied in two repeats to orange plants in a Ft. Basinger, Florida grove. Wet (fresh) root mass and dry root mass were compared with those of untreated control plants.

As shown in Table 1, average root flush measurements of plants treated with Rhizolizer™ were higher for both dry weight (FIG. 1A) and fresh weight than those grown using standard growers practice (untreated control).

TABLE 1

| Average root flush measurements of untreated control (UTC) and Rhizolizer ™ (Treatment B). | | | | |
|---|---|---|---|---|
| Treatment Code | Treatment | Rep No | Dry weight (g) | Fresh weight (g) |
| UTC | UTC | 1 | 8.75 | 33.97 |
| UTC | UTC | 2 | 12.26 | 45.77 |
| | | Sum | 21.01 | 79.74 |
| TREATMENT B | TDH10/ BCA10 | 1 | 19.8 | 80.18 |
| TREATMENT B | TDH10/ BCA10 | 2 | 16.79 | 67.64 |
| | | Sum | 36.59 | 147.82 |

Example 5—Grapefruit Tree Root Trial, Ft. Pierce Florida

A soil treatment composition of the subject invention (referred to as Rhizolizer™), comprising 37.5 ml *Trichoderma harzianum* culture and 37.5 ml of *Bacillus amyloliquefaciens* subsp. *locus* culture with 2 quarts of kelp extract, was applied in four repeats to grapefruit plants in Ft. Pierce, Florida groves. Repeats occurred every two months. After the fourth repeat, wet (fresh) root mass and dry root mass were compared with those of untreated control plants.

Figure 1B:
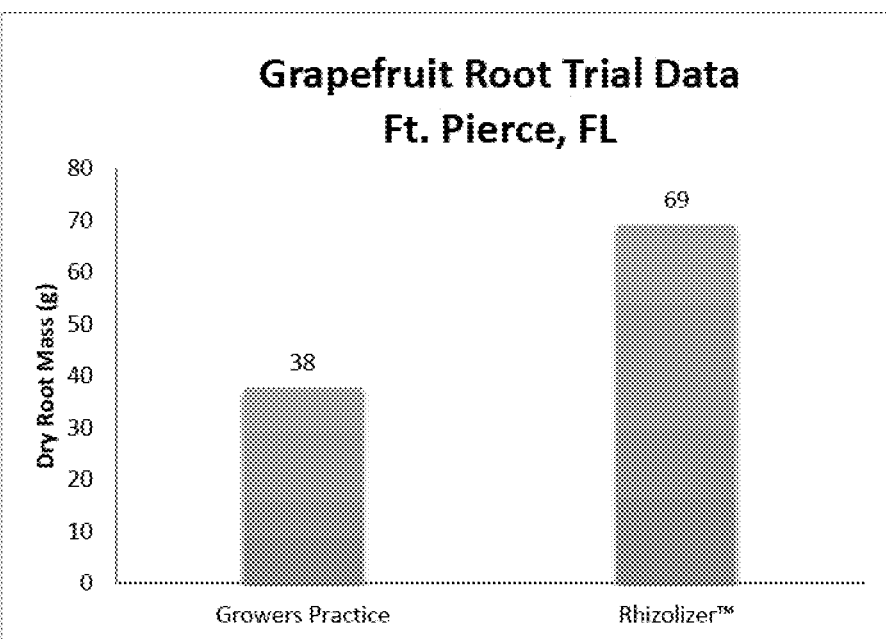

Average root flush measurements of plants treated with Rhizolizer™ were higher for both dry weight (FIG. 1B) and fresh/wet weight than those grown using standard growers practice (untreated control).

Example 6—Florida *Citrus* Trials

*Citrus* plants in various counties of Florida were treated with a soil treatment composition according to an embodiment of the subject invention and compared with untreated control plants (grower's practice). Root mass/weight, shoot growth, canopy density, trunk caliper, fruit size, fruit Brix rating, and yield (weight boxes) were studied.

Figure 2:
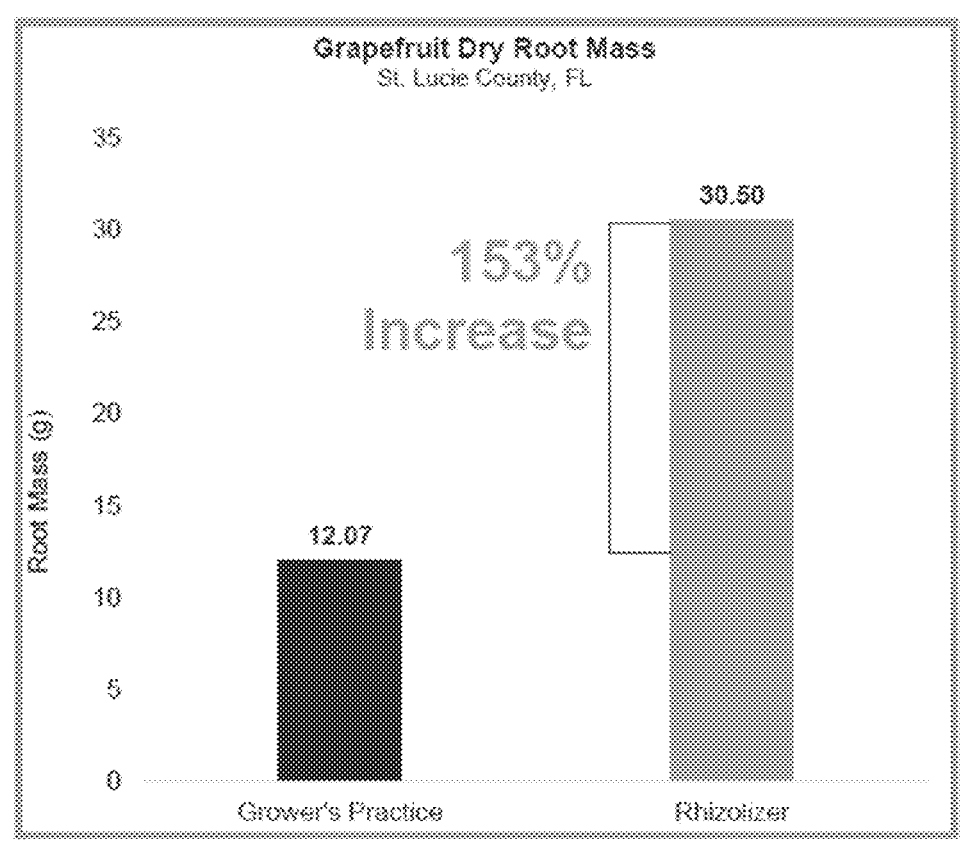
FIG. 2 shows the dry root mass (g) of grapefruit plants in St. Lucie County, Florida, treated with a soil treatment composition according to an embodiment of the subject invention ("Rhizolizer™") and compared with untreated control (standard grower's practice) plants.

FIG. 2 shows the dry root mass of grapefruit plants in St. Lucie County. The soil treatment composition was applied quarterly, for a total of 8 treatments (1.5 fl. oz/acre each). A 153% increase in dry root mass was observed compared with grower's practice plants.

Figure 3A:
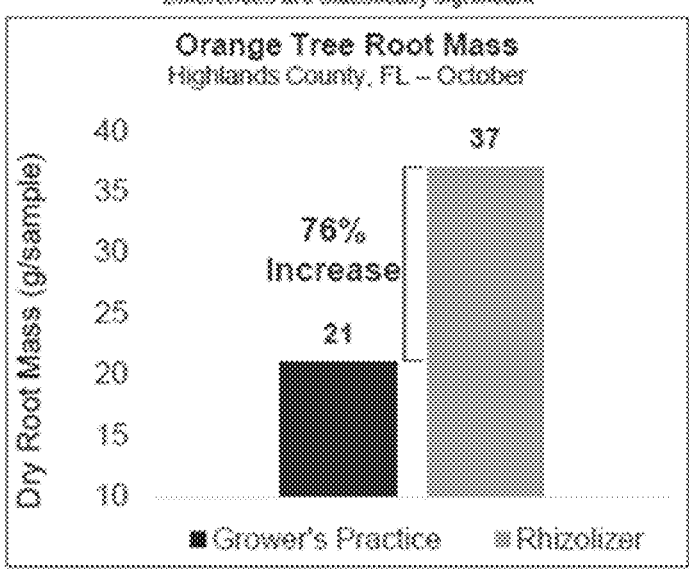
FIGS. 3A-3B show the dry root mass of Hamlin orange trees in Highlands County, Florida (A) and white grapefruit trees in St. Lucie County, Florida (B), treated with a soil treatment composition according to an embodiment of the subject invention ("Rhizolizer™") and compared with untreated control (standard grower's practice) plants.
Figure 3B:
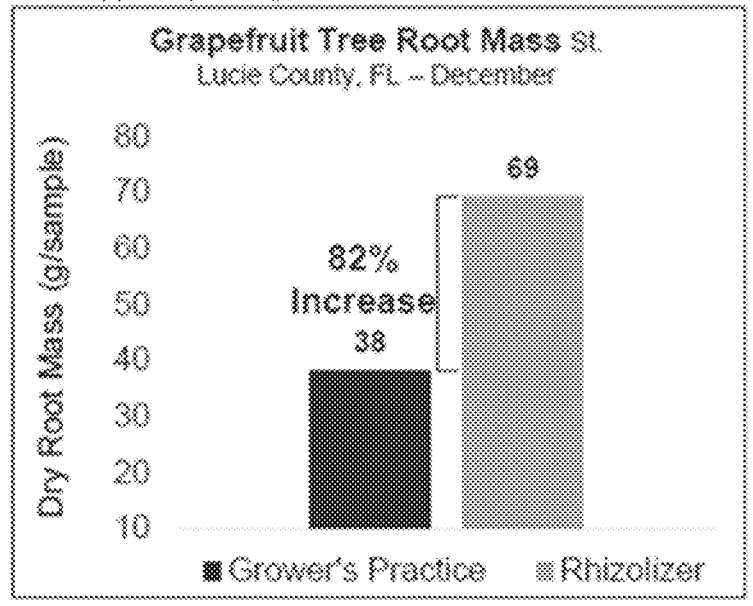

FIG. 3A shows the dry root mass (g/sample) of Hamlin orange trees in Highlands County. The soil treatment composition was applied quarterly, for a total of 3 treatments (1.5 fl. oz./acre each). A 76% increase in dry root mass was observed compared with grower's practice plants. FIG. 3B shows the dry root mass (g/sample) of white grapefruit trees in St. Lucie County. The soil treatment composition was applied quarterly, for a total of 3 treatments (1.5 fl. oz./acre each). An 82% increase in dry root mass was observed compared with grower's practice plants.

Figure 4A:
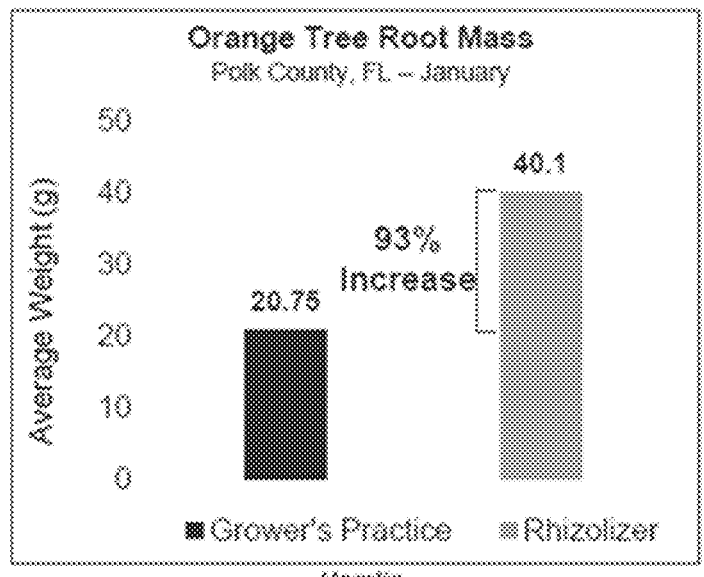

FIG. 4A shows average root weight (g) of Hamlin orange trees in Polk County. The soil treatment composition was applied quarterly, for a total of 4 treatments (1.5 fl. oz./acre for the first three treatments; 3 fl. oz./acre for the final treatment). A 93% increase in average root weight was observed. FIG. 4B shows average root weight (g) of Valencia orange trees in Collier County. The soil treatment composition was applied quarterly, for a total of 4 treatments (1.5 fl. oz./acre for the first three treatments; 3 fl. oz./acre for the final treatment). A 35% increase in average root weight was observed.

FIGS. 5A-5B show percent of trees with new shoot growth (5A) and average shoot count (5B) in young Valencia orange trees in Highlands County. The soil treatment composition was applied bi-monthly, for a total of 6 treatments (1.5 fl. oz./acre each). A 73% increase in percent trees with new shoot growth was observed, and a total of 38 more shoots on average were observed for young trees.

FIGS. 6A-6B show increase in canopy density for mature Hamlin orange trees (6A) and young Hamlin orange trees (6B) in Highlands County. The soil treatment composition was applied quarterly, for a total of 3 treatments (1.5 fl. oz./acre each). A 19% increase in visual canopy rating was observed for mature trees, and a 33% increase was observed for young trees.

FIG. 7 shows the average caliper change in young Valencia orange trees in Highlands County. The soil treatment composition was applied bi-monthly, for a total of 4 treatments (1.5 fl. oz./acre each). A 102% increase in caliper was observed for treated plants between February and October, while only an 81% increase in caliper was observed for grower's practice plants.

FIGS. 8A-8B show fruit weight for white grapefruit trees (8A) and diameter for ruby red grapefruit trees (8B) in Charlotte County. The soil treatment composition was applied quarterly, for a total of 4 treatments (1.5 fl. oz./acre each). A 6% increase in weight was observed for the white grapefruits, and a 2% increase in fruit diameter was observed for the ruby red.

FIGS. 9A-9B show Brix ratings for white grapefruits in Lucie County (9A) and Charlotte County (9B). The soil treatment composition was applied bi-monthly in Lucie County, for a total of 5 treatments (1.5 fl. oziacre each), and quarterly in Charlotte county, for a total of three treatments (1.5 fl. oz./acre each). A 4% increase in degrees Brix was observed for the Lucie County grapefruits, and an 8% increase was observed for the Charlotte county grapefruits.

FIGS. 10A-10B show weight boxes for Hamlin oranges grown by two different growers in Lake County. The soil treatment composition was applied quarterly for a total of 4 treatments (1.5 fl. oz./acre each). A 42% increase was observed by Grower 1 (10A) and a 14% increase was observed by Grower 2 (10B).

FIGS. 11A-11B show total harvest yields in pounds solids for Hamlin oranges grown by two different growers in Lake County. The soil treatment composition was applied quarterly for a total of 4 treatments (1.5 fl. oz./acre each). A 32% increase was observed by Grower 1 (11A) and a 9% increase was observed by Grower 2 (11B).

FIGS. 12A-12B show total harvest yields in pounds solids per box (12A) and per acre (12B) for Hamlin oranges in Polk County. The soil treatment composition was applied bi-monthly for a total of 4 treatments (1.5 fl. oz./acre each). A 5% increase in pounds solid/box was observed, and a 6% increase in pounds solid/acre was observed.

Example 7—Tomato Field Trial, California Central Valley

A soil treatment composition of the subject invention (referred to as Rhizolizer™), comprising 37.5 ml *Trichoderma harzianum* culture and 37.5 ml of *Bacillus amyloliquefaciens* subsp. *locus* culture with 2 quarts of kelp extract, was applied in three repeats, ranging from 26 to 33 days apart, to tomato plants. About 29-32 days after the third repeat application, the tomato fruits were harvested and yields were measured. Harvest yields in tons per acre were measured for 10 ft×5 ft (0.001 acre) plots.

As shown in FIG. 13A, red fruit yields (bars) and total fruit yields (diamonds) were compared between plants treated with the treatments shown in Table 2.

TABLE 2

Soil treatments for tomato plant study.

| | |
|---|---|
| 1 | Untreated control |
| 2 | 37.85 ml *Trichoderma harzianum* culture + 37.85 ml of *Bacillus amyloliquefaciens* subsp. *locus* culture |
| 3 | 37.85 ml *Trichoderma harzianum* culture + 37.85 ml of *Bacillus amyloliquefaciens* subsp. *locus* culture + 1.89 ml of potato extract |
| 4 | 37.85 ml *Trichoderma harzianum* culture + 37.85 ml of *Bacillus amyloliquefaciens* subsp. *locus* culture + 1 L of humate + 2 lb. of molasses |
| 5 | Rhizolizer ™ |
| 6 | 2 pt. of Terra Treat ™ |
| 7 | Commercial check (Viusid at 3, 1.5, and 2.3 fl oz.). |

As shown in FIGS. 13A-13B, Rhizolizer™ treated tomato plants produced 42 tons of red fruit per acre (out of 48 total tons of fruit per acre), while the untreated control produced 30 tons of red fruit per acre (out of 38 total tons of fruit per acre).

Example 8—Tomato Field Trial, Fresno County, California

Tomato plants in Fresno County, CA, were treated with a soil treatment composition according to an embodiment of the subject invention ("Rhizolizer™") and compared with untreated control (standard grower's practice) plants. Yield, Brix rating, and dry root mass were measured.

FIG. 14A shows total marketable fruit yields in mT per acre for tomato plants treated monthly with the soil treatment composition, for a total of 3 treatments (3 fl. oz./acre each). A 40% increase in yield was observed compared with grower's practice plants.

FIG. 14B shows Brix rating for tomato plants treated monthly with the soil treatment composition, for a total of 3 treatments (3 fl. oz./acre each). A 26% increase in degrees Brix was observed over untreated control plants.

FIG. 15A shows dry root mass (g) of tomato plants treated once with the soil treatment composition at 3 fl. oz./acre. A 50% increase in root mass was observed over untreated control plants. FIG. 15B shows tomato roots harvested from a tomato plant. The roots from the treated plant (bottom image) were visibly denser than the grower's practice plant (top image).

Example 9—Trunk Growth Study in California Almond Trees

Almond trees in Ceres, California were measured for trunk diameter growth when treated with eight different soil treatments over the course of 5 months. The eight soil treatments were as shown in Table 3.

TABLE 3

Soil treatments for almond tree trunk growth measurement.

| | |
|---|---|
| 1 | Positive control |
| 2 | *Trichoderma harzianum* culture 0.001% v/v |
| 3 | *Trichoderma harzianum* culture 0.01% v/v |
| 4 | *Trichoderma harzianum* culture 0.1% v/v |
| 5 | *Trichoderma harzianum* culture 0.001% v/v + *Bacillus amyloliquefaciens* subsp. *locus* culture 0.001% v/v |
| 6 | *Trichoderma harzianum* culture 0.01% v/v + *Bacillus amyloliquefaciens* subsp. *locus* culture 0.01% v/v (Rhizolizer ™) |

TABLE 3-continued

Soil treatments for almond tree trunk growth measurement.

| | |
|---|---|
| 7 | *Trichoderma harzianum* culture 0.1% v/v + *Bacillus amyloliquefaciens* subsp. *locus* culture 0.1% v/v |
| 8 | Untreated control |

Figure 16B:
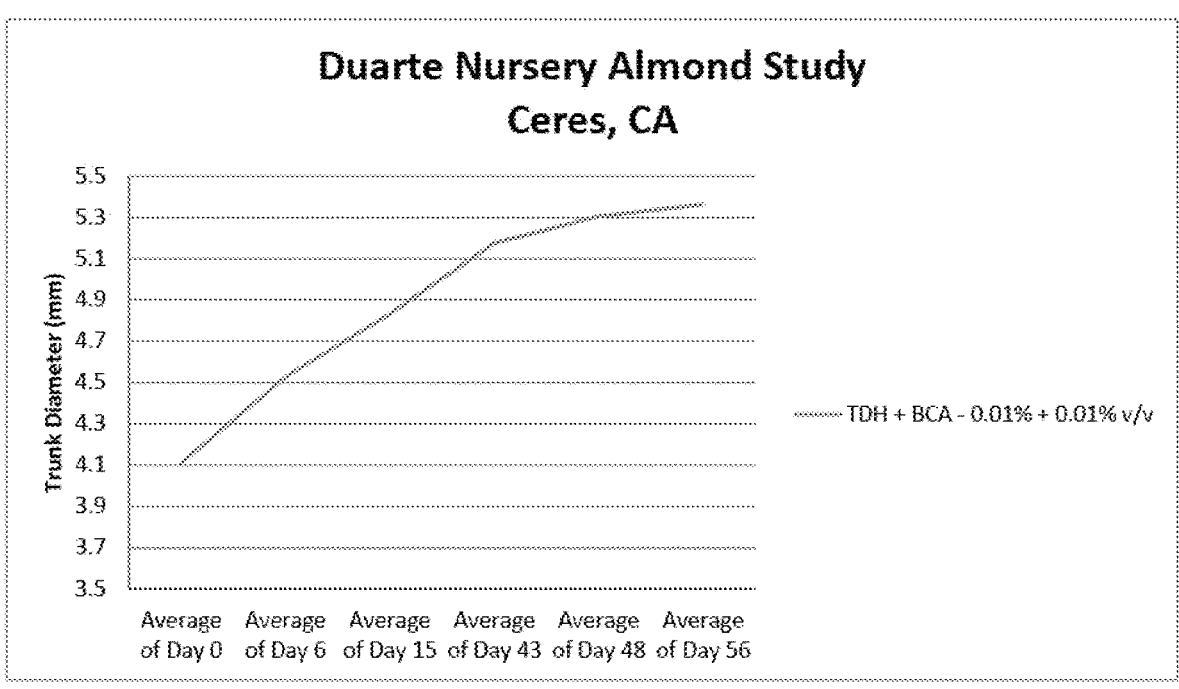

FIG. 16A shows the results of tree trunk diameter measurements, where treatment #6 from the left (Rhizolizer™) showed a change in trunk diameter of 1.25 mm, while untreated control only measured a 0.96 mm increase in trunk diameter. FIG. 16B shows the trunk growth over time of trees treated with the Rhizolizer™ treatment.

Example 10—Almond Bloom/Nut Set Trials

Almond trees in San Joaquin County, California were treated with a soil treatment composition according to an embodiment of the subject invention ("Rhizolizer™"), and compared with untreated control (standard grower's practice) plants. The soil treatment composition was applied twice, post-harvest, at 3 fl. oz./acre each.

Figure 17:
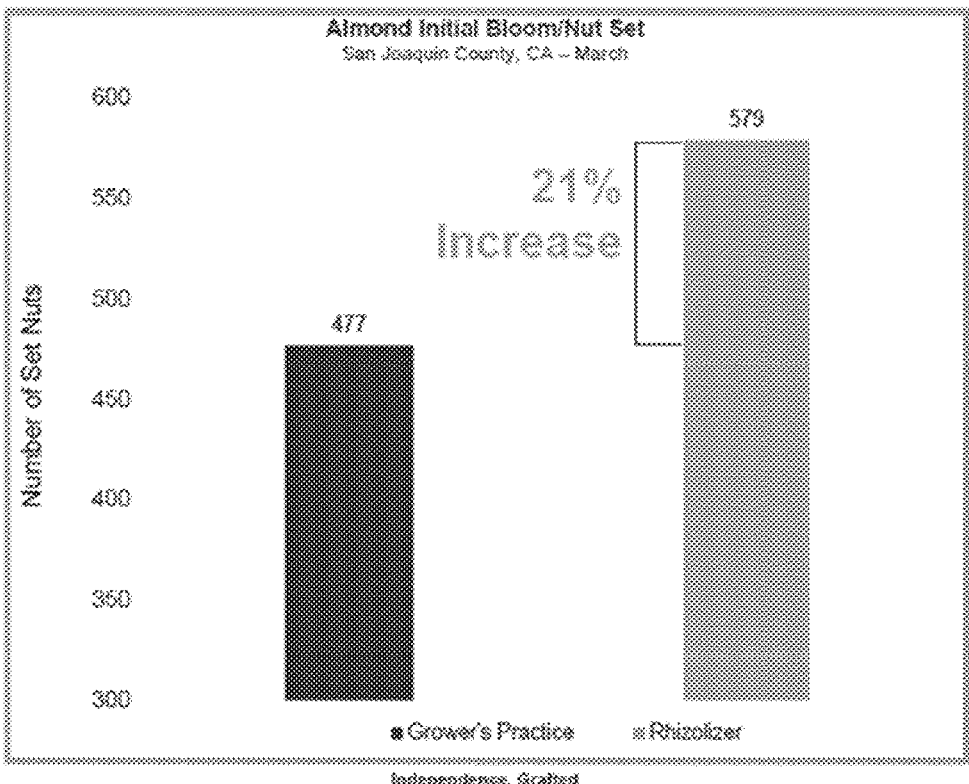
FIG. 17 shows initial bloom/nut set for almond trees in San Joaquin County, California, treated with a soil treatment composition according to an embodiment of the subject invention ("Rhizolizer™"), and compared with untreated control (standard grower's practice) plants.
Figure 18A:
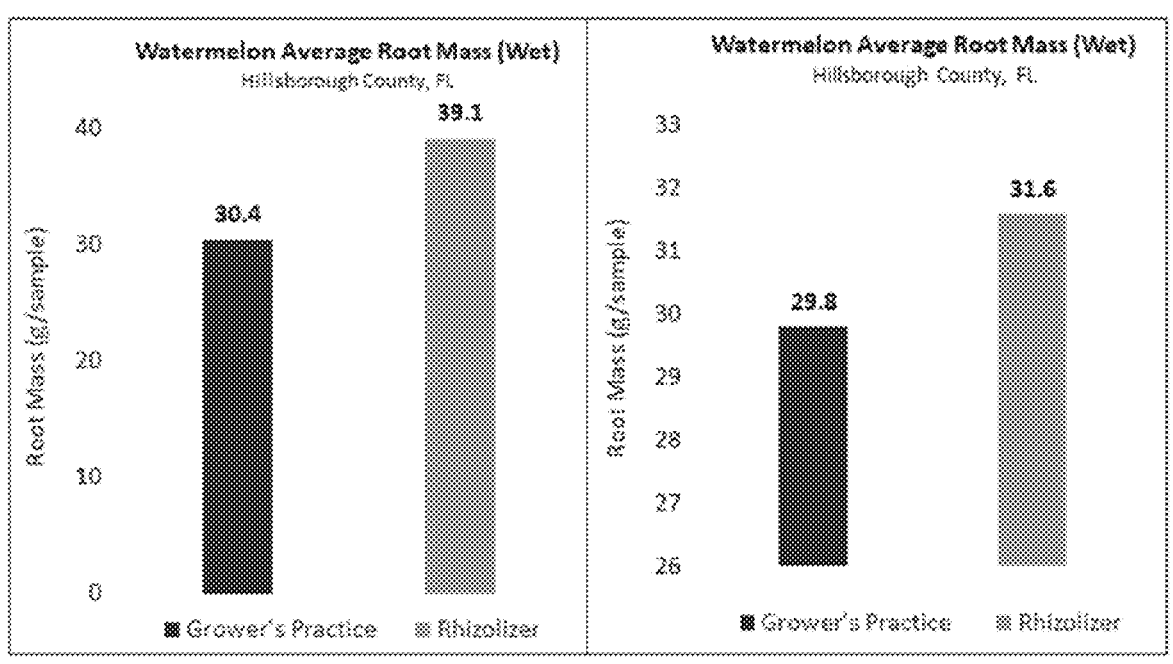
Figure 18B:
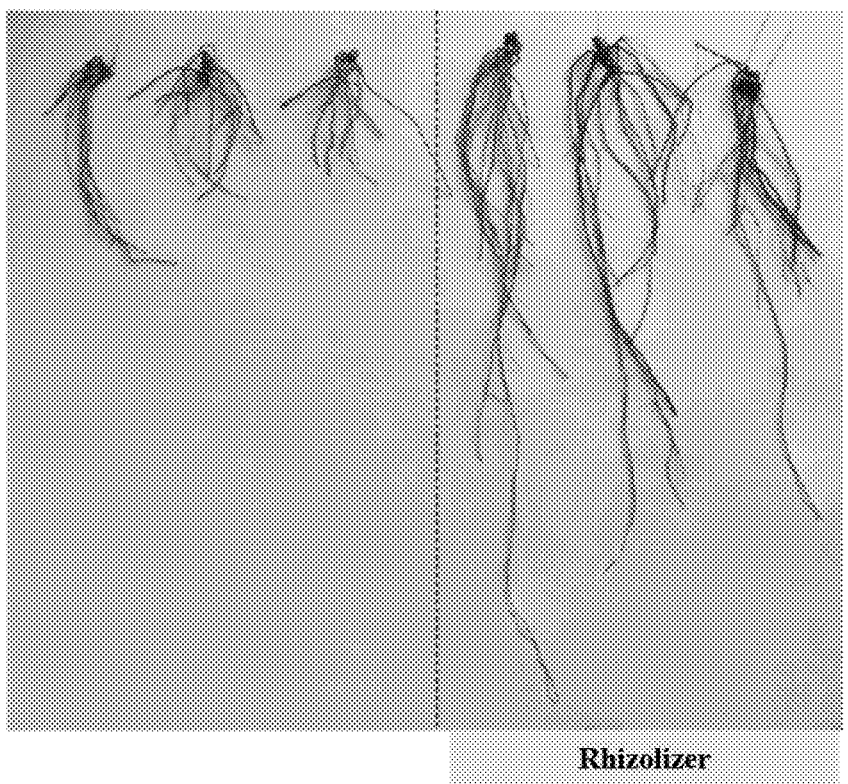

After blooming, the number of set nuts was measured. A 21% increase in set nuts was observed for the treated trees over the untreated control trees (FIG. 17).

Example 11—Watermelon Field Trials

Watermelon plants in Hillsborough County, Florida were treated twice with Rhizolizer™ (one treatment per month for two months) and compared with standard grower's practice watermelon plants. FIGS. 18A-18F show the root size (A-B), flower count (C), fruit count (D), yields (E), weight and Brix rating (F) for treated plants compared with untreated grower's practice plants, where increases were observed for each data set.

Example 12—Cantaloupe Field Trials

Cantaloupe plants in Polk County, Florida were treated twice with Rhizolizer™ (one treatment per month for two months) and compared with standard grower's practice. FIG. 19A shows the increase in flower count and FIG. 19B shows the average harvestable yield for treated plants compared with untreated grower's practice plants, where increases were observed for each data set.

Example 13—Potato Field Trials

Potato plants in various locations were treated with a soil treatment composition according to an embodiment of the subject invention ("Rhizolizer™") and compared with untreated control (standard grower's practice) plants. Emergence after planting, yields, and quality of potatoes were measured.

FIGS. 20A-20B show potato plant emergence in Imperial County, California for yellow rose russet potatoes planted 5 weeks after planting (A) and multiple cultivars 6 weeks after planting (B). The soil treatment composition was applied once at the time of planting, at 1 fl. oz./acre. At 5 weeks, the yellow rose russet showed a 246% increase over grower's practice plants (plants/linear 867 ft.). At 6 weeks, the multi-cultivars showed a 56% increase (plants/linear 1250 ft.) over grower's practice plants.

Figure 21B:
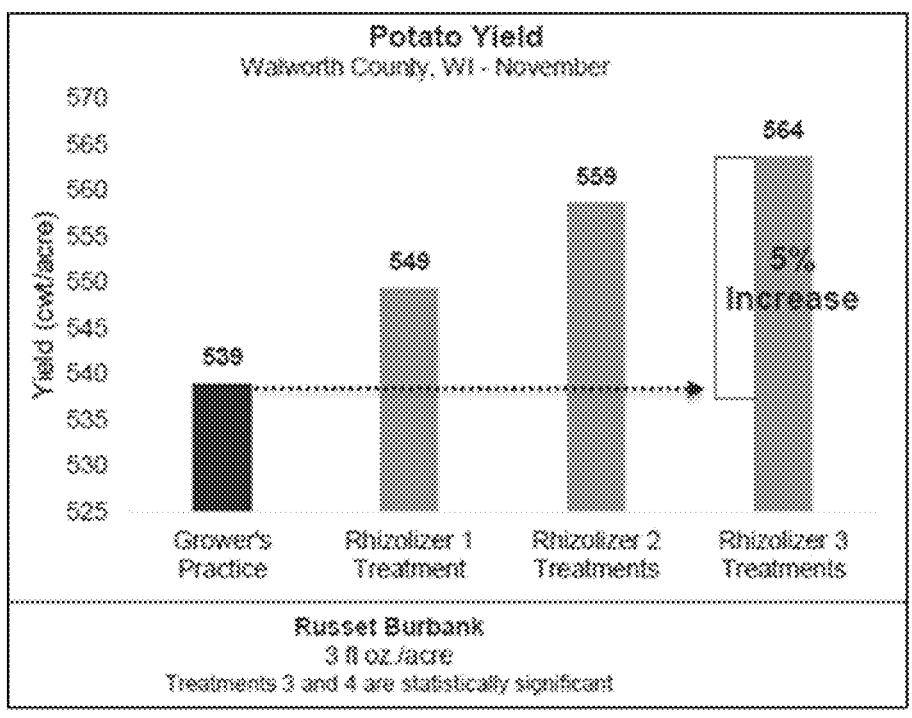

FIGS. 21A-21B shows potato yields Reveille Russet Fresh Market Baking potatoes in Hartley County, Texas (A) and Russet Burbank potatoes in Walworth County, Wisconsin (B). The soil treatment composition was applied to the Reveille Russets once at planting, at 3 fl. oz./acre. The treated plants showed a 31% increase in yield over grower's practice plants (FIG. 21A). The soil treatment composition was applied to the Russet Burbank potatoes 3 times at 3 fl. oz./acre each. A 5% increase was observed between treatment number 3 and the grower's practice plants (FIG. 21B).

Figure 22A:
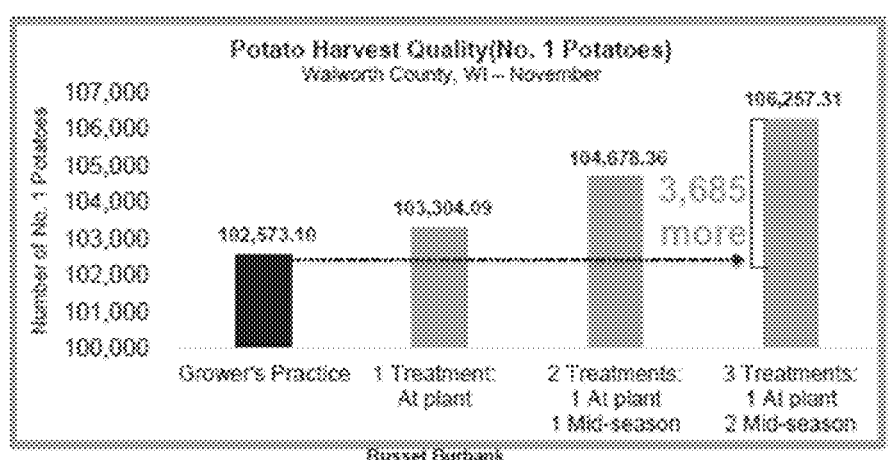
FIGS. 22A-22B show potato harvest quality for Russet Burbank potatoes (A) and yield by grade for Colomba potatoes (B). The potatoes were treated with a soil treatment composition according to an embodiment of the subject invention ("Rhizolizer™"), and compared with untreated control (standard grower's practice) plants.
Figure 22B:
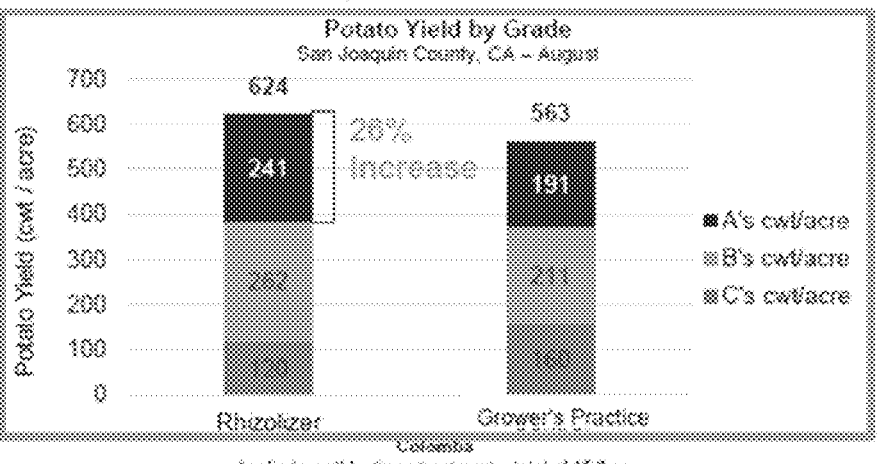

FIGS. 22A-22B show potato harvest quality for Russet Burbank potatoes (22A) and yield by grade for Colomba potatoes (22B). The Russet Burbank potatoes were treated up to 3 times with the soil treatment composition, with the 1 treatment, 2 treatment and 3 treatment groups all exhibiting an increase in number of No. 1 Potatoes (FIG. 22A). The Colomba potatoes were treated monthly, for a total of 3 treatments. A 26% increase in Grade A potatoes was observed compared with grower's practice potatoes.

Example 14—Strawberry Field Trials

Strawberry plants in Hillsborough County, Florida were treated with a soil treatment composition according to an embodiment of the subject invention ("Rhizolizer™") and compared with untreated control (standard grower's practice) plants.

Figure 23A:
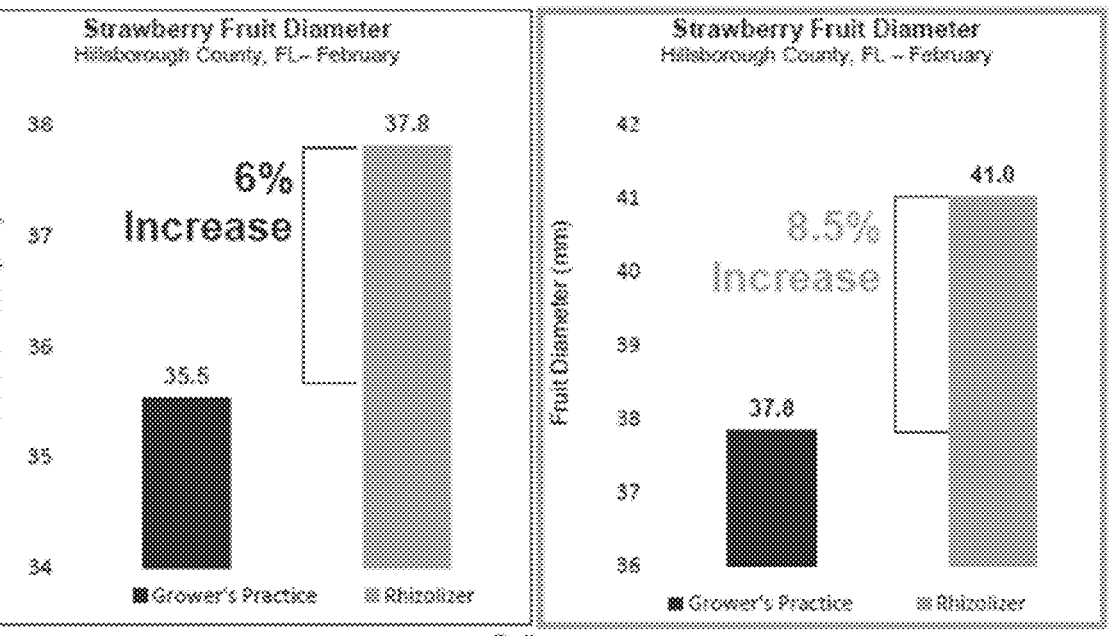
FIGS. 23A-23C show increase in fruit size for strawberries treated with a soil treatment composition according to an embodiment of the subject invention ("Rhizolizer™"), compared with untreated control (standard grower's practice) plants. Fruit diameter (A-B) and fruit weight (C) were measured.
Figure 23B:
Figure 23C:
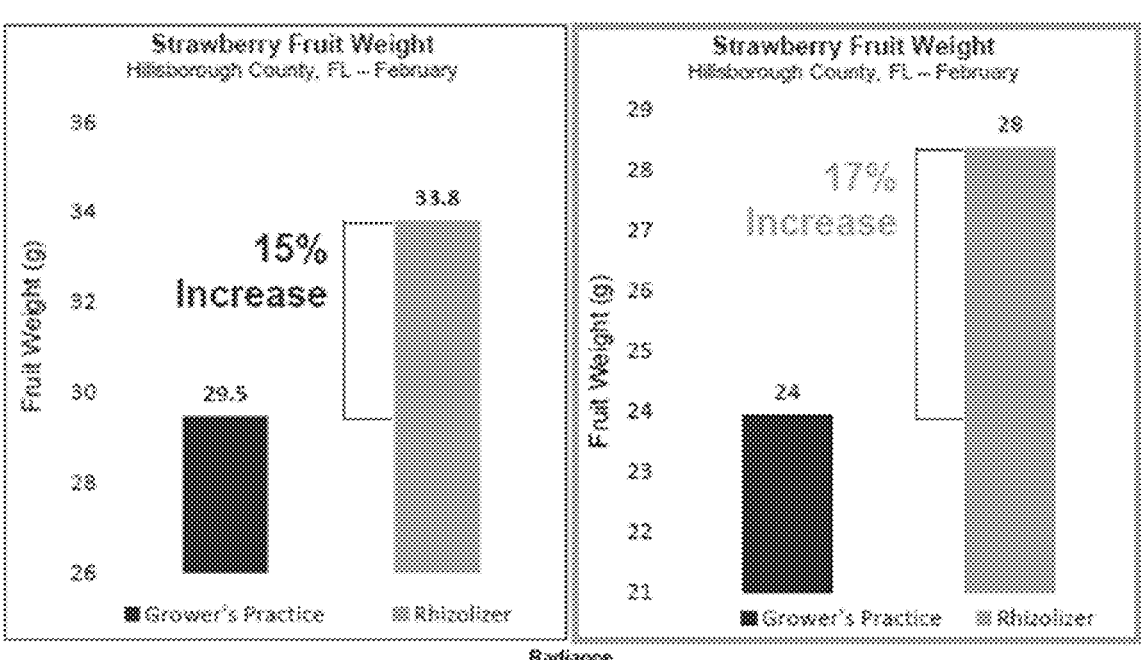

Fruit diameter and weight were measured for two groups of Radiance strawberries treated twice with the soil treatment composition at 3 fl. oz./acre (FIG. 23A). A 6% and an 8.5% increase in fruit diameter was observed for the treated strawberries over grower's practice plants. A visible increase in fruit size was observed between the treated and untreated strawberries (FIG. 23B). Furthermore, a 15% increase and a 17% increase in weight (g) was observed for the two groups compared with untreated control groups (FIG. 23C).

Figure 24:
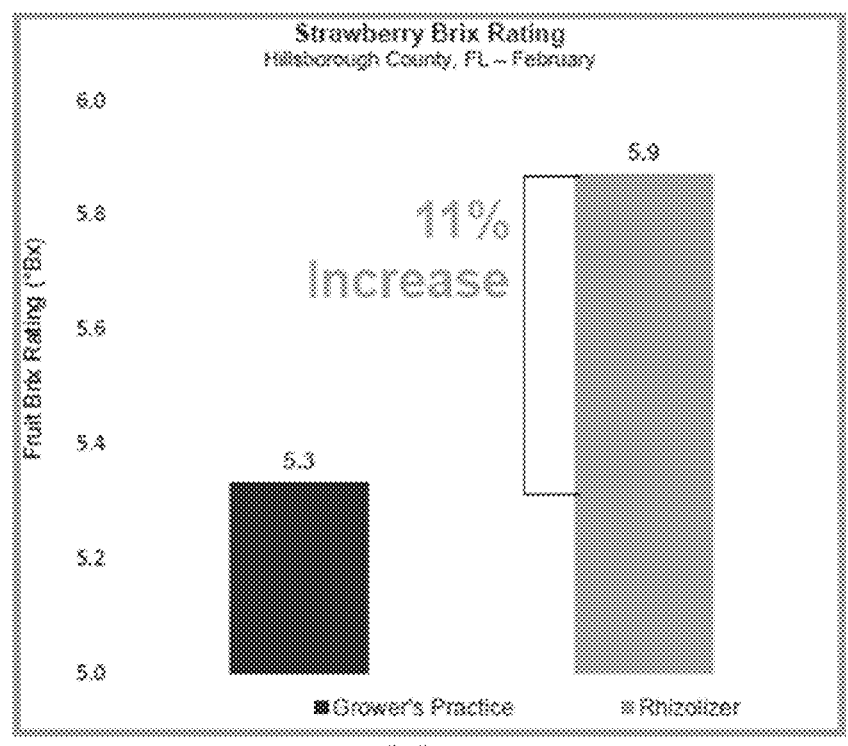
FIG. 24 shows increase in Brix Rating for strawberries treated with a soil treatment composition according to an embodiment of the subject invention ("Rhizolizer™"), compared with untreated control (standard grower's practice) plants.
Figure 25:
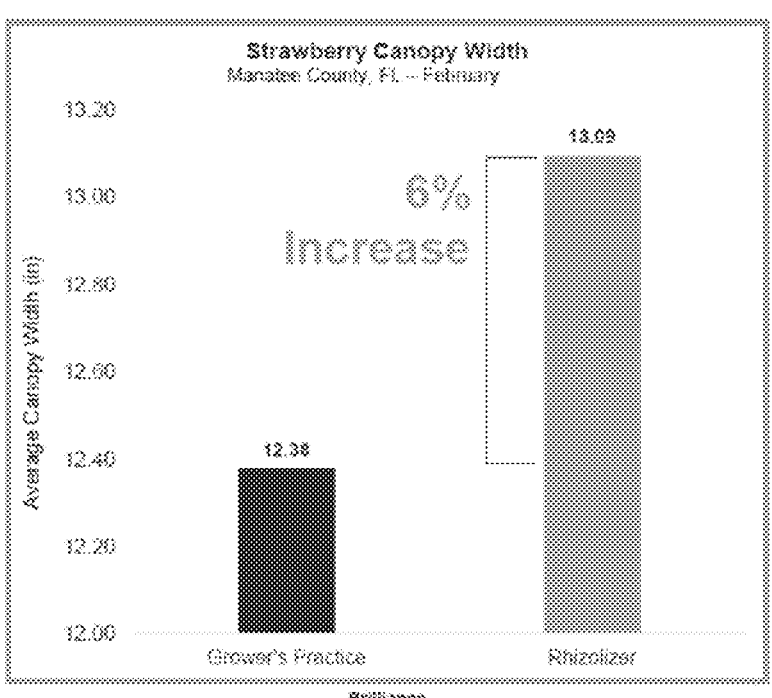
FIG. 25 shows increase in canopy width for strawberries treated with a soil treatment composition according to an embodiment of the subject invention ("Rhizolizer™"), compared with untreated control (standard grower's practice) plants.
Figure 26:
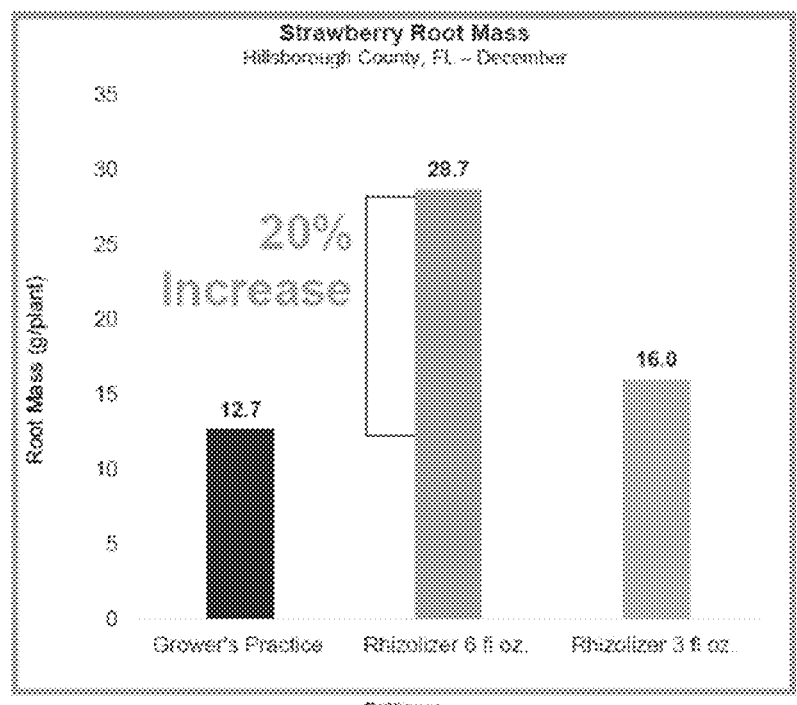
FIG. 26 shows increase in root mass for strawberries treated with a soil treatment composition according to an embodiment of the subject invention ("Rhizolizer™"), compared with untreated control (standard grower's practice) plants.

Brix ratings, canopy width, root mass, fruit count, average flats/acre and total flats were also measured and compared with grower's practice strawberry plants:

An 11% increase in degrees Brix was observed for Radiance strawberries that received 2 monthly treatments of the soil treatment composition at 3 fl. oz./acre (FIG. 24);

a 6% increase in canopy width (in) was observed for Brilliance strawberries that received 5 monthly treatments of the soil treatment composition at 6 fl. oz./acre (FIG. 25);

a 20% increase in root mass (g/plant) was observed for Brilliance strawberries that received two monthly treatments of the soil treatment composition at 6 fl. oz./acre (FIG. 26);

a 7% increase in average fruit count was observed for Radiance strawberries that received two monthly treatments of the soil treatment composition at 3 fl. oz./acre (FIG. 27); and a 22% increase in flats/acre was observed (FIG. 28A), and a 22% increase in total flats (FIG. 28B) was observed for Radiance strawberry plants that received 4 monthly treatments of the soil treatment composition at 3 fl. oz./acre.

Example 15—Corn Field Trials

DKC 56-45 variety corn plants in Walworth County, Wisconsin were treated with a soil treatment composition according to an embodiment of the subject invention ("Rhizolizer™") either once at planting, once at mid-season, or twice (once at planting and once at mid-season). The treatment groups were compared with untreated control (standard grower's practice) plants.

Figure 29:
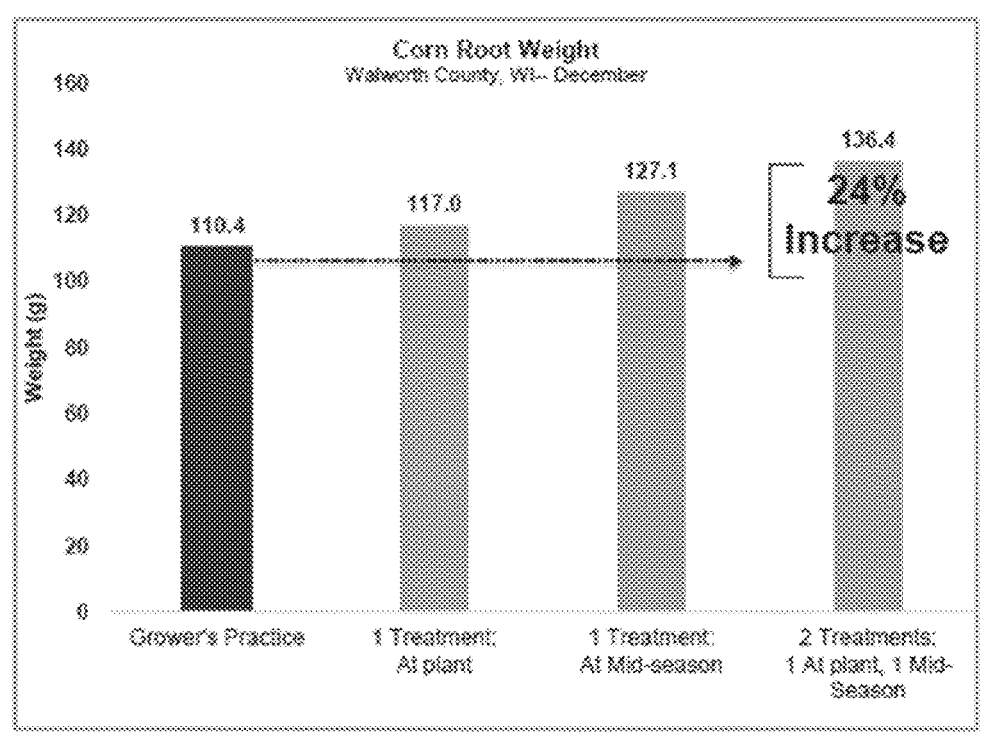
FIG. 29 shows increase in root weight for corn plants treated with a soil treatment composition according to an embodiment of the subject invention ("Rhizolizer™"), either once at planting, once at mid-season, or twice (once at planting and once at mid-season). The three treatment groups were compared with untreated control (standard grower's practice) plants.
Figure 30:
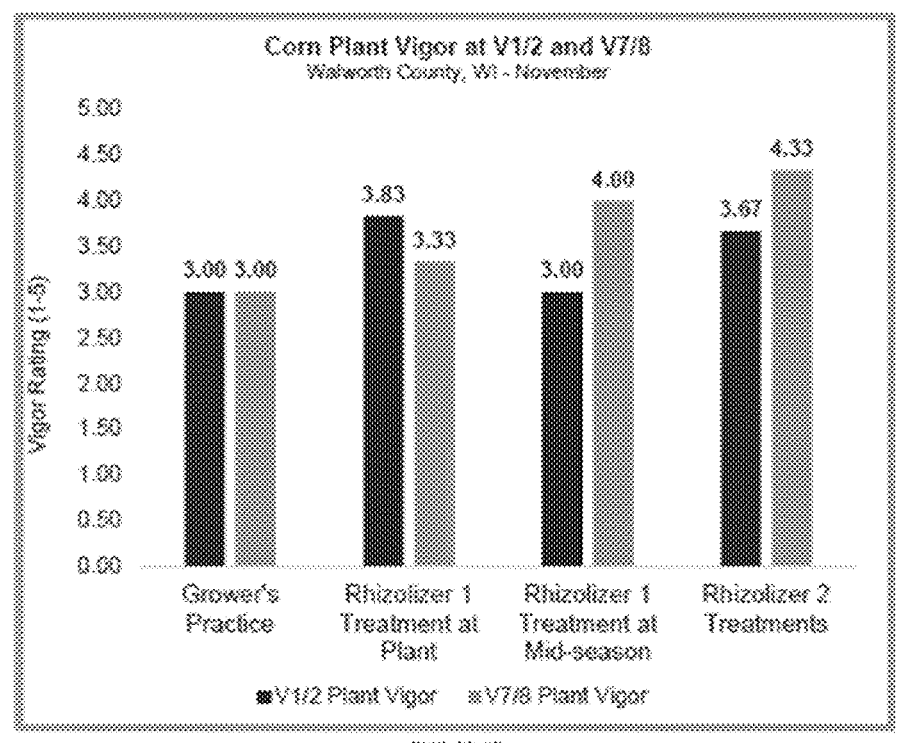
FIG. 30 shows increase in plant vigor for corn plants treated with a soil treatment composition according to an embodiment of the subject invention ("Rhizolizer™"), either once at planting, once at mid-season, or twice (once at planting and once at mid-season). The three treatment groups were compared with untreated control (standard grower's practice) plants.

Root weight (g), plant vigor rating (1-5), and yield (bu/acre) were measured. The double-treatment group showed the greatest increase in root weight (24%) (FIG. 29), vigor (FIG. 30), and yield (5%) (FIG. 31) compared with the grower's practice plants.

Example 16—Cotton Field Trials

Two groups of cotton plants in Lubbock County, Texas were treated with a soil treatment composition according to an embodiment of the subject invention ("Rhizolizer™") and were compared with untreated control (standard grower's practice) plants.

Each group received three treatments (bi-weekly) of the soil treatment composition at 3 fl. oz./acre. Projected cotton yields showed a 14% increase and 10% increase in pounds of cotton per acre for the two groups, respectively, compared with grower's practice plants (FIG. 32).

Example 17—Tobacco Field Trials

CC1063 Variety tobacco plants in Lenoir County, North Carolina were treated with a soil treatment composition according to an embodiment of the subject invention ("Rhizolizer™") and compared with untreated control (standard grower's practice) plants.

Plants were treated once at the time of transplant (3 fl. oz./acre). Average chlorophyll (relative greenness), average leaf width (in) and average leaf length (in) were measured. A 4% increase in relative greenness, a 35% increase in leaf width, and an 18% increase in leaf length was observed (FIG. 33).

Example 18—Peanut Field Trials

Runner peanuts in Bulloch County, Georgia were treated with a soil treatment composition according to an embodiment of the subject invention ("Rhizolizer™") and compared with untreated control (standard grower's practice) plants.

Plants were treated once at planting (3 fl. oz./acre). Projected yields (lbs./acre) increased by 4% compared with grower's practice plants (FIG. 34).

Example 19—Microbial Strains

The subject invention utilizes beneficial microbial strains. *Trichoderma harzianum* strains can include, but are not limited to, T-315 (ATCC 20671); T-35 (ATCC 20691); 1295-7 (ATCC 20846); 1295-22 [T-22] (ATCC 20847); 1295-74 (ATCC 20848); 1295-106 (ATCC 20873); T12 (ATCC 56678); WT-6 (ATCC 52443): Rifa T-77 (CMI CC 333646); T-95 (60850); T12m (ATCC 20737); SK-55 (No. 13327; BP 4326 NIBH (Japan)); RR17Bc (ATCC PTA 9708); TSHTH20-1 (ATCC PTA 10317); AB 63-3 (ATCC 18647); OMZ 779 (ATCC 201359); WC 47695 (ATCC 201575); m5 (ATCC 201645); (ATCC 204065); UPM-29 (ATCC 204075); T-39 (EPA 119200); and/or F11Bab (ATCC PTA 9709).

*Bacillus amyloliquefaciens* strains can include, but are not limited to, FZB24 (EPA 72098-5; BGSC 10A6), TA208, NJN-6, N2-4, N3-8, and those having ATCC accession numbers 23842, 23844, 23843, 23845, 23350 (strain DSM 7), 27505, 31592, 49763, 53495, 700385, BAA-390, PTA-7544, PTA-7545, PTA-7546, PTA-7549, PTA-7791, PTA-5819, PTA-7542, PTA-7790, and/or PTA-7541.

We claim:

1. A soil treatment composition for enhancing plant immunity, health, growth and/or yield, the composition comprising a first microorganism and a second microorganism, and/or a growth by-product of the first and/or second microorganism, wherein the first microorganism and the second microorganism are both non-pathogenic, spore-forming microorganisms; and wherein the first microorganism is *Trichoderma harzianum* and the second microorganism is *Bacillus amyloliquefaciens* NRRL B-67928.

2. The composition of claim 1, further comprising one or more additional microorganisms selected from *Wickerhamomyces anomalus, Rhizobium* spp., *Myxococcus xanthus, Azotobacter vinelandii*, and *Frateuria aurantia*.

3. The composition of claim 1, comprising $1 \times 10^6$ to $1 \times 10^{12}$ CFU/mL of the *Bacillus amyloliquefaciens* NRRL B-67928.

4. The composition of claim 1, comprising $1 \times 10^9$ CFU/mL of the *Bacillus amyloliquefaciens* NRRL B-67928.

5. A method of enhancing plant immunity, health, growth and/or yield, wherein the method comprises applying a soil treatment composition according to claim 1 to a plant and/or its surrounding environment, and, optionally, applying nutrients and/or prebiotics for microbial growth.

6. The method of claim 5, wherein the soil treatment composition is applied to the plant and/or its surroundings using an irrigation system.

7. The method of claim 5, wherein the soil treatment composition is applied to the plant and/or its surrounding environment alongside a source of one or more nutrients selected from nitrogen, phosphorous, and potassium.

8. The method of claim 5, wherein the plant has compromised immune health due to an infection from a pathogenic agent or due to an environmental stressor.

9. The method of claim 8, used to improve the immune health of the plant.

10. The method of claim 8, wherein the plant is a citrus plant affected by citrus greening disease and/or citrus canker disease.

11. The method of claim 5, used to improve one or more qualities of soil.

12. The method of claim 11, used to improve nutrient retention in depleted soil.

13. The method of claim 5, used to enhance nutrient absorption in plant roots.

14. The method of claim 5, wherein the plant is a crop plant.

15. The method of claim 14, wherein the crop plant is selected from citrus, tomato, sod, potato, sugarcane, grapes, watermelon, cantaloupe, lettuce, almond, onion, carrot, berries and cotton.

16. The method of claim 5, wherein the soil treatment composition is sprayed onto the plant and/or its surrounding environment using a handheld lawn and garden sprayer.

17. The method of claim 16, wherein the method is used for home and garden applications.

\* \* \* \* \*